(12) United States Patent
Choi

(10) Patent No.: US 11,182,285 B2
(45) Date of Patent: Nov. 23, 2021

(54) MEMORY SYSTEM WHICH STORES A PLURALITY OF WRITE DATA GROUPED INTO A TRANSACTION

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 203 days.

(21) Appl. No.: 16/377,741

(22) Filed: Apr. 8, 2019

(65) Prior Publication Data

US 2020/0065240 A1   Feb. 27, 2020

(30) Foreign Application Priority Data

Aug. 27, 2018 (KR) .................. 10-2018-0100118

(51) Int. Cl.
*G06F 12/02* (2006.01)
*G06F 12/0891* (2016.01)
*G06F 3/06* (2006.01)
*G06F 13/16* (2006.01)

(52) U.S. Cl.
CPC ........ *G06F 12/0246* (2013.01); *G06F 3/0604* (2013.01); *G06F 3/0658* (2013.01); *G06F 3/0659* (2013.01); *G06F 3/0683* (2013.01); *G06F 12/0891* (2013.01)

(58) Field of Classification Search
None
See application file for complete search history.

(56) References Cited

U.S. PATENT DOCUMENTS

| 2009/0019209 | A1* | 1/2009 | Shen .................. G06F 9/30087 711/100 |
| 2009/0276599 | A1* | 11/2009 | Kulkarni ................ G06F 9/466 711/170 |
| 2017/0017590 | A1 | 1/2017 | Berman et al. |
| 2017/0024132 | A1 | 1/2017 | Jun et al. |
| 2018/0357172 | A1* | 12/2018 | Lai ....................... G06F 12/084 |

FOREIGN PATENT DOCUMENTS

KR  10-2016-0056723  5/2016
KR  10-2017-0005498  1/2017

* cited by examiner

*Primary Examiner* — Michael Alsip
(74) *Attorney, Agent, or Firm* — IP & T Group LLP

(57) ABSTRACT

A memory system may include: a nonvolatile memory device; a volatile memory suitable for storing write data; and a controller suitable for: allocating a normal write buffer in the volatile memory when normal write data are inputted, allocating a first write buffer in the volatile memory when first write data, which are grouped into a first transaction and first total size information on a total size of the first transaction, are inputted, allocating a second write buffer in the volatile memory when second write data, which are grouped into a second transaction and second total size information on a total size of the second transaction, are inputted, managing sizes of the first and second write buffers to change them in response to the first and second total size information, respectively, and managing a size of the normal write buffer to fix it to a set size.

20 Claims, 27 Drawing Sheets

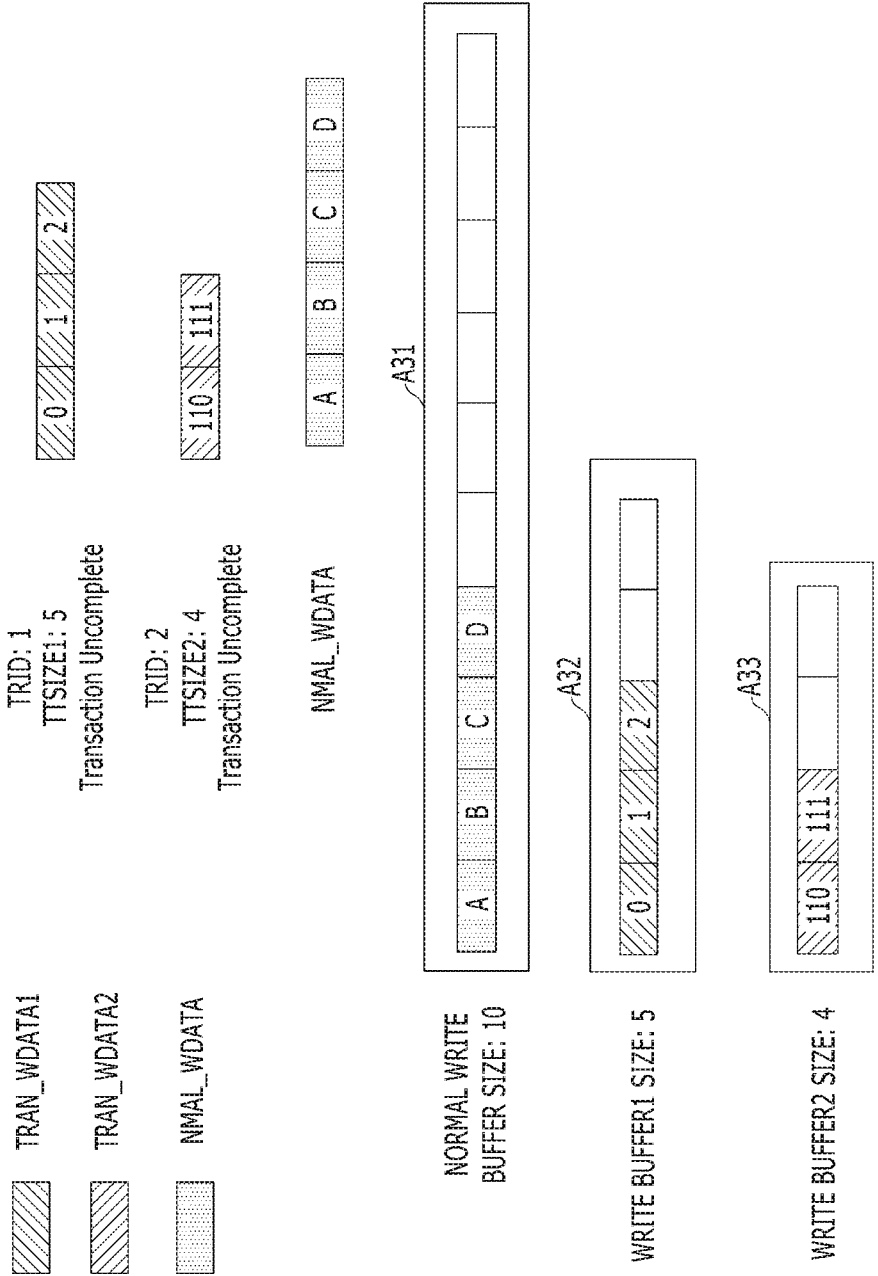

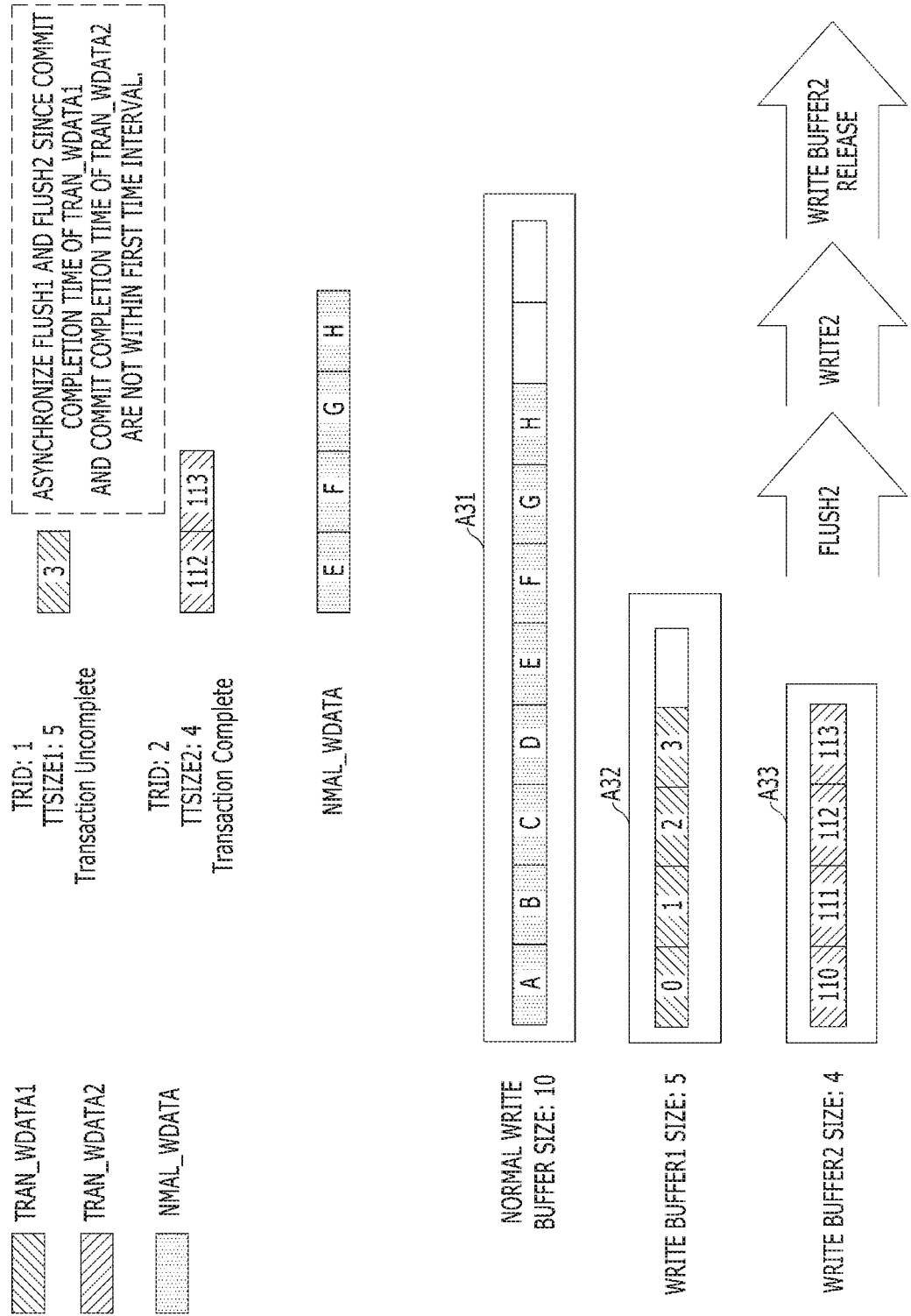

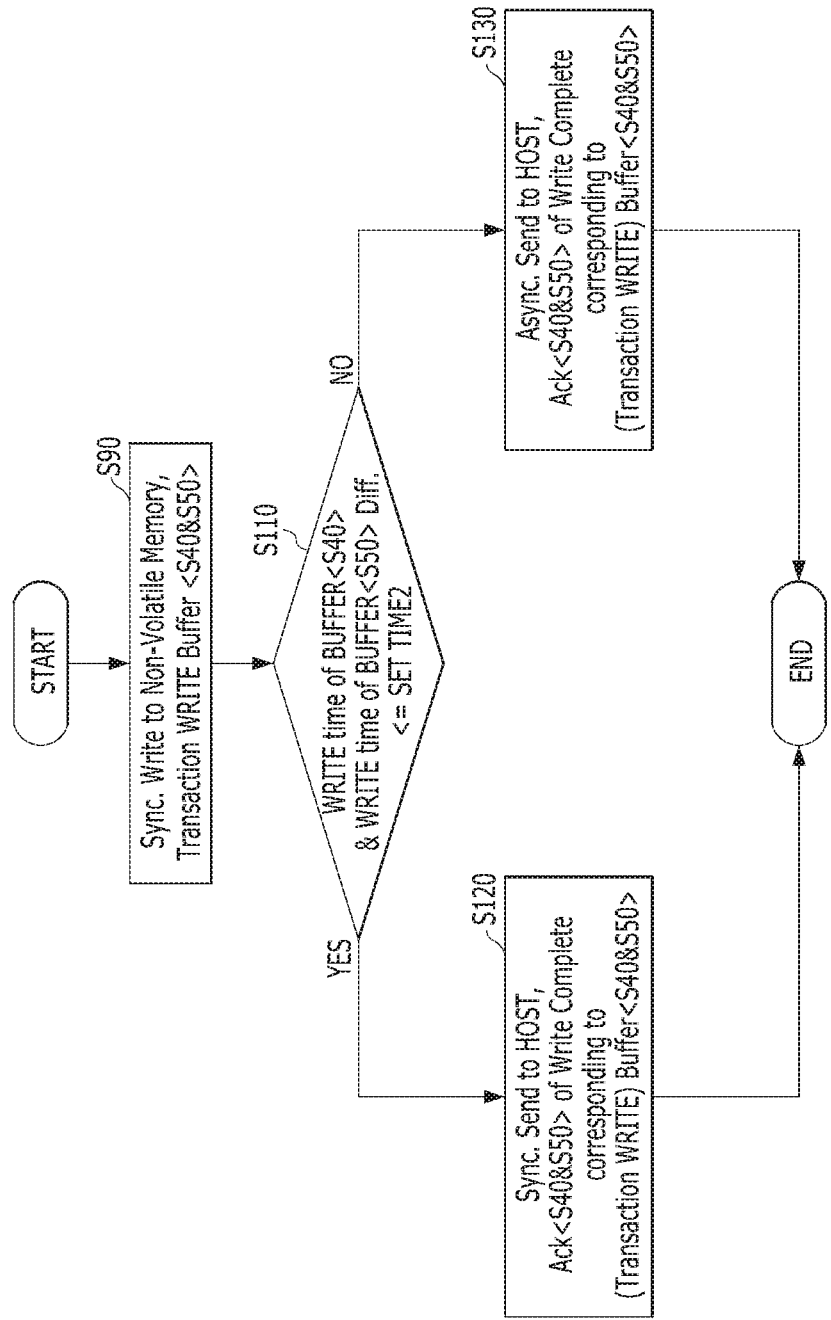

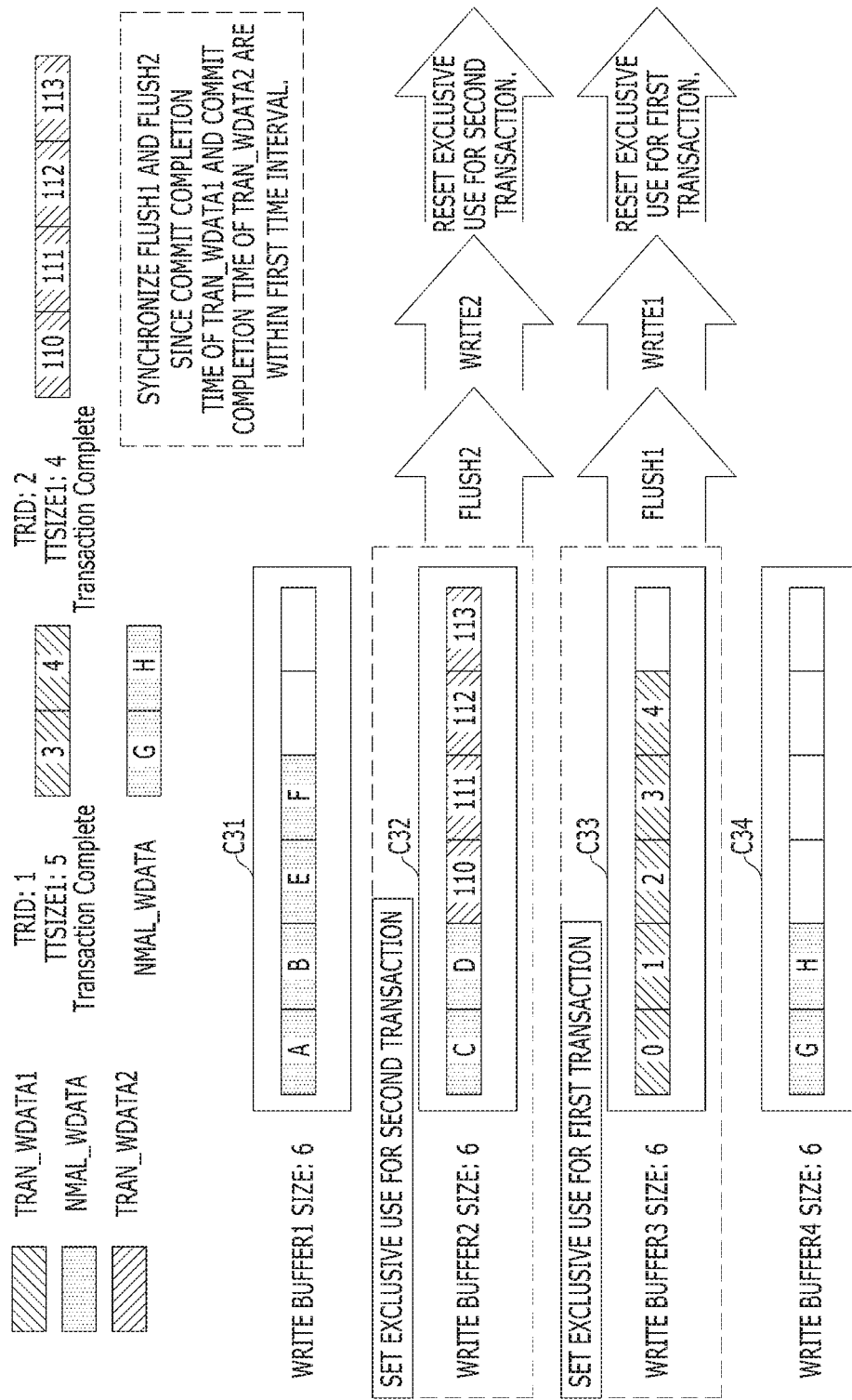

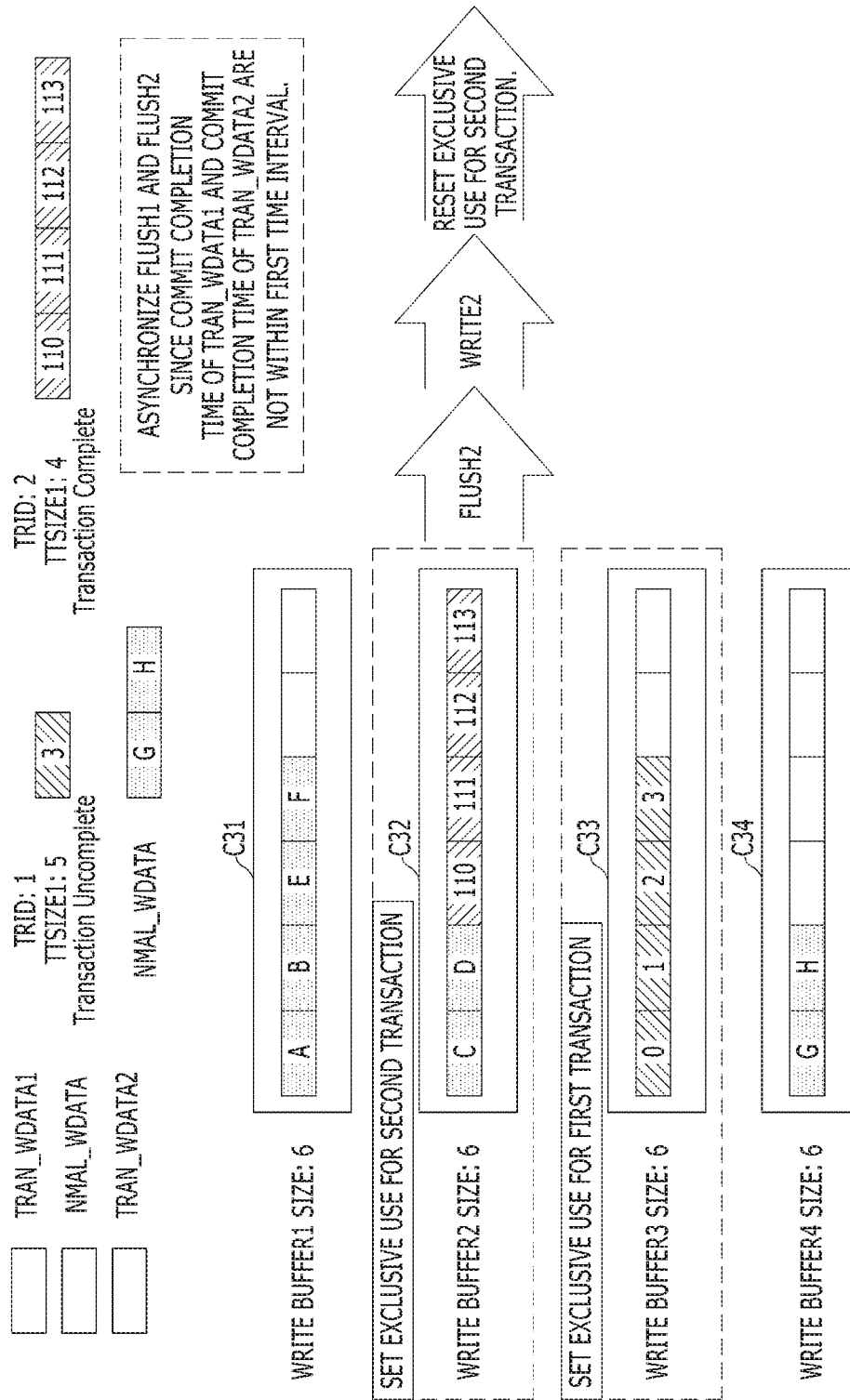

MEMORY SYSTEM WHICH STORES A PLURALITY OF WRITE DATA GROUPED INTO A TRANSACTION

CROSS-REFERENCE TO RELATED APPLICATION

This application claims priority under 35 U.S.C. § 119(a) to Korean Patent Application No. 10-2018-0100118, filed on Aug. 27, 2018, which is incorporated herein by reference in its entirety.

BACKGROUND

1. Field

Various embodiments relate to a memory system and, more particularly, to a memory system which stores a plurality of write data grouped into a transaction.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

SUMMARY

Various embodiments are directed to a memory system capable of effectively managing a plurality of write data grouped into a transaction.

In an embodiment, a memory system may include: a nonvolatile memory device; a volatile memory suitable for temporarily storing write data inputted from a host; and a controller suitable for: allocating a normal write buffer in the volatile memory when normal write data, which are not grouped into a transaction, are inputted from the host, allocating a first write buffer in the volatile memory when first write data, which are grouped into a first transaction and first total size information on a total size of the first transaction, are inputted, allocating a second write buffer in the volatile memory when second write data, which are grouped into a second transaction and second total size information on a total size of the second transaction, are inputted, managing sizes of the first and second write buffers to change them in response to the first and second total size information, respectively, and managing a size of the normal write buffer to fix it to a set size.

the controller may further: check a first determined size for the first write data according to the first total size information, and allocates the first write buffer by an amount of the first determined size in the volatile memory, and check a second determined size for the second write data according to the second total size information, and allocates the second write buffer by an amount of the second determined size in the volatile memory.

The controller may further: check whether the first transaction is committed or aborted, for the first write data stored in the first write buffer; perform a first write operation of storing the first write data stored in the first write buffer in the nonvolatile memory device by performing a first flush operation for the first write buffer, in the case where the first transaction is checked as being committed, and then releases the first write buffer in the volatile memory, and release the first write buffer in the volatile memory in the case where the first transaction is checked as being aborted.

The controller may further: check whether the second transaction is committed or aborted, for the second write data stored in the second write buffer, perform a second write operation of storing the second write data stored in the second write buffer in the nonvolatile memory device by performing a second flush operation for the second write buffer, in the case where the second transaction is checked as being committed, and then releases the second write buffer in the volatile memory, and release the second write buffer in the volatile memory in the case where the second transaction is checked as being aborted.

The controller may further: synchronize a start time of the first flush operation and a start time of the second flush operation in the case where a time at which commit of the first transaction is checked and a time at which commit of the second transaction is checked are within a set first time interval.

When the start time of the first flush operation and the start time of the second flush operation are synchronized, the controller may synchronize a time at which a first acknowledgement signal corresponding to completion of the first write operation is transferred to the host and a time at which a second acknowledgement signal corresponding to completion of the second write operation is transferred to the host.

When a time at which a first acknowledgement signal is generated and a time at which a second acknowledgement signal is generated are within a set second time interval, the controller may synchronize a time at which the first acknowledgement signal is transferred to the host and a time at which the second acknowledgement signal is transferred to the host.

The controller may receive a plurality of write commands respectively corresponding to the write data, from the host, transaction information of the respective write data corresponding to the write commands may be respectively included in the write commands, transaction information of each of the write data may include transaction ID (identification) information, commit information and abort information, the first total size information may be additionally included in a write command corresponding to start data of the first transaction among the first write data, and the second total size information may be additionally included in a write command corresponding to start data of the second transaction among the second write data.

The controller may further: check transaction ID information in the transaction information of the respective write data, store the first write data by allocating the first write buffer in the volatile memory in the case where the transaction ID information of the first write data which are grouped into the first transaction are checked as being set to a first value, store the second write data by allocating the second write buffer in the volatile memory in the case where the transaction ID information of the second write data which are grouped into the second transaction are checked as being set to a second value, and store the normal write data by allocating the normal write buffer in the volatile memory in the case where the transaction ID information of the normal write data are checked as not being set and thus which are not grouped into a transaction.

In an embodiment, a memory system may include: a nonvolatile memory device; a volatile memory suitable for temporarily storing write data inputted from a host; and a controller suitable for: allocating a plurality of write buffers, each of which has a defined size, in the volatile memory, storing normal write data, which are inputted from the host and are not grouped into a transaction, in write buffers which are not set for exclusive use for transactions, and setting, when first write data which are grouped into a first transaction and first total size information on a total size of the first transaction are inputted from the host, a first exclusive use option for exclusively using at least one first write buffer among the write buffers, for the first transaction, according to the first total size information.

The controller may further: check respective empty spaces of the write buffers at a time when the first write data are inputted from the host, set the first exclusive use option for a minimum number of write buffers among the write buffers, according to the checked empty spaces and the first total size information, and use the minimum number of write buffers as the at least one first write buffer.

The controller may further: set, when second write data which are grouped into a second transaction and second total size information on a total size of the second transaction are inputted from the host, a second exclusive use option for exclusively using at least one second write buffer among remaining write buffers excluding the first write buffer, for the second transaction, according to the second total size information.

The controller may further: check respective empty spaces of the remaining write buffers at a time when the second write data are inputted from the host, set the second exclusive use option for a minimum number of write buffers among the remaining write buffers, according to the checked empty spaces and the second total size information, and use the minimum number of write buffers as the at least one second write buffer.

The controller may further: check whether the first transaction is committed or aborted, for the first write data stored in the at least one first write buffer, perform a first write operation of storing the first write data stored in the at least one first write buffer in the nonvolatile memory device by performing a first flush operation for the at least one first write buffer, in the case where the first transaction is checked as being committed, and then resets the first exclusive use option for the at least one first write buffer, and discard the first write data stored in the at least one first write buffer in the case where the first transaction is checked as being aborted, and then resets the first exclusive use option for the at least one first write buffer.

The controller may further: check whether the second transaction is committed or aborted, for the second write data stored in the at least one second write buffer, perform a second write operation of storing the second write data stored in the at least one second write buffer in the nonvolatile memory device by performing a second flush operation for the at least one second write buffer, in the case where the second transaction is checked as being committed, and then resets the second exclusive use option for the at least one second write buffer, and discard the second write data stored in the at least one second write buffer in the case where the second transaction is checked as being aborted, and then resets the second exclusive use option for the at least one second write buffer.

The controller may further: synchronize a start time of the first flush operation and a start time of the second flush operation in the case where a time at which commit of the first transaction is checked and a time at which commit of the second transaction is checked are within a set first time interval.

When the start time of the first flush operation and the start time of the second flush operation are synchronized, the controller may synchronize a time at which a first acknowledgement signal corresponding to completion of the first write operation is transferred to the host and a time at which a second acknowledgement signal corresponding to completion of the second write operation is transferred to the host.

When a time at which a first acknowledgement signal corresponding to completion of the first write operation is generated and a time at which a second acknowledgement signal corresponding to completion of the second write operation is generated are within a set second time interval, the controller may synchronize a time at which the first acknowledgement signal is transferred to the host and a time at which the second acknowledgement signal is transferred to the host.

The controller may receive from the host a plurality of write commands respectively corresponding to the write data, transaction information of the respective write data corresponding to the write commands may be respectively included in the write commands, transaction information of each of the write data may include transaction ID (identification) information, commit information and abort information, the first total size information may be additionally included in a write command corresponding to start data of the first transaction among the first write data, and the second total size information may be additionally included in a write command corresponding to start data of the second transaction among the second write data.

The controller may further: check transaction ID information in the transaction information of the respective write data, store the first write data by setting the first write buffer among the write buffers in the case where the transaction ID information of the first write data which are grouped into the first transaction are checked as being set to a first value, store the second write data by setting the at least one second write buffer among the remaining write buffers in the case where the transaction ID information of the second write data which are grouped into the second transaction are checked as being set to a second value, and store the normal write data in remaining write buffers except the first and second write buffers among the write buffers, in the case where the transaction ID information of the normal write data are checked as not being set and thus which are not grouped into a transaction.

In an embodiment, a memory system may include: a nonvolatile memory device suitable for storing write data; a volatile memory device suitable for buffering the write data; and a controller suitable for controlling the nonvolatile memory device to store the write data by flushing the buffered write data into the nonvolatile memory device. The controller may assign, within the volatile memory device, a first buffer space of a variable size according to a total size of the write data when the write data is identified as transaction data. The controller may assign, within the volatile memory device, a second buffer space of a fixed size when the write data is identified as normal data, which is different than the transaction data.

In the present technology, when write data which are grouped into a transaction are inputted from a host, a dedicated transaction write buffer is allocated in a volatile memory. The transaction write buffer may be distinguished from a normal write buffer for managing normal write data. Through this, it is possible to effectively manage transaction write data.

Also, upon the completion of at least two transactions, flush operations of the transaction write buffers may be performed in synchronization with each other to the maximum within a possible range. Through this, an algorithm for ensuring transaction data is simplified.

Moreover, upon flush of the transaction write buffers, acknowledgement signals transmitted to the host are synchronized to the maximum extent within a possible range. Through this, the number of times the acknowledgement signals are transmitted to the host is minimized in a memory system.

BRIEF DESCRIPTION OF THE DRAWINGS

FIGS. 3A to 3D and 4A to 4D are diagrams to assist in the explanation of the operation of the memory system in accordance with an embodiment of the present disclosure.

FIGS. 5A to 5C are flow charts to assist in the explanation of the operation of the memory system in accordance with an embodiment of the present disclosure.

FIGS. 8A to 8E and 9A to 9D are diagrams to assist in the explanation of the operation of the memory system in accordance with an embodiment of the present disclosure.

DETAILED DESCRIPTION

Figure 1:
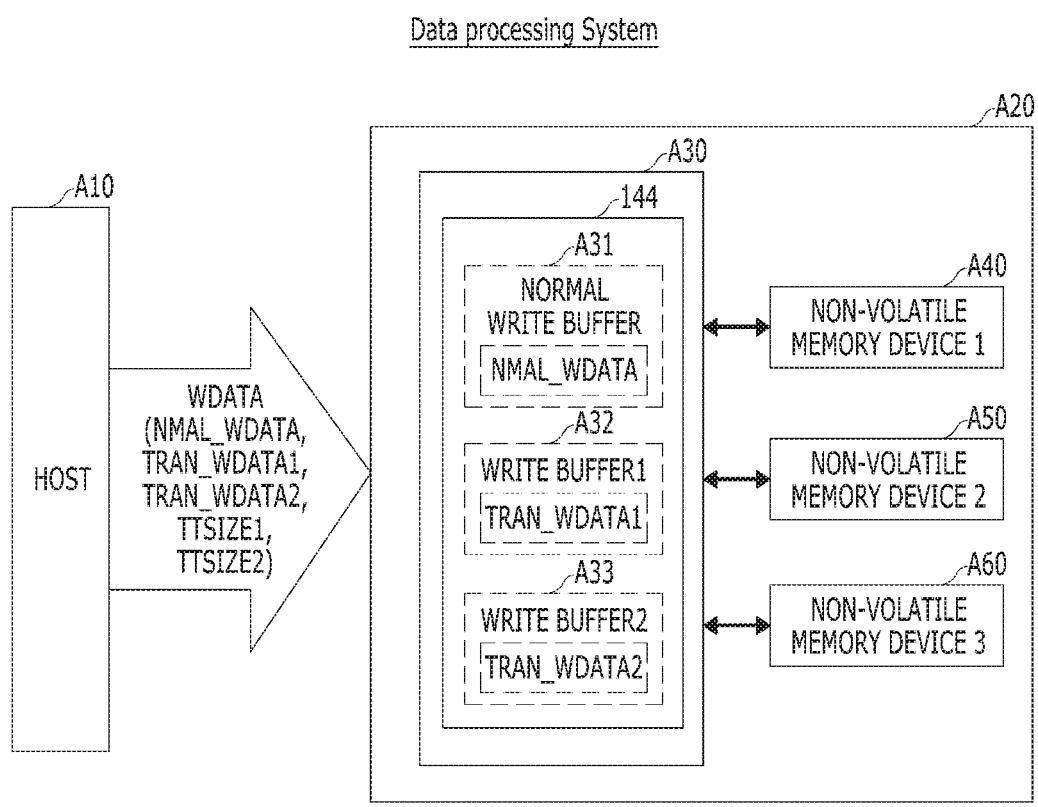
FIGS. 1 and 2 are diagrams to assist in the explanation of the configuration of a data processing system including a memory system in accordance with an embodiment of the present disclosure.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment," "first embodiment," "a second embodiment" or the like is not necessarily to only one embodiment, and different references to any such phrase are not necessarily to the same embodiment(s).

First Embodiment

Figure 2:
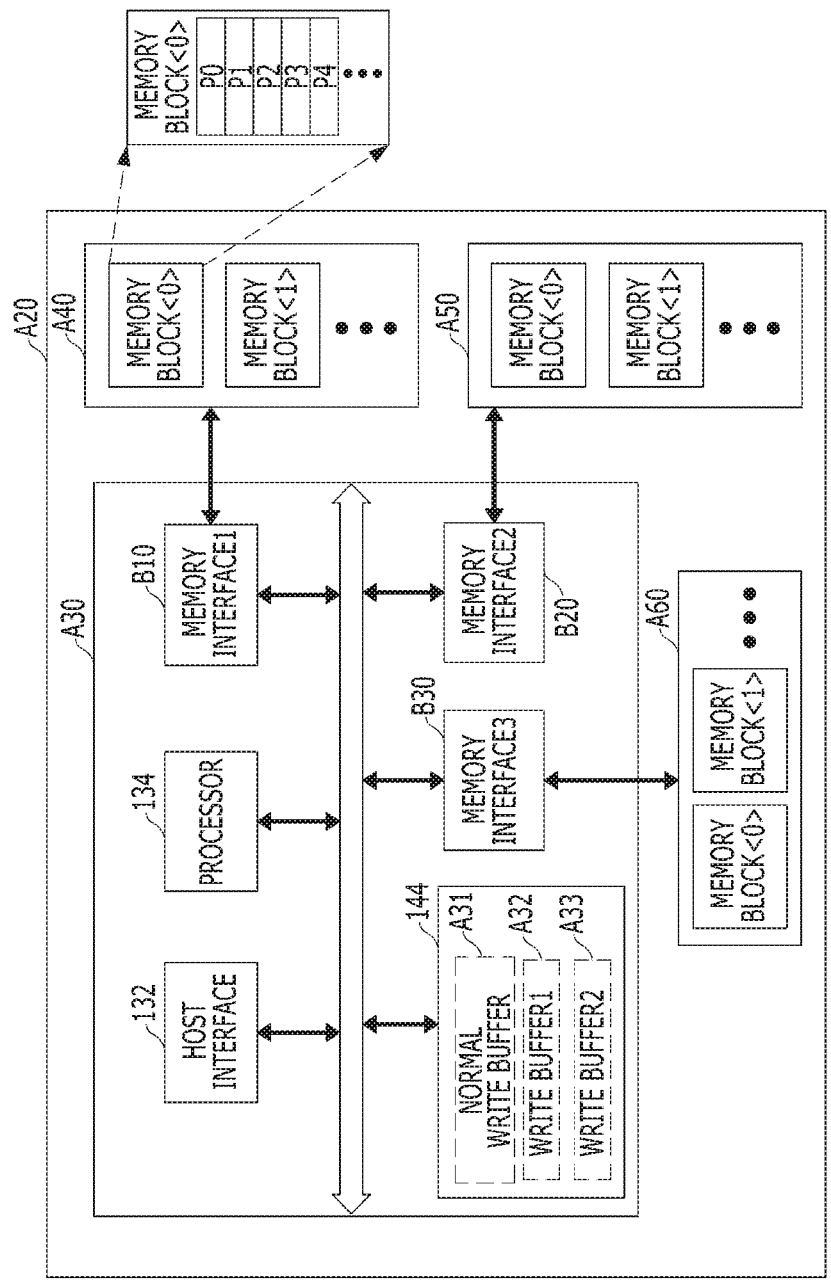

FIGS. 1 and 2 are diagrams to assist in the explanation of the configuration of a data processing system including a memory system in accordance with a first embodiment of the present disclosure.

Referring to FIG. 1, the data processing system includes a host A10 and a memory system A20. The memory system A20 includes a controller A30, a first nonvolatile memory device A40, a second nonvolatile memory device A50 and a third nonvolatile memory device A60.

For reference, in FIGS. 1 and 2, three nonvolatile memory devices A40, A50 and A60 are included in the memory system A20. However, this is merely an example; more or less than three nonvolatile memory devices may be included in a memory system. This arrangement is used in the following description, but as indicated above, the present invention is not limited to such arrangement.

The host A10 transmits a plurality of commands corresponding to a user request to the memory system A20, and accordingly, the memory system A20 performs operations corresponding to the commands, that is, operations corresponding to the user request. The data processing system may comprise one or more memory systems A20, although embodiments of the present invention are described in the context of a single memory system A20.

The memory system A20 operates in response to a request of the host A10, in particular, store data to be accessed by the host A10. In other words, the memory system A20 may be used as a main memory device or an auxiliary memory device of the host A10. The memory system A20 may be realized by any one of various kinds of storage devices, depending on a host interface protocol which is coupled with the host A10. For example, the memory system A20 may be realized by any of a solid state drive (SSD), a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and the like.

The memory system A20 may be integrated into one semiconductor device and configure a memory card. For instance, the memory system A20 may configure a memory card such as a Personal Computer Memory Card International Association (PCMCIA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and/or a universal flash storage (UFS) device.

For another example, the memory system A20 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

The memory system A20 may include a storage device such as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and/or a flash memory.

The memory system A20 includes a volatile memory 144 for temporarily storing write data WDATA inputted from the host A10.

The controller A30 allocates a normal write buffer A31 in the volatile memory 144 in response to that normal write data NMAL_WDATA which are not grouped into a transaction are inputted from the host A10.

The controller A30 allocates a first write buffer A32 in the volatile memory 144 when first write data TRAN_WDATA1 which are grouped into a first transaction and first total size information TTSIZE1 on a total size of the first transaction are inputted from the host A10.

The controller A30 allocates a second write buffer A33 in the volatile memory 144 when second write data TRAN_WDATA2 which are grouped into a second transaction and second total size information TTSIZE2 on a total size of the second transaction are inputted from the host A10.

The fact that write data WDATA are grouped into a transaction means that a plurality of write data WDATA used for the same purpose among write data WDATA are grouped into one transaction.

For example, in a database, data used for correction, addition and update of already stored data may be grouped into respective transactions according to their respective uses. In this regard, data for correcting a database may be grouped into one transaction group, and data for adding a database may be grouped into another transaction group.

Therefore, when write data TRAN_WDATA1 or TRAN_WDATA2 which are grouped into one transaction are transmitted from the host A10 to the controller A30, there exists only a commit state in which all the write data TRAN_WDATA1 or TRAN_WDATA2 are normally transmitted and stored and are thus valid or an abort state in which any one or both of the write data TRAN_WDATA1 or TRAN_WDATA2 is not normally transmitted and stored or all the write data TRAN_WDATA1 or TRAN_WDATA2 are invalid according to an abort request of the host A10. That is, write data TRAN_WDATA1 or TRAN_WDATA2 which are grouped into one transaction are meaningful only when they are in a commit state as all such data are normally transmitted and stored and are thus all valid.

For example, in order for the first write data TRAN_WDATA1, grouped into a transaction among the write data WDATA transmitted from the host A10 to the controller A30, to be checked as a commit state in the controller A30, all of the plurality of first write data TRAN_WDATA1 should be normally transmitted from the host A10 to the controller A30 and be completely stored in the controller A30, and at the same time, there should be no abort request from the host A10. If even any one of the plurality of first write data TRAN_WDATA1 is not normally transmitted and stored or an abort request is received from the host A10, all of the first write data TRAN_WDATA1 are checked as an abort state in the controller A30.

Similarly, in order for the second write data TRAN_WDATA2, grouped into the second transaction among the write data WDATA transmitted from the host A10 to the memory system A20, to be checked as a commit state in the memory system A20, all of the plurality of second write data TRAN_WDATA2 should be normally transmitted from the host A10 to the memory system A20 and be completely stored in the memory system A20, and at the same time, there should be no abort request from the host A10. If even any one of the plurality of second write data TRAN_WDATA2 is not normally transmitted and stored or an abort request is issued from the host A10, all of the second write data TRAN_WDATA2 are checked as an abort state in the memory system A20.

For reference, the operation of managing the write data TRAN_WDATA1 or TRAN_WDATA2 grouped into a transaction, by classifying them into a commit state or an abort state as described above, may be generally referred to as an operation for ensuring the transaction.

The reason why the normal write buffer A31 allocated in the volatile memory 144 of the controller A30 is shown by not a solid line but the dotted line in FIG. 1 is because the controller A30 allocates the normal write buffer A31 when the normal write data NMAL_WDATA are inputted from the host A10. That is, in the case where the normal write data NMAL_WDATA are not inputted from the host A10, the controller A30 may not allocate the normal write buffer A31 in the volatile memory 144.

Similarly, the reason why the first write buffer A32 allocated in the volatile memory 144 of the controller A30 is shown not by a solid line but by a dotted line in FIG. 1 is because the controller A30 allocates the first write buffer A32 when the first write data TRAN_WDATA1 grouped into the first transaction are inputted from the host A10. That is, in the case where the first write data TRAN_WDATA1 grouped into the first transaction are not inputted from the host A10, the controller A30 may not allocate the first write buffer A32 in the volatile memory 144.

Similarly, the reason why the second write buffer A33 allocated in the volatile memory 144 of the controller A30 is shown not by a solid line but by a dotted line in FIG. 1 is because the controller A30 allocates the second write buffer A33 when the second write data TRAN_WDATA2 grouped into the second transaction are inputted from the host A10. That is, in the case where the second write data TRAN_WDATA2 grouped into the second transaction are not inputted from the host A10, the controller A30 may not allocate the second write buffer A33 in the volatile memory 144.

The controller A30 allocates the normal write buffer A31 which is fixed to a set or preset size, in the volatile memory 144, and then, stores the normal write data NMAL_WDATA inputted from the host A10, in the normal write buffer A31.

The size of the first write buffer A32 is variable according to the first total size information TTSIZE1.

In other words, in response to the first write data TRAN_WDATA1 grouped into the first transaction and the first total size information TTSIZE1 inputted from the host A10, the controller A30 checks a first determined size for the first write data TRAN_WDATA1 and allocates the first write buffer A32 by an amount of the first determined size in the volatile memory 144.

Therefore, the size of the first write buffer A32 may depend on the first total size information TTSIZE1.

For example, if the first determined size is checked as '5' in response to the first total size information TTSIZE1 at a first time, the controller A30 allocates a memory region capable of storing five pieces of the first write data TRAN_WDATA1 at the first time, in the volatile memory 144, and manages the memory region as the first write buffer A32.

For another example, if the first determined size is checked as '3' in response to the first total size information TTSIZE1 at a second time other than the first time, the controller A30 allocates a memory region capable of storing three pieces of the first write data TRAN_WDATA1 at the second time, in the volatile memory 144, and manages the memory region as the first write buffer A32.

Further, the size of the second write buffer A33 is variable according to the second total size information TTSIZE2.

In other words, in response to the second write data TRAN_WDATA2 grouped into the second transaction and the second total size information TTSIZE2 inputted from the host A10, the controller A30 checks a second determined size for the second write data TRAN_WDATA2 and allocates the second write buffer A33 by an amount of the second determined size in the volatile memory 144.

Therefore, the size of the second write buffer A33 may depend on the second total size information TTSIZE2.

For example, if the second determined size is checked as '6' in response to the second total size information TTSIZE2 at a third time, the controller A30 allocates a memory region capable of storing six pieces of the second write data TRAN_WDATA2 at the third time, in the volatile memory 144, and manages the memory region as the second write buffer A33.

For another example, if the second determined size is checked as '4' in response to the second total size information TTSIZE2 at a fourth time other than the third time, the controller A30 allocates a memory region capable of storing four pieces of the second write data TRAN_WDATA2 at the fourth time, in the volatile memory 144, and manages the memory region as the second write buffer A33.

Referring to FIG. 2, the detailed configuration of the memory system A20 described above with reference to FIG. 1 is shown.

First, the controller A30 included in the memory system A20 controls the first to third nonvolatile memory devices A40, A50 and A60 in response to a request from the host A10. For example, the controller A30 provides data read from the first to third nonvolatile memory devices A40, A50 and A60, to the host A10, and stores data provided from the host A10, in the first to third nonvolatile memory devices A40, A50 and A60. To this end, the controller A30 controls the operations of the first to third nonvolatile memory devices A40, A50 and A60, such as read, write, program and erase operations.

In detail, the controller A30 included in the memory system A20 includes a host interface (HOST INTERFACE) 132, a processor (PROCESSOR) 134, a memory 144, a first memory interface (MEMORY INTERFACE1) B10, a second memory interface (MEMORY INTERFACE2) B20 and a third memory interface (MEMORY INTERFACE3) B30.

The host interface 132 performs an operation of exchanging commands and data to be transferred between the controller A30 and the host A10, and may be configured to communicate with the host A10 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (DATA), small computer system interface (SCSI), enhanced small disk interface (ESDI), integrated drive electronics (IDE) and MIPI (mobile industry processor interface). The host interface 32 may be driven through firmware which is referred to as a host interface layer (HIL), as a region which exchanges data with the host A10.

The first to third memory interfaces 610, 620 and B30 serve as memory/storage interfaces which perform interfacing between the controller A30 and the first to third nonvolatile memory devices A40, A50 and A60, to allow the controller A30 to control the respective first to third nonvolatile memory devices A40, A50 and A60 in response to a request from the host A10. Each of the first to third memory interfaces 610, 620 and 630 generates control signals for controlling each of the first to third nonvolatile memory devices A40, A50 and A60 and processes data under the control of the processor 134, as a NAND flash controller (NFC) in the case where each of the first to third nonvolatile memory devices A40, A50 and A60 is a flash memory, in particular, a NAND flash memory.

Each of the first to third memory interfaces B10, B20 and B30 may support the operation of an interface which processes a command and data between the controller A30 and each of the first to third nonvolatile memory devices A40, A50 and A60, for example, a NAND flash interface, in particular, data input/output between the controller A30 and each of the first to third nonvolatile memory devices A40, A50 and A60, and may be driven through firmware which is referred to as a flash interface layer (FIL), as a region which exchanges data with each of the first to third nonvolatile memory devices A40, A50 and A60.

The memory 144 as the working memory of the memory system A20 and the controller A30 stores data for driving of the memory system A20 and the controller A30. In detail, the memory 144 temporarily stores data which should be managed, when the controller A30 controls the first to third nonvolatile memory devices A40, A50 and A60 in response to a request from the host A10, for example, when the controller A30 controls the operations of the first to third nonvolatile memory devices A40, A50 and A60, such as read, write, program and erase operations.

The memory 144 may be realized by a volatile memory. For example, the memory 144 may be realized by a static random access memory (SRAM) or a dynamic random access memory (DRAM).

The memory 144 may be disposed inside the controller A30 as illustrated in FIG. 2, or may be disposed outside the controller A30. In the case where the memory 144 is disposed outside the controller A30, the memory 144 should be realized by an external volatile memory to and from which data are inputted and outputted from and to the controller A30 through a separate memory interface (not shown).

The memory 144 stores data which should be managed in the course of controlling the operations of the first to third nonvolatile memory devices A40, A50 and A60. For such data storage, the memory 144 may include a program memory, a data memory, a write buffer/cache, a read buffer/cache, a data buffer/cache, a map buffer/cache, and the like.

The memory 144 described in FIG. 2 corresponds to the volatile memory 144 described above with reference to FIG. 1. In this regard, the volatile memory 144 described above with reference to FIG. 1 includes only a role as a write buffer among the roles of the memory 144 described in FIG. 2. Thus, as described above for the volatile memory 144 in FIG. 1, the normal write buffer A31, the first write buffer A32 and the second write buffer A33 are included in the memory 144 shown in FIG. 2.

The processor 134 controls the operations of the controller A30, and in particular, controls a program operation or a read operation for the first to third nonvolatile memory devices A40, A50 and A60, in response to a write request or a read request from the host A10. The processor 134 drives firmware which is referred to as a flash translation layer (PTL), to control general operations of the controller A30 for the first to third nonvolatile memory devices A40, A50 and A60. The processor 134 may be realized by a microprocessor or a central processing unit (CPU).

For instance, the controller A30 performs an operation requested from the host A10, in the first to third nonvolatile memory devices A40, A50 and A60, that is, performs a command operation corresponding to a command received from the host A10, with the first to third nonvolatile memory devices A40, A50 and A60, through the processor 134. The controller A30 may perform a foreground operation as a command operation corresponding to a command received from the host A10, for example, a program operation corresponding to a write command, a read operation corresponding to a read command, an erase operation corresponding to an erase command or a parameter set operation corresponding to a set parameter command or a set feature command as a set command.

The controller A30 may perform a background operation for the first to third nonvolatile memory devices A40, A50 and A60, through the processor 134. The background operation for the first to third nonvolatile memory devices A40, A50 and A60 may include an operation of copying data stored in a memory block among memory blocks MEMORY BLOCK<0, 1, 2, . . . > of the first to third nonvolatile memory devices A40, A50 and A60, to another memory block, for example, a garbage collection (GC) operation. The background operation for the first to third nonvolatile memory devices A40, A50 and A60 may include an operation of swapping stored data among the memory blocks MEMORY BLOCK<0, 1, 2, . . . > of the first to third nonvolatile memory devices A40, A50 and A60, for example, a wear leveling (WL) operation. The background operation for the first to third nonvolatile memory devices A40, A50 and A60 may include an operation of storing map data stored in the controller A30, in the memory blocks MEMORY BLOCK<0, 1, 2, . . . > of the first to third nonvolatile memory devices A40, A50 and A60, for example, a map flush operation. The background operation for the first to third nonvolatile memory devices A40, A50 and A60 may include a bad block management operation for the first to third nonvolatile memory devices A40, A50 and A60, for example, checking and processing a bad block among the plurality of memory blocks MEMORY BLOCK<0, 1, 2, . . . > included in the first to third nonvolatile memory devices A40, A50 and A60.

The controller A30 may generate and manage log data in correspondence to an operation of accessing the memory blocks MEMORY BLOCK<0, 1, 2, . . . > of the first to third nonvolatile memory devices A40, A50 and A60, through the processor 134. The operation of accessing the memory blocks MEMORY BLOCK<0, 1, 2, . . . > of the first to third nonvolatile memory devices A40, A50 and A60 includes performing of a foreground operation or a background operation for the memory blocks MEMORY BLOCK<0, 1, 2, . . . > of the first to third nonvolatile memory devices A40, A50 and A60.

In the processor 134 of the controller A30, a unit (not shown) for performing bad block management of the first to third nonvolatile memory devices A40, A50 and A60 may be included. Such unit performs a bad block management of identifying a bad block among the plurality of memory blocks MEMORY BLOCK<0, 1, 2, . . . > included in the first to third nonvolatile memory devices A40, A50 and A60 and processing the identified bad block as bad. The bad block management means that, in the case where the first to third nonvolatile memory devices A40, A50 and A60 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The controller A30 performs an operation of transmitting a command and data to be inputted/outputted between the controller A30 and the first to third nonvolatile memory devices A40, A50 and A60, through the processor 134. The command and data to be inputted/outputted between the controller A30 and the first to third nonvolatile memory devices A40, A50 and A60 may be transmitted from the host A10 to the controller A30 or may be generated inside the controller A30.

The controller A30 may perform, through the processor 134, the host interface 132 and the memory 144 described above, an operation of checking whether the write data WDATA inputted from the host A10 are grouped into a transaction and thereby classifying the normal write data NMAL_WDATA which are not grouped into a transaction and the first write data TRAN_WDATA1 and the second write data TRAN_WDATA2 which are grouped into transactions.

Also, the controller A30 may perform, through the processor 134, the host interface 132 and the memory 144 described above, an operation of allocating the normal write buffer A31 for temporarily storing the normal write data NMAL_WDATA not grouped into a transaction, in the memory 144.

Moreover, the controller A30 may perform, through the processor 134, the host interface 132 and the memory 144 described above, an operation of checking the first total size information TTSIZE1 inputted together with the first write data TRAN_WDATA1 grouped into the first transaction and thereby allocating the first write buffer A32 for temporarily storing the first write data TRAN_WDATA1, in the memory 144.

In addition, the controller A30 may perform, through the processor 134, the host interface 132 and the memory 144 described above, an operation of checking the second total size information TTSIZE2 inputted together with the second write data TRAN_WDATA2 grouped into the second transaction and thereby allocating the second write buffer A33 for temporarily storing the second write data TRAN_WDATA2, in the memory 144.

The first to third nonvolatile memory devices A40, A50 and A60 in the memory system A20 may retain stored data even though power is not supplied. In particular, the first to third nonvolatile memory devices A40, A50 and A60 in the memory system A20 may store write data WDATA provided from the host A10, through a write operation, and may provide read data (not shown) stored therein, to the host A10, through a read operation.

While the first to third nonvolatile memory devices A40, A50 and A60 may be realized by a nonvolatile memory such as a flash memory, for example, a NAND flash memory, it is to be noted that the first to third nonvolatile memory devices A40, A50 and A60 may be realized by any one memory among memories such as a phase change memory (phase change random access memory (PCRAM)), a resistive memory (resistive random access memory (RRAM (ReRAM))), a ferroelectric memory (ferroelectric random access memory (FRAM)) and a spin transfer torque magnetic memory (STT-RAM: spin transfer torque magnetic random access memory (STT-MRAM)).

The first to third nonvolatile memory devices A40, A50 and A60 includes the plurality of memory blocks MEMORY BLOCK<0, 1, 2, . . . >. In other words, the first to third nonvolatile memory devices A40, A50 and A60 may store write data WDATA provided from the host A10, in the memory blocks MEMORY BLOCK<0, 1, 2, . . . >, through a write operation, and may provide read data (not shown) stored in the memory blocks MEMORY BLOCK <0, 1, 2, . . . >, to the host A10, through a read operation.

Each of the memory blocks MEMORY BLOCK <0, 1, 2, . . . > included in the first to third nonvolatile memory devices A40, A50 and A60 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK <0, 1, 2, . . . > included in the first to third nonvolatile memory devices A40, A50 and A60 may be a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

FIGS. 3A to 3D and 4A to 4D are diagrams to assist in the explanation of the operation of the memory system in accordance with the first embodiment of the present disclosure.

First, a scheme in which the controller A30 classifies the write data WDATA inputted from the host A10 into the normal write data NMAL_WDATA, the first write data TRAN_WDATA1 and the second write data TRAN_WDATA2 will be described below.

In detail, when the write data WDATA are inputted to the memory system A20 from the host A10, write commands (not shown) respectively corresponding to pieces or items of the write data WDATA are inputted together, and transaction information (not shown) of the write data WDATA are included in the write commands, respectively.

In the transaction information of each of the write data WDATA, transaction ID (identification) information TRID, transaction commit information (not shown) and transaction abort information (not shown) may be included.

Therefore, the controller A30 included in the memory system A20 may check transaction ID information TRID in the transaction information included in the write commands, and thereby, may classify the write data WDATA, which are not grouped into a transaction, into the normal write data NMAL_WDATA, or the transaction write data TRAN_W-DATA1 or TRAN_WDATA2 which are grouped into a transaction.

For example, the controller A30 may classify write data WDATA of which transaction ID information TRID have the value of 1, among the write data WDATA inputted from the host A10, into the first write data TRAN_WDATA1.

Similarly, the controller A30 may classify write data WDATA of which transaction ID information TRID have the value of 2, among the write data WDATA inputted from the host A10, into the second write data TRAN_WDATA2.

Also, the controller A30 may classify write data WDATA of which transaction ID information TRID are not set to any value, among the write data WDATA inputted from the host A10, into the normal write data NMAL_WDATA.

For reference, the fact that transaction ID information TRID are not set to any value may mean a case where they are set to a defined initial value or a value that is meaningless as a transaction ID information.

In a first write command corresponding to start data of the write data TRAN_WDATA1 or TRAN_WDATA2 which are grouped into a transaction, there is additionally included the total size information TTSIZE1 or TTSIZE2 on a total size of the write data TRAN_WDATA1 or TRAN_WDATA2.

For example, in a first write command corresponding to start data of the first write data TRAN_WDATA1 which are grouped into the first transaction, there is additionally included the first total size information TTSIZE1 on a total size of the first write data TRAN_WDATA1.

Because of this fact, the controller A30 may check the first total size information TTSIZE1 by checking the first write command before the start data to be inputted first among the first write data TRAN_WDATA1 is inputted from the host A10.

That is, the controller A30 may check the first determined size of the first write data TRAN_WDATA1, by checking the first total size information TTSIZE1 before the first write data TRAN_WDATA1 are inputted from the host A10, and may allocate the first write buffer A32 by an amount of the first determined size in the volatile memory 144.

Thus, the controller A30 may allocate a memory region of the first determined size as the first write buffer A32 in the volatile memory 144, and then, may store the first write data TRAN_WDATA1 in the first write buffer A32.

Similarly, in a second write command corresponding to start data of the second write data TRAN_WDATA2 which are grouped into the second transaction, there is additionally included the second total size information TTSIZE2 on a total size of the second write data TRAN_WDATA2.

Because of this fact, the controller A30 may check the second total size information TTSIZE2 by checking the second write command before the start data to be inputted first among the second write data TRAN_WDATA2 is inputted from the host A10.

That is, the controller A30 may check the second determined size of the second write data TRAN_WDATA2, by checking the second total size information TTSIZE2 before the second write data TRAN_WDATA2 are inputted from the host A10, and may allocate the second write buffer A33 by an amount of the second determined size in the volatile memory 144.

Thus, the controller A30 may allocate a memory region of the second determined size as the second write buffer A33 in the volatile memory 144, and then, may store the second write data TRAN_WDATA2 in the second write buffer A33.

As described above, the controller A30 allocates the normal write buffer A31, the first write buffer A32 and the second write buffer A33 in the volatile memory 144. Then, at a specific time, the controller A30 flushes data from the normal write buffer A31, the first write buffer A32 and the second write buffer A33 into the nonvolatile memory devices A40, A50 and A60, through a flush operation for each of the normal write buffer A31, the first write buffer A32 and the second write buffer A33.

First, in the case of the normal write buffer A31, since it has a storage space which is fixed to the set size, the controller A30 performs a flush operation for the normal write buffer A31 at a time when the normal write data NMAL_WDATA are stored by the set size in the normal write buffer A31, and thereby, performs a normal write operation of storing the normal write data NMAL_WDATA stored in the normal write buffer A31, in the nonvolatile memory devices A40, A50 and A60.

In the case of the first write buffer A32, since it has the storage space of the first determined size corresponding to the first total size information TTSIZE1, the controller A30 checks whether the commit of the first write data TRAN_WDATA1 is completed or not, at a time when the first write data TRAN_WDATA1 are stored by the first predetermined size in the first write buffer A32. As a result of the checking, in the case where the commit of the first write data TRAN_WDATA1 stored in the first write buffer A32 is completed, the controller A30 performs a first flush operation for the first write buffer A32, and thereby, performs a first write operation of storing the first write data TRAN_WDATA1 stored in the first write buffer A32, in the nonvolatile memory devices A40, A50 and A60. After performing the first write operation, the controller A30 releases the first write buffer A32 in the volatile memory 144.

The controller A30 checks whether the first write data TRAN_WDATA1 are aborted or not, at each determined time, even before the first write data TRAN_WDATA1 are stored by the first determined size in the first write buffer A32. As a result of the checking, in the case where the first write data TRAN_WDATA1 stored in the first write buffer A32 are aborted, the controller A30 releases the first write buffer A32 in the volatile memory 144. The determined time at which whether the first write data TRAN_WDATA1 are aborted is checked may be a time at which each of the first write data TRAN_WDATA1 is inputted to the first write buffer A32.

In the case of the second write buffer A33, since it has the storage space of the second determined size corresponding to the second total size information TTSIZE2, the controller A30 checks whether the commit of the second write data TRAN_WDATA2 is completed or not, at a time when the second write data TRAN_WDATA2 are stored by the second determined size in the second write buffer A33. As a result of the checking, in the case where the commit of the second write data TRAN_WDATA2 stored in the second write buffer A33 is completed, the controller A30 performs a second flush operation for the second write buffer A33, and thereby, performs a second write operation of storing the second write data TRAN_WDATA2 stored in the second write buffer A33, in the nonvolatile memory devices A40, A50 and A60. After performing the second write operation, the controller A30 releases the second write buffer A33 in the volatile memory 144.

The controller A30 checks whether the second write data TRAN_WDATA2 are aborted or not, at each determined time, even before the second write data TRAN_WDATA2 are stored by the second determined size in the second write buffer A33. As a result of the checking, in the case where the second write data TRAN_WDATA2 stored in the second write buffer A33 are aborted, the controller A30 releases the second write buffer A33 in the volatile memory 144. The determined time at which whether the second write data TRAN_WDATA2 are aborted is checked may be a time at which each of the second write data TRAN_WDATA2 is inputted to the second write buffer A33.

In the case where a time at which the commit of the first transaction is checked and a time at which the commit of the second transaction is checked are within a set first time interval, the controller A30 synchronizes a time at which the first flush operation is performed for the first write buffer A32 in correspondence to the commit of the first transaction and a time at which the second flush operation is performed for the second write buffer A33 in correspondence to the commit of the second transaction.

In the case where a performance time of the first flush operation and a performance time of the second flush operation are synchronized, that means that a time at which the performance of the first write operation of storing the first write data TRAN_WDATA1 stored in the first write buffer A32 in the nonvolatile memory devices A40, A50 and A60 is started and a time at which the performance of the second write operation of storing the second write data TRAN_WDATA2 stored in the second write buffer A33 in the nonvolatile memory devices A40, A50 and A60 is started are synchronized. Hence, there is a high possibility that a time at which the performance of the first write operation is completed and a time at which the performance of the second write operation is completed do not have a large difference.

Thus, in the case where a performance time of the first flush operation and a performance time of the second flush operation are synchronized, the controller A30 may synchronize a time at which a first acknowledgement signal for notifying the host A10 that the performance of the first write operation linked to, and following, the first flush operation is completed is transferred to the host A10 and a time at which a second acknowledgement signal for notifying the host A10 that the performance of the second write operation linked to, and following, the second flush operation is completed is transferred to the host A10.

Of course, even in the case where a performance time of the first flush operation and a performance time of the second flush operation are synchronized, there may be a case where a time at which the performance of the first write operation is completed and a time at which the performance of the second write operation is completed have a large difference.

Thus, even in the case where a performance time of the first flush operation and a performance time of the second flush operation are synchronized, the controller A30 may synchronize, only in the case where a time at which a first acknowledgement signal for notifying the host A10 that the performance of the first write operation linked to the first flush operation is completed is generated and a time at which a second acknowledgement signal for notifying the host A10 that the performance of the second write operation linked to the second flush operation is completed is generated are within a set second time interval, a time at which the first acknowledgement signal is transferred to the host A10 and a time at which the second acknowledgement signal is transferred to the host A10.

In summary, the controller A30 may perform a first synchronization operation of synchronizing a time at which the first acknowledgement signal is transferred to the host A10 and a time at which the second acknowledgement signal is transferred to the host A10, by checking only whether a performance time of the first flush operation and a performance time of the second flush operation are synchronized.

Also, the controller A30 may perform a second synchronization operation of synchronizing a time at which the first acknowledgement signal is transferred to the host A10 and a time at which the second acknowledgement signal is transferred to the host A10, only in the case where a time at which the first acknowledgement signal is generated and a time at which the second acknowledgement signal is generated are within the set second time interval, even in the case where a performance time of the first flush operation and a performance time of the second flush operation are synchronized.

For reference, the first synchronization operation and the second synchronization operation are operations that cannot be performed simultaneously. Therefore, in the case where the controller A30 performs the first synchronization operation, the second synchronization operation is not performed. Conversely, in the case where the controller A30 performs the second synchronization operation, the first synchronization operation is not performed. Whether the controller A30 will perform the first synchronization operation or the second synchronization operation may be defined in advance depending on memory characteristics and a designer's choice.

The set first time interval serving as a reference for determining whether to synchronize a performance time of the first flush operation and a performance time of the second flush operation may be defined in advance depending on the characteristics of a memory system and a designer's choice.

Similarly, the set second time interval serving as a reference for determining whether to synchronize a time at which the first acknowledgement signal is transferred to the host A10 and a time at which the second acknowledgement signal is transferred to the host A10 may be defined in advance depending on the characteristics of a memory system and a designer's choice.

Referring to FIG. 3A, it may be assumed that total nine pieces of the write data WDATA are inputted from the host A10. A sequence in which the nine pieces of the write data WDATA are inputted from the host A10 is not defined in advance, and it may be assumed that they are inputted randomly.

In detail, by checking the respective transaction ID information TRID of the nine pieces of the write data WDATA inputted from the host A10, the controller A30 classifies three pieces of the first write data TRAN_WDATA1, two pieces of the second write data TRAN_WDATA2 and four pieces of the normal write data NMAL_WDATA.

In further detail, the controller A30 determines that, among the nine pieces of the write data WDATA inputted from the host A10, 0, 1 and 2 as three pieces of the write data WDATA of which transaction ID information TRID have the value of 1 are write data WDATA which are grouped into the first transaction, and classifies them into the first write data TRAN_WDATA1.

In a first write command (not shown) corresponding to 0 as start data among 0, 1 and 2 grouped into the first write data TRAN_WDATA1, the first total size information TTSIZE1 is included. Thus, the controller A30 may check from the first write command corresponding to 0 that the first total size information TTSIZE1 is 5. When the first total size information TTSIZE1 is checked as 5, the controller A30 allocates a memory region for a total of five pieces of the write data in the volatile memory 144, and manages the memory region as the first write buffer A32.

That is, the controller A30 may allocate the first write buffer A32 which has a space capable of storing five pieces of the write data, in the volatile memory 144, before 0 as the start data among 0, 1 and 2 grouped into the first write data TRAN_WDATA1 is inputted.

After all the nine pieces of the write data WDATA are inputted from the host A10, the controller A30 may check that only 0, 1 and 2 exist as the first write data TRAN_WDATA1 which are grouped into the first transaction. In other words, the controller A30 may check that, at a time when the nine pieces of the write data WDATA are inputted from the host A10, the first transaction is not completely committed yet (Transaction Uncomplete).

In summary, the controller A30 stores 0, 1 and 2 as the three pieces of the first write data TRAN_WDATA1 in the first write buffer A32 which has a space capable of storing a total of five pieces of the write data, and keeps a space available for two remaining pieces of the write data.

Further, the controller A30 determines that, among the nine pieces of the write data WDATA inputted from the host A10, 110 and 111 as two pieces of the write data WDATA of which transaction ID information TRID have the value of 2 are write data WDATA which are grouped into the second transaction, and classifies them into the second write data TRAN_WDATA2.

In a second write command (not shown) corresponding to 110 as start data between 110 and 111 grouped into the second write data TRAN_WDATA2, the second total size information TTSIZE2 is included. Thus, the controller A30 may check from the second write command corresponding to 110 that the second total size information TTSIZE2 is 4. When the second total size information TTSIZE2 is checked as 4, the controller A30 allocates a memory region for total four pieces of the write data in the volatile memory 144, and manages the memory region as the second write buffer A33.

That is, the controller A30 may allocate the second write buffer A33 which has a space capable of storing four pieces of the write data, in the volatile memory 144, before 110 as the start data between 110 and 111 grouped into the second write data TRAN_WDATA2 is inputted.

After all the nine pieces of the write data WDATA are inputted from the host A10, the controller A30 may check that only 110 and 111 exist as the second write data TRAN_WDATA2 which are grouped into the second transaction. In other words, the controller A30 may check that, at a time when the nine pieces of the write data WDATA are inputted from the host A10, the second transaction is not completely committed yet (Transaction Uncomplete).

In summary, the controller A30 stores 110 and 111 as the two pieces of the second write data TRAN_WDATA2 in the second write buffer A33 which has the space capable of storing a total of four pieces of the write data, and keeps a space available for two remaining pieces of the write data.

Moreover, the controller A30 determines that, among the nine pieces of the write data WDATA inputted from the host A10, A, B, C and D as write data WDATA of which transaction ID information TRID are not set to any value are write data WDATA which are not grouped into a transaction, and classifies them into the normal write data NMAL_WDATA.

The transaction ID information TRID included in a write command (not shown) corresponding to A as start data among A, B, C and D grouped into the normal write data NMAL_WDATA is not set to any value.

Therefore, when it is checked that the transaction ID information TRID included in the write command corresponding to A is not set to any value, the controller A30 allocates a memory region for total 10 pieces of the write data in the volatile memory 144, and manages the memory region as the normal write buffer A31.

The reason why the controller A30 allocates a space of the volatile memory 144 for 10 pieces of the write data as the normal write buffer A31 is because the set size as a reference for the normal write buffer A31 is assumed as 10. Hence, in the case where the set size is 20, the controller A30 may allocate a space of the volatile memory 144 for 20 pieces of the write data as the normal write buffer A31.

In summary, the controller A30 stores A, B, C and D as the four pieces of the normal write data NMAL_WDATA in the normal write buffer A31 which has the space capable of storing a total of 10 pieces of the write data, and keeps a space available for six remaining pieces of the write data empty.

In the state of FIG. 3A in which the nine pieces of the write data WDATA are inputted as described above, since the normal write data NMAL_WDATA are not full in the normal write buffer A31, it is not a case in which the normal write buffer A31 should be flushed. Similarly, since none of the first transaction and the second transaction are completed, it is not a case in which the first write buffer A32 and the second write buffer A33 should be flushed.

Figure 3B:
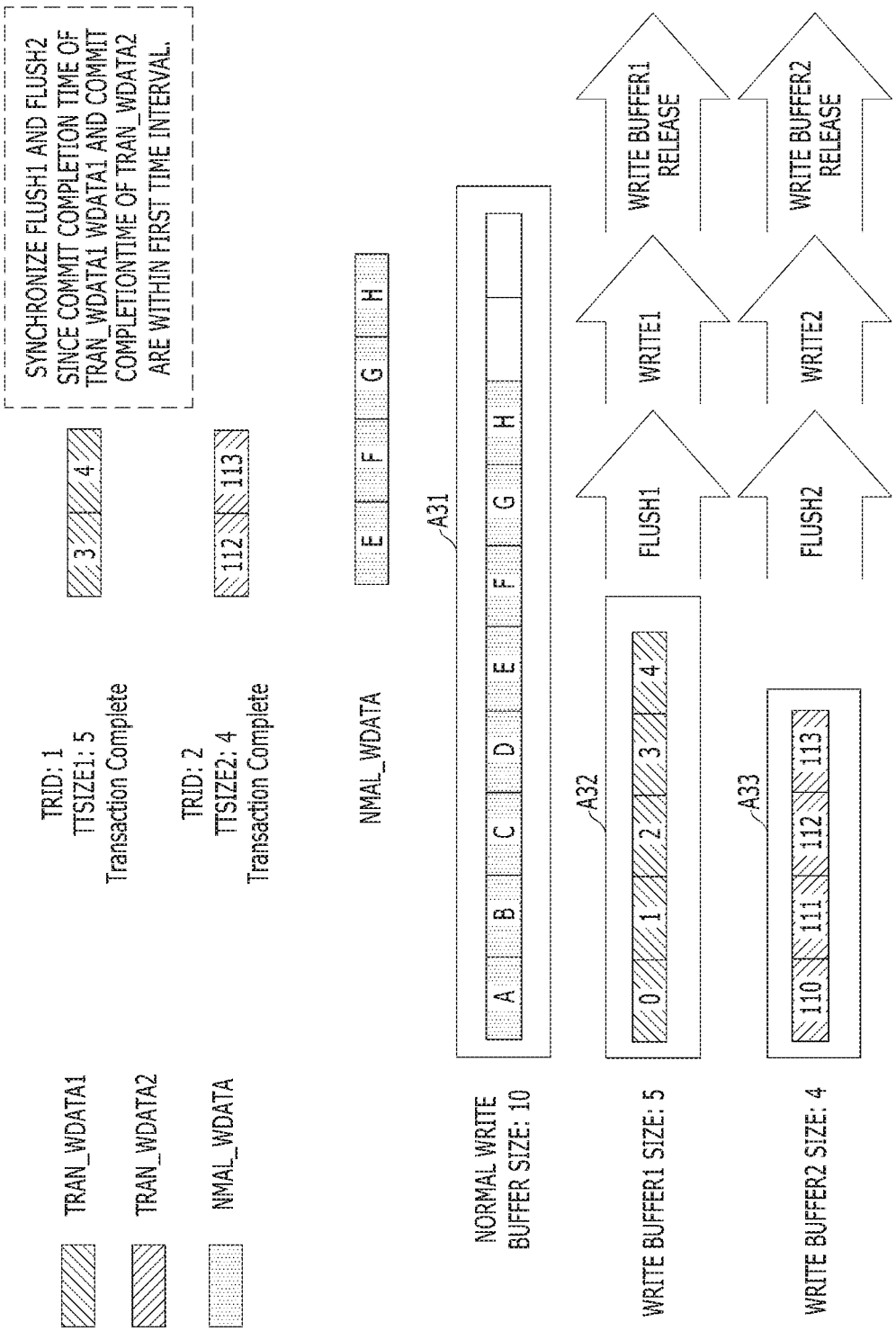

Referring to FIG. 3B in succession to the state shown in FIG. 3A, it may be assumed that total eight pieces of the write data WDATA are inputted from the host A10. A sequence in which the eight pieces of the write data WDATA are inputted from the host A10 is not defined in advance, and it may be assumed that they are inputted randomly.

In detail, by checking the respective transaction ID information TRID of the eight pieces of the write data WDATA inputted from the host A10, the controller A30 classifies two pieces of the first write data TRAN_WDATA1, two pieces of the second write data TRAN_WDATA2 and four pieces of the normal write data NMAL_WDATA.

In further detail, the controller A30 determines that, among the eight pieces of the write data WDATA inputted from the host A10, 3 and 4 as two pieces of the write data WDATA of which transaction ID information TRID have the value of 1 are write data WDATA which are grouped into the first transaction, and classifies them into the first write data TRAN_WDATA1.

The first write buffer A32 for storing the first write data TRAN_WDATA1 which are grouped into the first transaction has already been allocated in the volatile memory 144 through the operation described above with reference to FIG. 3A.

Therefore, the controller A30 immediately stores 3 and 4 grouped into the first write data TRAN_WDATA1 in the first write buffer A32 without a separate additional operation. Through the operation described above with reference to FIG. 3A, the first write buffer A32 has been allocated in the volatile memory 144 as the space capable of storing a total of five pieces of the write data, has stored only 0, 1 and 2 as three pieces of the write data, and has kept space available for two other pieces of the write data.

Because of this fact, the controller A30 immediately stores 3 and 4 grouped into the first write data TRAN_WDATA1 in the first write buffer A32 without a separate additional operation, as in FIG. 3B. As 3 and 4 grouped into the first write data TRAN_WDATA1 are stored in the first write buffer A32 in FIG. 3B, the entire space of the first write buffer A32, that is, the space capable of storing five pieces of the write data, becomes full.

At a time when the entire space of the first write buffer A32 becomes full as all of 0, 1, 2, 3 and 4 as the first write data TRAN_WDATA1 grouped into the first transaction are stored in the first write buffer A32, the controller A30 may check that it is a state in which the commit of the first transaction is completed (Transaction Complete).

Further, the controller A30 determines that, among the eight pieces of the write data WDATA inputted from the host A10, 112 and 113 as two pieces of the write data WDATA of which transaction ID information TRID have the value of 2 are write data WDATA which are grouped into the second transaction, and classifies them into the second write data TRAN_WDATA2.

The second write buffer A33 for storing the second write data TRAN_WDATA2 which are grouped into the second transaction has already been allocated in the volatile memory 144 through the operation described above with reference to FIG. 3A.

Therefore, the controller A30 immediately stores 112 and 113 grouped into the second write data TRAN_WDATA2 in the second write buffer A33 without a separate additional operation. Through the operation described above with reference to FIG. 3A, the second write buffer A33 has been allocated in the volatile memory 144 as the space capable of storing total four pieces of the write data, has stored only 110 and 111 as two pieces of the write data, and has kept the space available for storing two other pieces of the write data.

Because of this fact, the controller A30 immediately stores 112 and 113 grouped into the second write data TRAN_WDATA2 in the second write buffer A33 without a separate additional operation, as in FIG. 3B. As 112 and 113 grouped into the second write data TRAN_WDATA2 are stored in the second write buffer A33 in FIG. 3B, the entire space of the second write buffer A33, that is, the space capable of storing four pieces of the write data, becomes full.

At a time when the entire space of the second write buffer A33 becomes full as all of 110, 111, 112 and 113 as the second write data TRAN_WDATA2 grouped into the second transaction are stored in the second write buffer A33, the controller A30 may check that it is a state in which the commit of the second transaction is completed (Transaction Complete).

Moreover, the controller A30 determines that, among the eight pieces of the write data WDATA inputted from the host A10, E, F, G and H as write data WDATA of which transaction ID information TRID are not set to any value are write data WDATA which are not grouped into a transaction, and classifies them into the normal write data NMAL_WDATA.

The normal write buffer A31 for storing the normal write data NMAL_WDATA which are not grouped into a transaction has already been allocated in the volatile memory 144 through the operation described above with reference to FIG. 3A.

Therefore, the controller A30 immediately stores E, F, G and H grouped into the normal write data NMAL_WDATA in the normal write buffer A31 without a separate additional operation. Through the operation described above with reference to FIG. 3A, the normal write buffer A31 has been allocated in the volatile memory 144 as the space capable of storing total 10 pieces of the write data, has stored only A, B, C and D as four pieces of the write data, and has kept a space available for storing six pieces of the write data.

Because of this fact, the controller A30 immediately stores E, F, G and H grouped into the normal write data NMAL_WDATA in the normal write buffer A31 without a separate additional operation, as in FIG. 3B. As E, F, G and H grouped into the normal write data NMAL_WDATA are stored in the normal write buffer A31 in FIG. 3B, A, B, C, D, E, F, G and H as eight pieces of the normal write data NMAL_WDATA are stored in the normal write buffer A31 which has the space capable of storing total 10 pieces of the write data, and an empty space available for storing two remaining pieces of the normal write data NMAL_WDATA.

In the state of FIG. 3B in succession to the state shown in FIG. 3A, in which the eight pieces of the write data WDATA are additionally inputted, since the normal write data NMAL_WDATA are not full in the normal write buffer A31, it is not a case in which the normal write buffer A31 should be flushed. However, since both the first transaction and the second transaction are commit-completed, it is a case in which the first write buffer A32 and the second write buffer A33 should be flushed.

When the state shown in FIG. 3A is changed to the state shown in FIG. 3B, since it is assumed that an input sequence of the write data WDATA inputted from the host A10 is random, a time at which the commit of the first transaction is completed may precede a time at which the commit of the second transaction is completed, or a time at which the commit of the second transaction is completed may precede a time at which the commit of the first transaction is completed.

In the case where a time at which the commit of the first transaction is completed precedes a time at which the commit of the second transaction is completed, it may be assumed that the commit of the second transaction is completed within the set first time interval from the time at which the commit of the first transaction is completed.

Conversely, in the case where a time at which the commit of the second transaction is completed precedes a time at which the commit of the first transaction is completed, it may be assumed that the commit of the first transaction is completed within the set first time interval from the time at which the commit of the second transaction is completed.

In this way, in the case where difference between a time at which the commit of the first transaction is completed and a time at which the commit of the second transaction is completed are within the set first time interval, the controller A30 synchronizes a time at which a first flush operation FLUSH1 is performed for the first write buffer A32 in correspondence to the commit of the first transaction and a time at which a second flush operation FLUSH2 is performed for the second write buffer A33 in correspondence to the commit of the second transaction.

In this way, by synchronizing a performance time of the first flush operation FLUSH1 and a performance time of the second flush operation FLUSH2, it may be regarded that a time at which the performance of a first write operation WRITE1 of storing the first write data TRAN_WDATA1 stored in the first write buffer A32 in the nonvolatile memory devices A40, A50 and A60 is started and a time at which the performance of a second write operation WRITE2 of storing the second write data TRAN_WDATA2 stored in the second write buffer A33 in the nonvolatile memory devices A40, A50 and A60 is started are synchronized.

Figure 4A:
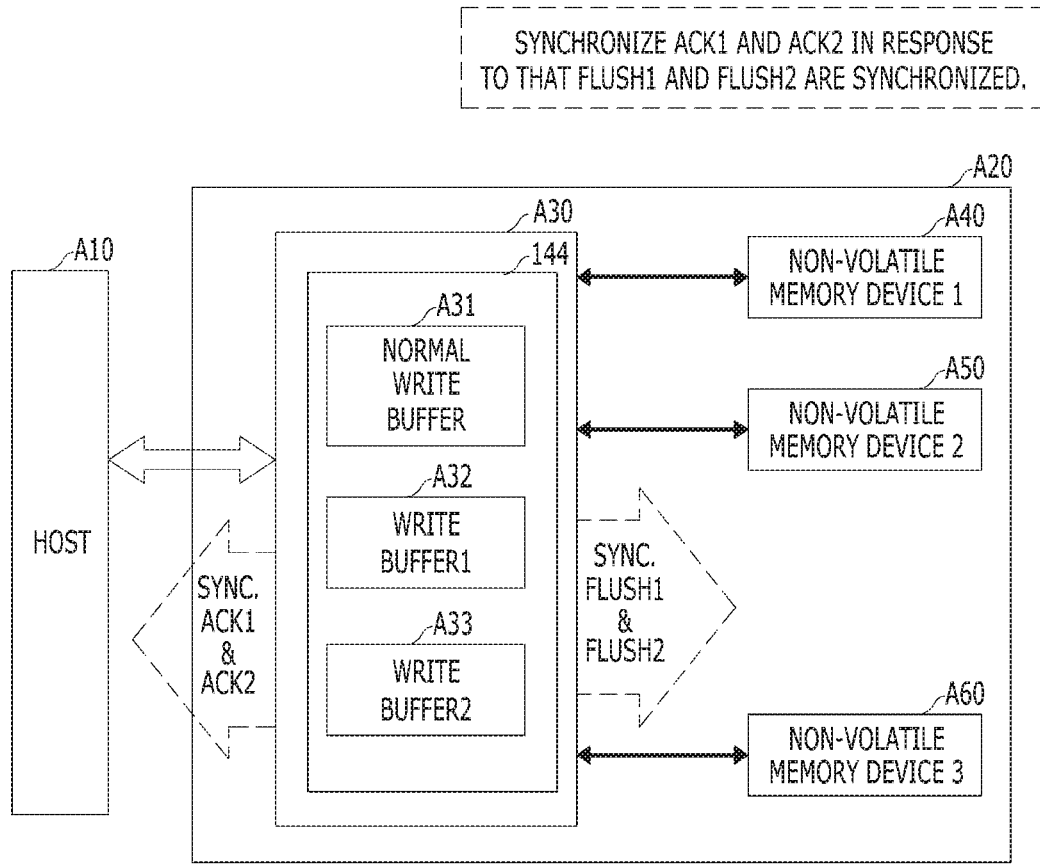

Accordingly, as in the case of a first synchronization operation shown in FIG. 4A, the controller A30 may synchronize, when a performance time of the first flush operation FLUSH1 and a performance time of the second flush operation FLUSH2 are synchronized, a time at which a first acknowledgement signal ACK1 for notifying the host A10 that the performance of the first write operation WRITE1 linked to the first flush operation FLUSH1 is completed is transferred to the host A10 and a time at which a second acknowledgement signal ACK2 for notifying the host A10 that the performance of the second write operation WRITE2 linked to the second flush operation FLUSH2 is completed is transferred to the host A10.

Figure 4B:
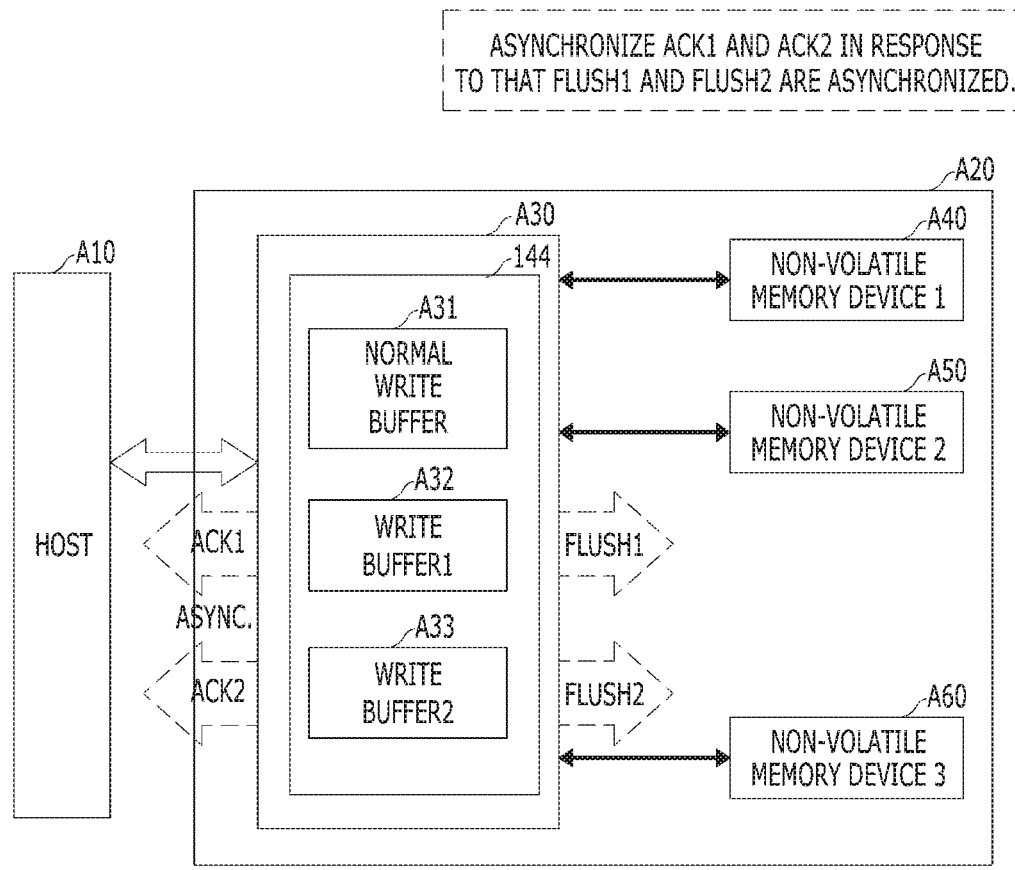

Of course, as in the case of a first synchronization operation shown in FIG. 4B, the controller A30 may not synchronize, when a performance time of the first flush operation FLUSH1 and a performance time of the second flush operation FLUSH2 are not synchronized, a time at which a first acknowledgement signal ACK1 for notifying the host A10 that the performance of the first write operation WRITE1 linked to the first flush operation FLUSH1 is completed is transferred to the host A10 and a time at which a second acknowledgement signal ACK2 for notifying the host A10 that the performance of the second write operation WRITE2 linked to the second flush operation FLUSH2 is completed is transferred to the host A10.

Figure 4C:
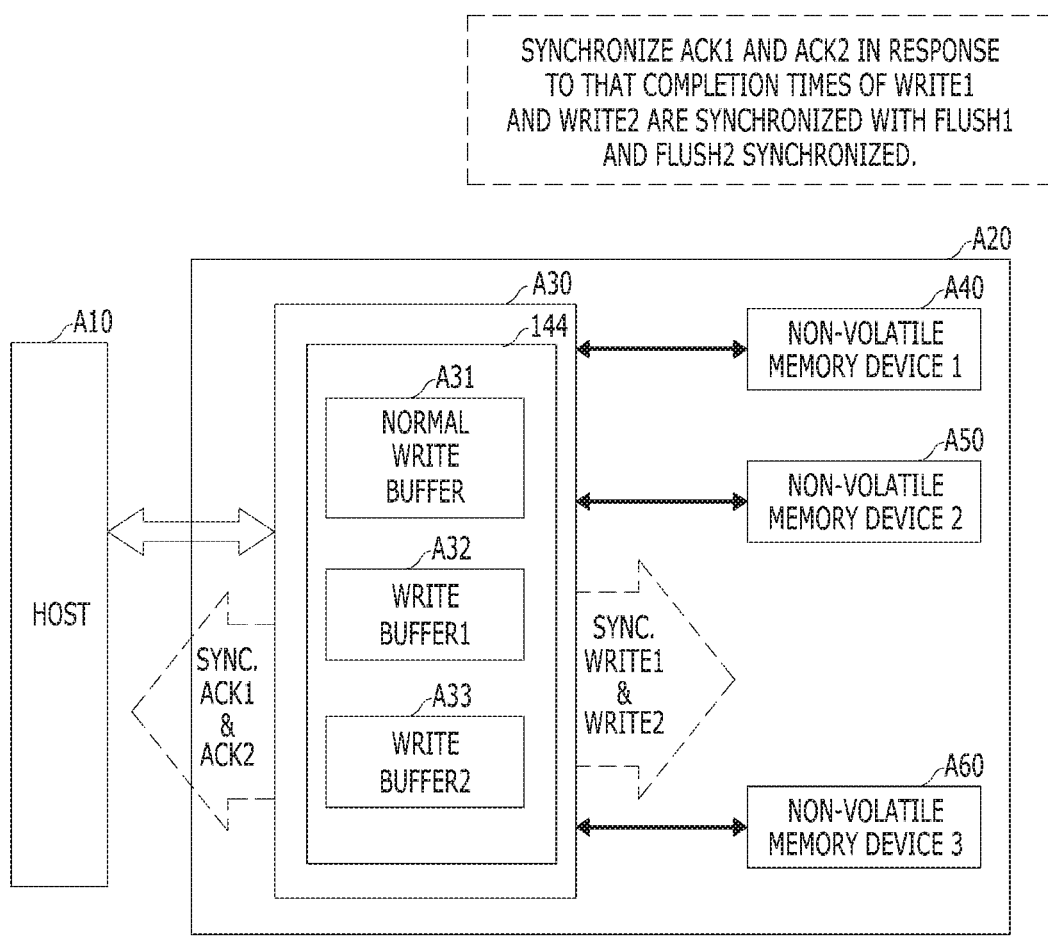

Also, as in the case of a second synchronization operation shown in FIG. 4C, even in the case where a performance time of the first flush operation FLUSH1 and a performance time of the second flush operation FLUSH2 are synchronized, only in the case where a time at which a first acknowledgement signal ACK1 for notifying the host A10 that the performance of the first write operation WRITE1 linked to the first flush operation FLUSH1 is completed is generated and a time at which a second acknowledgement signal ACK2 for notifying the host A10 that the performance of the second write operation WRITE2 linked to the second flush operation FLUSH2 is completed is generated are within the set second time interval, the controller A30 may synchronize a time at which the first acknowledgement signal ACK1 is transferred to the host A10 and a time at which the second acknowledgement signal ACK2 is transferred to the host A10.

Figure 4D:
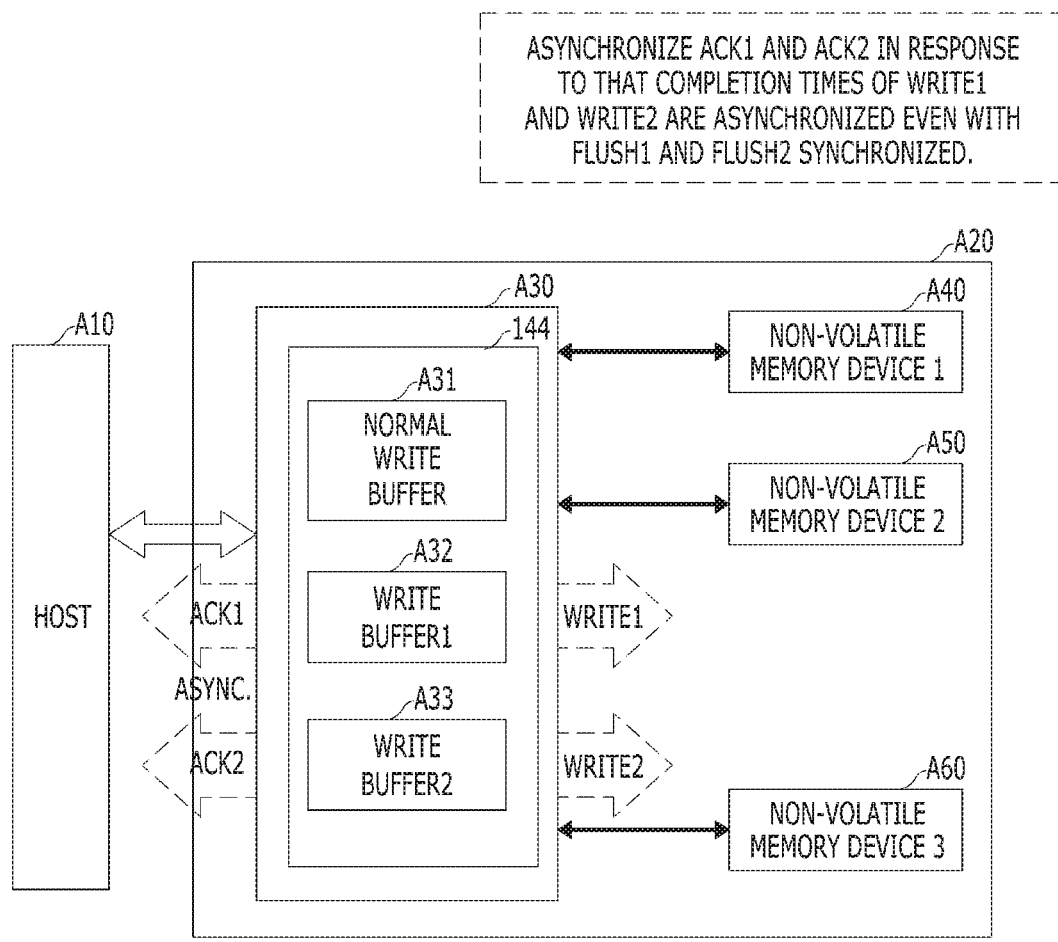

Of course, as in the case of a second synchronization operation shown in FIG. 4D, even in the case where a performance time of the first flush operation FLUSH1 and a performance time of the second flush operation FLUSH2 are synchronized, in the case where a time at which a first acknowledgement signal ACK1 for notifying the host A10 that the performance of the first write operation WRITE1 linked to the first flush operation FLUSH1 is completed is generated and a time at which a second acknowledgement signal ACK2 for notifying the host A10 that the performance of the second write operation WRITE2 linked to the second flush operation FLUSH2 is completed is generated are not within the set second time interval, the controller A30 may not synchronize a time at which the first acknowledgement signal ACK1 is transferred to the host A10 and a time at which the second acknowledgement signal ACK2 is transferred to the host A10.

Referring again to FIG. 3B, after completing the performance of the first write operation WRITE1, the controller A30 releases the first write buffer A32 in the volatile memory 144 (WRITE BUFFER1 RELEASE). That is, the controller A30 releases the first write buffer A32 which is allocated in the volatile memory 144 when the first write data TRAN_WDATA1 are inputted from the host A10, in the volatile memory 144 after performing the first write operation WRITE1.

Similarly, after completing the performance of the second write operation WRITE2, the controller A30 releases the second write buffer A33 in the volatile memory 144 (WRITE BUFFER2 RELEASE). That is, the controller A30 releases the second write buffer A33 which is allocated in the volatile memory 144 when the second write data TRAN_WDATA2 are inputted from the host A10, in the volatile memory 144 after performing the second write operation WRITE2.

Referring to FIG. 3C in succession to the state shown in FIG. 3A, it may be assumed that total seven pieces of the write data WDATA are inputted from the host A10. A sequence in which the seven pieces of the write data WDATA are inputted from the host A10 is not defined in advance, and it may be assumed that they are inputted randomly.

In detail, by checking the respective transaction ID information TRID of the seven pieces of the write data WDATA inputted from the host A10, the controller A30 classifies one piece of the first write data TRAN_WDATA1, two pieces of the second write data TRAN_WDATA2 and four pieces of the normal write data NMAL_WDATA.

In further detail, the controller A30 determines that, among the seven pieces of the write data WDATA inputted from the host A10, 3 as one piece of the write data WDATA of which transaction ID information TRID has the value of 1 is write data WDATA which is grouped into the first transaction, and classifies it into the first write data TRAN_WDATA1.

The first write buffer A32 for storing the first write data TRAN_WDATA1 which are grouped into the first transaction has already been allocated in the volatile memory 144 through the operation described above with reference to FIG. 3A.

Therefore, the controller A30 immediately stores 3 grouped into the first write data TRAN_WDATA1 in the first write buffer A32 without a separate additional operation. Through the operation described above with reference to FIG. 3A, the first write buffer A32 has been allocated in the volatile memory 144 as the space capable of storing total five pieces of the write data, has stored only 0, 1 and 2 as three pieces of the write data, and has kept space available for storing two other pieces of the write data.

Because of this fact, the controller A30 immediately stores grouped into the first write data TRAN_WDATA1 in the first write buffer A32 without a separate additional operation, as in FIG. 3C. As 3 grouped into the first write data TRAN_WDATA1 is stored in the first write buffer A32 in FIG. 3C, 0, 1, 2 and 3 as four pieces of the first write data TRAN_WDATA1 are stored in the first write buffer A32 which has the space capable of storing total five pieces of the write data, and a space available for storing one remaining piece of the write data.

As only 0, 1, 2 and 3 as the first write data TRAN_WDATA1 grouped into the first transaction are stored in the first write buffer A32, the controller A30 may check that a remaining space exists in the first write buffer A32 and thus it is a state in which the commit of the first transaction is not completed (Transaction Uncomplete).

Further, the controller A30 determines that, among the seven pieces of the write data WDATA inputted from the host A10, 112 and 113 as two pieces of the write data WDATA of which transaction ID information TRID have the value of 2 are write data WDATA which are grouped into the second transaction, and classifies them into the second write data TRAN_WDATA2.

The second write buffer A33 for storing the second write data TRAN_WDATA2 which are grouped into the second transaction has already been allocated in the volatile memory 144 through the operation described above with reference to FIG. 3A.

Therefore, the controller A30 immediately stores 112 and 113 grouped into the second write data TRAN_WDATA2 in the second write buffer A33 without a separate additional operation. Through the operation described above with reference to FIG. 3A, the second write buffer A33 has been allocated in the volatile memory 144 as the space capable of storing total four pieces of the write data, has stored only 110 and 111 as two pieces of the write data, and has kept space available for two other pieces of the write data.

Because of this fact, the controller A30 immediately stores 112 and 113 grouped into the second write data TRAN_WDATA2 in the second write buffer A33 without a separate additional operation, as in FIG. 3C. As 112 and 113 grouped into the second write data TRAN_WDATA2 are stored in the second write buffer A33 in FIG. 3C, the entire space of the second write buffer A33, that is, the space capable of storing four pieces of the write data, becomes full.

At a time when the entire space of the second write buffer A33 becomes full as all of 110, 111, 112 and 113 as the second write data TRAN_WDATA2 grouped into the second transaction are stored in the second write buffer A33, the controller A30 may check that it is a state in which the commit of the second transaction is completed (Transaction Complete).

Moreover, the controller A30 determines that, among the seven pieces of the write data WDATA inputted from the host A10, E, F, G and H as write data WDATA of which transaction ID information TRID are not set to any value are write data WDATA which are not grouped into a transaction, and classifies them into the normal write data NMAL_WDATA.

The normal write buffer A31 for storing the normal write data NMAL_WDATA which are not grouped into a transaction has already been allocated in the volatile memory 144 through the operation described above with reference to FIG. 3A.

Therefore, the controller A30 immediately stores E, F, G and H grouped into the normal write data NMAL_WDATA in the normal write buffer A31 without a separate additional operation. Through the operation described above with reference to FIG. 3A, the normal write buffer A31 has been allocated in the volatile memory 144 as the space capable of storing total 10 pieces of the write data, has stored only A, B, C and D as four pieces of the write data, and has kept space available for six other pieces of the write data.

Because of this fact, the controller A30 immediately stores E, F, G and H grouped into the normal write data NMAL_WDATA in the normal write buffer A31 without a separate additional operation, as in FIG. 3C. As E, F, G and H grouped into the normal write data NMAL_WDATA are stored in the normal write buffer A31 in FIG. 3C, A, B, C, D, E, F, G and H as eight pieces of the normal write data NMAL_WDATA are stored in the normal write buffer A31 which has the space capable of storing total 10 pieces of the write data, and thus space available for storing two remaining pieces of the write data.

In the state of FIG. 3C in succession to the state shown in FIG. 3A, in which the seven pieces of the write data WDATA are additionally inputted, since the normal write data NMAL_WDATA are not full in the normal write buffer A31, it is not a case in which the normal write buffer A31 should be flushed. Also, since the commit of the first transaction is not completed, it is not a case in which the first write buffer A32 should be flushed. However, since the commit of the second transaction is completed, it is a case in which the second write buffer A33 should be flushed.

When the state shown in FIG. 3A is changed to the state shown in FIG. 3C, the first transaction maintains a state in which the commit thereof is not completed, and the second transaction is converted into a state in which the commit thereof is completed. Therefore, in the state as shown in FIG. 3C, it may not be seen that the commit of the first transaction is to be completed at which time, but it may be seen that a time at which the commit of the second transaction is completed precedes a time at which the commit of the first transaction is completed. Through this, it may be assumed that the commit of the first transaction is not completed within the set first time interval from the time at which the commit of the second transaction is completed.

In this way, in the case where a time at which the commit of the first transaction is completed and a time at which the commit of the second transaction is completed are not within the set first time interval, the controller A30 may not synchronize a time at which a first flush operation FLUSH1 is performed for the first write buffer A32 in correspondence to the commit of the first transaction and a time at which a second flush operation FLUSH2 is performed for the second write buffer A33 in correspondence to the commit of the second transaction.

In other words, after the second flush operation FLUSH2 for the second write buffer A33 corresponding to the second transaction which is commit-completed is performed, when the commit of the first transaction is completed at a certain time that is not within the set first time interval, the first flush operation FLUSH1 for the first write buffer A32 corresponding to the first transaction may be performed.

In this way, by not synchronizing a performance time of the first flush operation FLUSH1 and a performance time of the second flush operation FLUSH2, it may be regarded that the controller A30 may not synchronize a time at which the performance of a first write operation WRITE1 of storing the first write data TRAN_WDATA1 stored in the first write buffer A32 in the nonvolatile memory devices A40, A50 and A60 is started and a time at which the performance of the second write operation WRITE2 of storing the second write data TRAN_WDATA2 stored in the second write buffer A33 in the nonvolatile memory devices A40, A50 and A60 is started. Hence, there is a high possibility that a time at which the performance of the first write operation is completed and a time at which the performance of the second write operation is completed have a large difference.

Thus, as in the case of the first synchronization operation shown in FIG. 4B, the controller A30 may not synchronize, when a performance time of the first flush operation FLUSH1 and a performance time of the second flush operation FLUSH2 are not synchronized, a time at which a first acknowledgement signal ACK1 for notifying the host A10 that the performance of the first write operation WRITE1 linked to the first flush operation FLUSH1 is completed is transferred to the host A10 and a time at which a second acknowledgement signal ACK2 for notifying the host A10 that the performance of the second write operation WRITE2 linked to the second flush operation FLUSH2 is completed is transferred to the host A10.

Because it is assumed in FIG. 3C that a performance time of the first flush operation FLUSH1 and a performance time of the second flush operation FLUSH2 are not synchronized, it is impossible that the second synchronization operation shown in FIGS. 4C and 4D is performed.

Referring again to FIG. 3C, after completing the performance of the second write operation WRITE2, the controller A30 releases the second write buffer A33 in the volatile memory 144 (WRITE BUFFER2 RELEASE), That is, the controller A30 releases the second write buffer A33 which is allocated in the volatile memory 144 when the second write data TRAN_WDATA2 are inputted from the host A10, in the volatile memory 144 after performing the second write operation WRITE2.

Conversely, since it is a state in which the first flush operation FLUSH1 and the following first write operation WRITE1 are not performed for the first write buffer A32, the first write buffer A32 may continuously maintain the state in which it is allocated in the volatile memory 144.

Figure 3D:
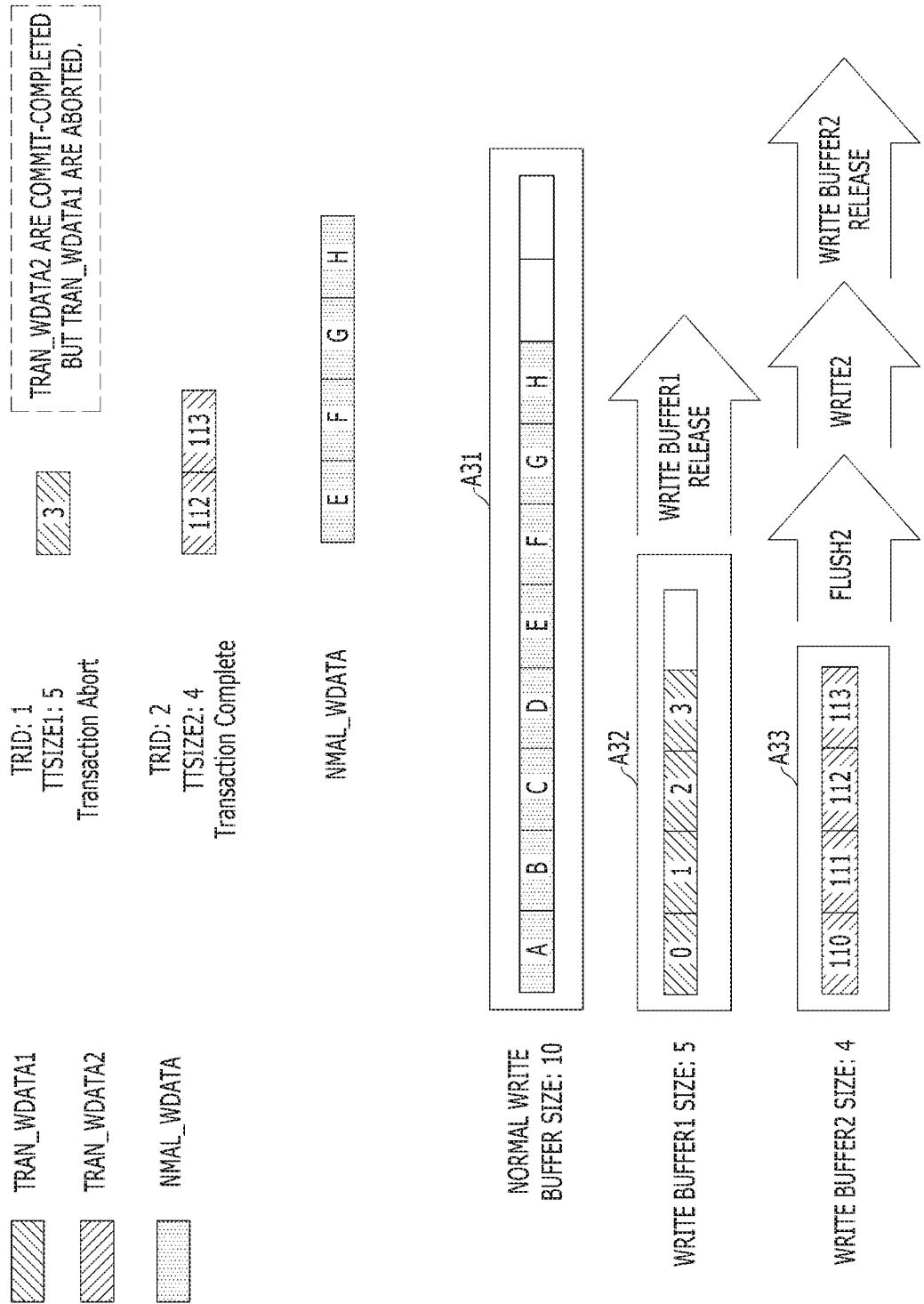

Referring to FIG. 3D in succession to the state shown in FIG. 3A, it may be assumed that total seven pieces of the write data WDATA are inputted from the host A10. A sequence in which the seven pieces of the write data WDATA are inputted from the host A10 is not defined in advance, and it may be assumed that they are inputted randomly.

In detail, by checking the respective transaction ID information TRID of the seven pieces of the write data WDATA inputted from the host A10, the controller A30 classifies one piece of the first write data TRAN_WDATA1, two pieces of the second write data TRAN_WDATA2 and four pieces of the normal write data NMAL_WDATA.

In further detail, the controller A30 determines that, among the seven pieces of the write data WDATA inputted from the host A10, 3 as one piece of the write data WDATA of which transaction ID information TRID has the value of 1 is write data WDATA which is grouped into the first transaction, and classifies it into the first write data TRAN_WDATA1.

The first write buffer A32 for storing the first write data TRAN_WDATA1 which are grouped into the first transaction has already been allocated in the volatile memory 144 through the operation described above with reference to FIG. 3A.

Therefore, the controller A30 immediately stores 3 grouped into the first write data TRAN_WDATA1 in the first write buffer A32 without a separate additional operation. Through the operation described above with reference to FIG. 3A, the first write buffer A32 has been allocated in the volatile memory 144 as the space capable of storing total five pieces of the write data, has stored only 0, 1 and 2 as three pieces of the write data, and has kept space available for storing two other pieces of the write data.

Because of this fact, the controller A30 immediately stores 3 grouped into the first write data TRAN_WDATA1 in the first write buffer A32 without a separate additional operation, as in FIG. 3D. As 3 grouped into the first write data TRAN_WDATA1 is stored in the first write buffer A32 in FIG. 3D, 0, 1, 2 and 3 as four pieces of the first write data TRAN_WDATA1 are stored in the first write buffer A32 which has the space capable of storing a total of five pieces of the write data, and thus a space remains available for storing one remaining piece of the write data.

At a time when 0, 2 and 3 as the first write data TRAN_WDATA1 grouped into the first transaction are stored in the first write buffer A32, the controller A30 may receive an information that the first transaction is aborted, from the host A10. For example, after 3 grouped into the first write data TRAN_WDATA1 is stored in the first write buffer A32, a separate command including the abort information of the first transaction may be transmitted from the host A10. According to this fact, it may be checked that, in a state in which only 0, 1, 2 and 3 as the first write data TRAN_WDATA1 grouped into the first transaction are stored in the first write buffer A32, the first transaction is aborted (Transaction Abort).

Further, the controller A30 determines that, among the seven pieces of the write data WDATA inputted from the host A10, 112 and 113 as two pieces of the write data WDATA of which transaction ID information TRID have the value of 2 are write data WDATA which are grouped into the second transaction, and classifies them into the second write data TRAN_WDATA2.

The second write buffer A33 for storing the second write data TRAN_WDATA2 which are grouped into the second transaction has already been allocated in the volatile memory 144 through the operation described above with reference to FIG. 3A.

Therefore, the controller A30 immediately stores 112 and 113 grouped into the second write data TRAN_WDATA2 in the second write buffer A33 without a separate additional operation. Through the operation described above with reference to FIG. 3A, the second write buffer A33 has been allocated in the volatile memory 144 as the space capable of storing total four pieces of the write data, has stored only 110 and 111 as two pieces of the write data, and has kept space available for storing two other pieces of the write data.

Because of this fact, the controller A30 immediately stores 112 and 113 grouped into the second write data TRAN_WDATA2 in the second write buffer A33 without a separate additional operation, as in FIG. 3D. As 112 and 113 grouped into the second write data TRAN_WDATA2 are stored in the second write buffer A33 in FIG. 3D, the entire space of the second write buffer A33, that is, the space capable of storing four pieces of the write data, becomes full.

At a time when the entire space of the second write buffer A33 becomes full as all of 110, 111, 112 and 113 as the second write data TRAN_WDATA2 grouped into the second transaction are stored in the second write buffer A33, the controller A30 may check that it is a state in which the commit of the second transaction is completed (Transaction Complete).

Moreover, the controller A30 determines that, among the seven pieces of the write data WDATA inputted from the host A10, E, F, G and H as write data WDATA of which transaction ID information TRID are not set to any value are write data WDATA which are not grouped into a transaction, and classifies them into the normal write data NMAL_WDATA.

The normal write buffer A31 for storing the normal write data NMAL_WDATA which are not grouped into a transaction has already been allocated in the volatile memory 144 through the operation described above with reference to FIG. 3A.

Therefore, the controller A30 immediately stores E, F, G and H grouped into the normal write data NMAL_WDATA in the normal write buffer A31 without a separate additional operation. Through the operation described above with reference to FIG. 3A, the normal write buffer A31 has been allocated in the volatile memory 144 as the space capable of storing total 10 pieces of the write data, has stored only A, B, C and D as four pieces of the write data, and has kept space available for six other pieces of the write data.

Because of this fact, the controller A30 immediately stores E, F, G and H grouped into the normal write data NMAL_WDATA in the normal write buffer A31 without a separate additional operation, as in FIG. 3D. As E, F, G and H grouped into the normal write data NMAL_WDATA are stored in the normal write buffer A31 in FIG. 3D, A, B, C, D, E, F, G and H as eight pieces of the normal write data NMAL_WDATA are stored in the normal write buffer A31 which has the space capable of storing total 10 pieces of the write data, and a space available for two remaining pieces of the normal write data NMAL_WDATA.

In the state of FIG. 3D in succession to the state shown in FIG. 3A, in which the seven pieces of the write data WDATA are additionally inputted, since the normal write data NMAL_WDATA are not full in the normal write buffer A31, it is not a case in which the normal write buffer A31 should be flushed. Also, since the first transaction is aborted, it is not a case in which the first write buffer A32 should be flushed. However, since the commit of the second transaction is completed, it is a case in which the second write buffer A33 should be flushed.

When the state shown in FIG. 3A is changed to the state shown in FIG. 3D, the first transaction is converted as aborted, and the second transaction is converted into a state in which the commit thereof is completed. Therefore, in the state as in FIG. 3D, it is impossible that the commit of the first transaction is completed. Thus, it may be determined that the first transaction is not committed within the set first time interval from a time at which the commit of the second transaction is completed.

In the case where, the first transaction is aborted separately from that the commit of the second transaction is completed, the controller A30 releases the first write buffer A32 in the volatile memory 144 in correspondence to the abort of the first transaction (WRITE BUFFER1 RELEASE).

Further, the second flush operation FLUSH2 is performed for only the second write buffer A33 in correspondence to that the commit of the second transaction is completed, separately from that the first transaction is aborted, and accordingly, the second write operation WRITE2 of storing the second write data TRAN_WDATA2 stored in the second write buffer A33 in the nonvolatile memory devices A40, A50 and A60 is performed.

Since it is assumed in FIG. 3D that a first flush operation FLUSH1 for the first write buffer A32 is not performed, the first synchronization operation and the second synchronization operation shown in FIGS. 4A to 4D are not performed.

Referring again to FIG. 3D, after completing the performance of the second write operation WRITE2, the controller A30 releases the second write buffer A33 in the volatile memory 144 (WRITE BUFFER2 RELEASE). That is, the controller A30 releases the second write buffer A33 which is allocated in the volatile memory 144 when the second write data TRAN_WDATA2 are inputted from the host A10, in the volatile memory 144 after performing the second write operation WRITE2.

Conversely, at a time at which the abort of the first transaction is checked, the controller A30 releases the first write buffer A32 in the volatile memory 144.

As is apparent from the above descriptions, the memory system A20 in accordance with the first embodiment of the present disclosure may allocate, when the first write data TRAN_WDATA1 which are grouped into the first transaction are inputted from the host A10, the first write buffer A32 for exclusive use for the first transaction, in the volatile memory 144. Also, the memory system A20 in accordance with the first embodiment of the present disclosure may allocate, when the second write data TRAN_WDATA2 which are grouped into the second transaction are inputted from the host A10, the second write buffer A33 for exclusive use for the second transaction, in the volatile memory 144. The first write buffer A32 and the second write buffer A33 may be distinguished from each other. Similarly, the first and second write buffers A32 and A33 may be distinguished from the normal write buffer A31 for managing the normal write data NMAL_WDATA. Through this, the memory system A20 in accordance with the first embodiment of the present disclosure may effectively manage transaction write data.

Further, the memory system A20 in accordance with the first embodiment of the present disclosure synchronizes a time at which a first flush operation to be performed in the first write buffer A32 is performed when the first transaction is committed and a time at which a second flush operation to be performed in the second write buffer A33 is performed when the second transaction is committed, to the maximum within a possible range. Through this, the first write operation WRITE1 of storing the first write data TRAN_WDATA1 stored in the first write buffer A32 in the nonvolatile memory devices A40, A50 and A60 and the second write operation WRITE2 of storing the second write data TRAN_WDATA2 stored in the second write buffer A33 in the nonvolatile memory devices A40, A50 and A60 may be started by being synchronized, and a possibility to intensively store the first write data TRAN_WDATA1 and the second write data TRAN_WDATA2 may be increased by collectively storing them in a specific storage space of the nonvolatile memory devices A40, A50 and A60. Namely, an algorithm for ensuring the first transaction and the second transaction may be simplified.

Moreover, the memory system A20 in accordance with the first embodiment of the present disclosure maximally synchronizes, within a possible range, times at which the first and second acknowledgement signals ACK1 and ACK2 are transmitted to the host A10 to notify the host A10 that the synchronized first and second write operations WRITE1 and WRITE2 are completed when the first and second write buffers A32 and A33 are flushed in a synchronized state. That is, the memory system A20 may transfer the two acknowledgement signals ACK1 and ACK2 to the host A10 at one timing. Through this, the number of times by which an acknowledgement signal is transmitted to the host A10 from the memory system A20 may be minimized.

Figure 5A:
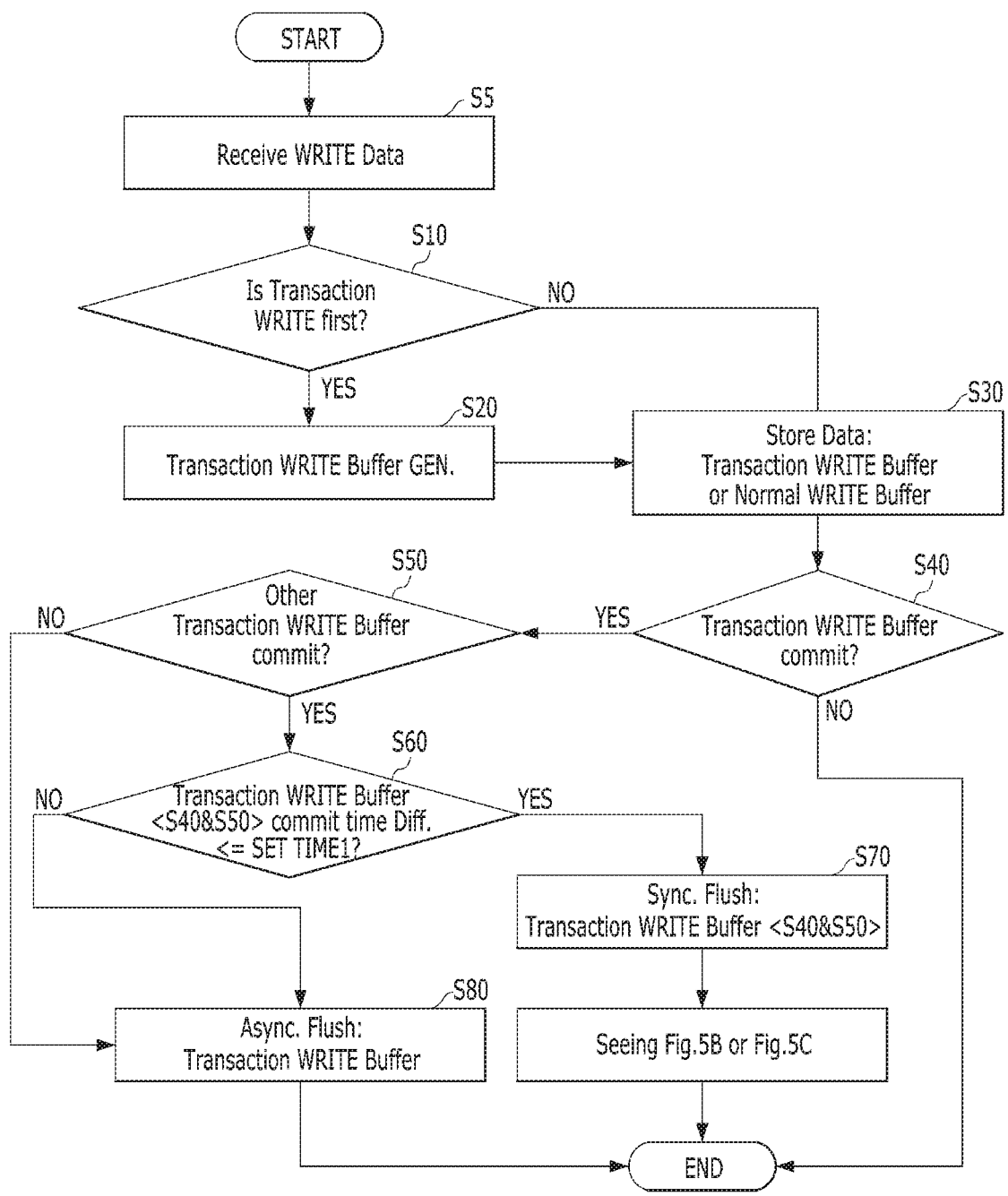
Figure 5B:
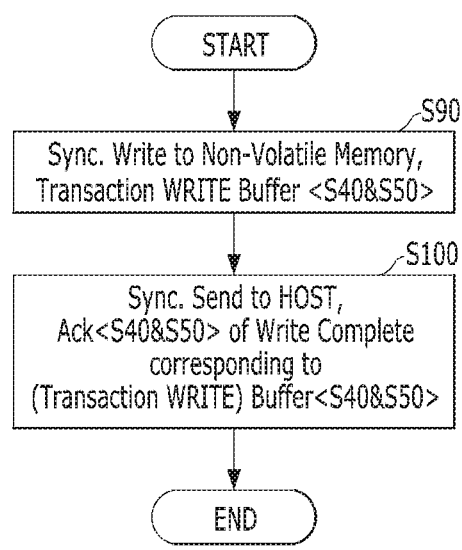

FIGS. 5A to 5C are flow charts to assist in the explanation of the operation of the memory system in accordance with the first embodiment of the present disclosure.

Referring to FIG. 5A, the operation of the memory system A20 in accordance with the first embodiment of the present disclosure is started when write data WDATA is transmitted from the host A10 to the memory system A20 (S5).

Whether the write data WDATA transmitted at the step S5 is start data of a transaction is checked (S10).

In the case where the write data WDATA is start data of a transaction at the step S10 (YES), the memory system A20 generates a dedicated transaction write buffer for storing transaction data of the transaction (S20). At the step S20, dedicated transaction write buffers are generated by the number of transactions. That is, a first transaction write buffer is generated for a first transaction, and a second transaction write buffer is generated for a second transaction. At the step S20, the size of the dedicated transaction write buffer may be depend on the total size information of the transaction which is transferred together with start data of the transaction.

In the case where the write data WDATA is not start data of a transaction at the step S10 (NO), it may be regarded that the write data WDATA transmitted at the step S5 is normal write data NMAL_WDATA or another data other than start data of the transaction.

In the case where the write data WDATA transmitted at the step S5 is normal write data NMAL_WDATA, the write data WDATA is stored in a normal write buffer (S30).

In the case where the write data WDATA transmitted at the step S5 is another data other than start data of the transaction, the write data WDATA is stored in the transaction write buffer which is generated at the step S20 (S30). At the step S30, it is checked which kind of a transaction the write data WDATA transmitted at the step S5 is, and the write data WDATA is stored in a transaction write buffer corresponding to the checked transaction. In other words, at the step S30, in the case where the write data WDATA transmitted at the step S5 is another data of the first transaction, the write data WDATA is stored in the first transaction write buffer, and, in the case where the write data WDATA transmitted at the step S5 is another data of the second transaction, the write data WDATA is stored in the second transaction write buffer.

After the step S30, whether a buffer of which commit is completed exists among transaction write buffers is checked (S40).

In the case where a buffer of which commit is completed does not exist at the step S40 (NO), a separate operation is not performed until new write data WDATA is inputted at the step S5.

In the case where a buffer of which commit is completed exists at the step S40 (YES), whether the commit of another transaction is completed is checked (S50). In other words, through the step S40 and the step S50, whether at least two transactions are committed may be checked.

In the case where only one transaction is committed as a result of the step S50 (NO), only the transaction write buffer which is committed is flushed alone (S80). The transaction write buffer which is flushed at the step S80 is not flushed simultaneously with another transaction write buffer.

In the case where at least two transaction write buffers are committed as a result of the step S50 (YES), whether the commit times of the at least two transactions are within a set first time interval (SET TIME1) is checked (S60). That is, whether the commit time of a transaction (Transaction WRITE Buffer<S40>) of which commit is checked at the step S40 and the commit time of a transaction (Transaction WRITE Buffer<S50>) of which commit is checked at the step S50 are within the set first time interval (SET TIME1) is checked (S60).

In the case where difference between the commit times of the at least two transactions exceed the set first time interval (SET TIME1) at the step S60 (NO), flush operations for the at least two transaction write buffers which are commit-completed are not synchronized (S80). That is, a flush operation for the transaction (Transaction WRITE Buffer<S40>) of which commit is checked at the step S40 and a flush operation for the transaction (Transaction WRITE Buffer<S50>) of which commit is checked at the step S50 are not synchronized (S80).

In the case where difference between the commit times of the at least two transaction write buffers are within the set first time interval (SET TIME1) at the step S60 (YES), flush operations for the at least two transaction write buffers which are commit-completed are synchronized (S70). That is, a flush operation for the transaction (Transaction WRITE Buffer<S40>) of which commit is checked at the step S40 and a flush operation for the transaction (Transaction WRITE Buffer<S50>) of which commit is checked at the step S50 are synchronized (S70).

After the flush operations for the at least two transaction write buffers which are commit-completed are synchronized at the step S70, any one operation of two operations may be selected and performed by referring to FIGS. 5B and 5C as will be described below.

Referring to FIG. 5B, in correspondence to that the flush operations for the at least two transaction write buffers which are commit-completed are synchronized at the step S70, at least two write operations (Write to Non-Volatile Memory, Transaction WRITE Buffer <S40 & S50>) of storing the transaction data stored in the at least two transaction write buffers, in the nonvolatile memory devices A40, A50 and A60, are synchronized (S90).

Since the flush operations for the at least two transaction write buffers which are commit-completed are synchronized and accordingly the at least two write operations are synchronized at the step S70 and the step S90, in FIG. 5B, a separate condition is not additionally checked, and times at which at least two acknowledgement signals (Ack<S40 & S50> of Write Complete corresponding to (Transaction WRITE) Buffer<S40 & S50>) for notifying the host A10 that the at least two write operations are completed are transmitted to the host A10 are synchronized (S100).

Referring to FIG. 5C, in correspondence to that the flush operations for the at least two transaction write buffers which are commit-completed are synchronized at the step S70, at least two write operations (Write to Non-Volatile Memory, Transaction WRITE Buffer <S40 & S50>) of storing the transaction data stored in the at least two transaction write buffers, in the nonvolatile memory devices A40, A50 and A60, are synchronized (S90).

After the flush operations for the at least two transaction write buffers which are commit-completed are synchronized and accordingly the at least two write operations are synchronized at the step S70 and the step S90, in FIG. 5C, whether difference between times at which the at least two write operations are completed are within a set second time interval (SET TIME2) is checked (S110).

In the case where difference between times at which the at least two write operations are completed are within the set second time interval (SET TIME2) at the step S110 (YES), times at which at least two acknowledgement signals (Ack<S40 & S50> of Write Complete corresponding to (Transaction WRITE) Buffer<S40 & S50>) for notifying the host A10 that the at least two write operations are completed are transmitted to the host A10 are synchronized (S120).

In the case where difference between times at which the at least two write operations are completed exceed the set second time interval (SET TIME2) at the step S110 (NO), times at which at least two acknowledgement signals (Ack<S40 & S50> of Write Complete corresponding to (Transaction WRITE) Buffer<S40 & S50>) for notifying the host A10 that the at least two write operations are completed are transmitted to the host A10 are not synchronized (S130).

Second Embodiment

Figure 6:
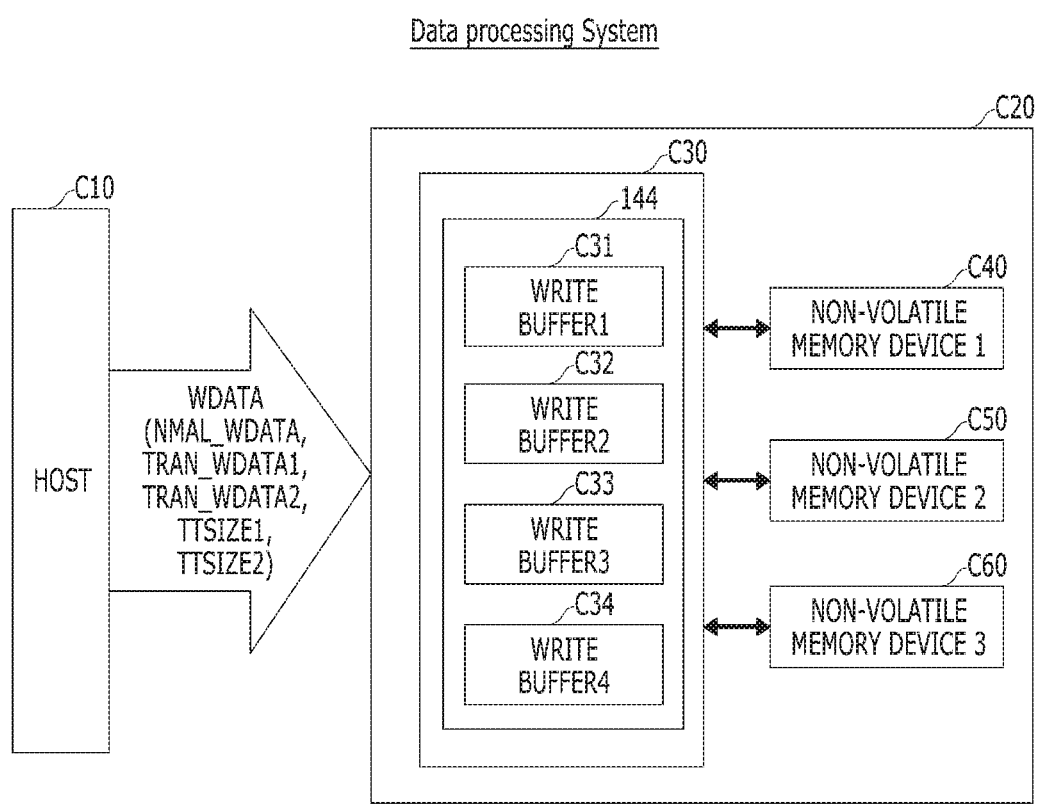
FIGS. 6 and 7 are diagrams to assist in the explanation of the configuration of a data processing system including a memory system in accordance with another embodiment of the present disclosure.
Figure 7:
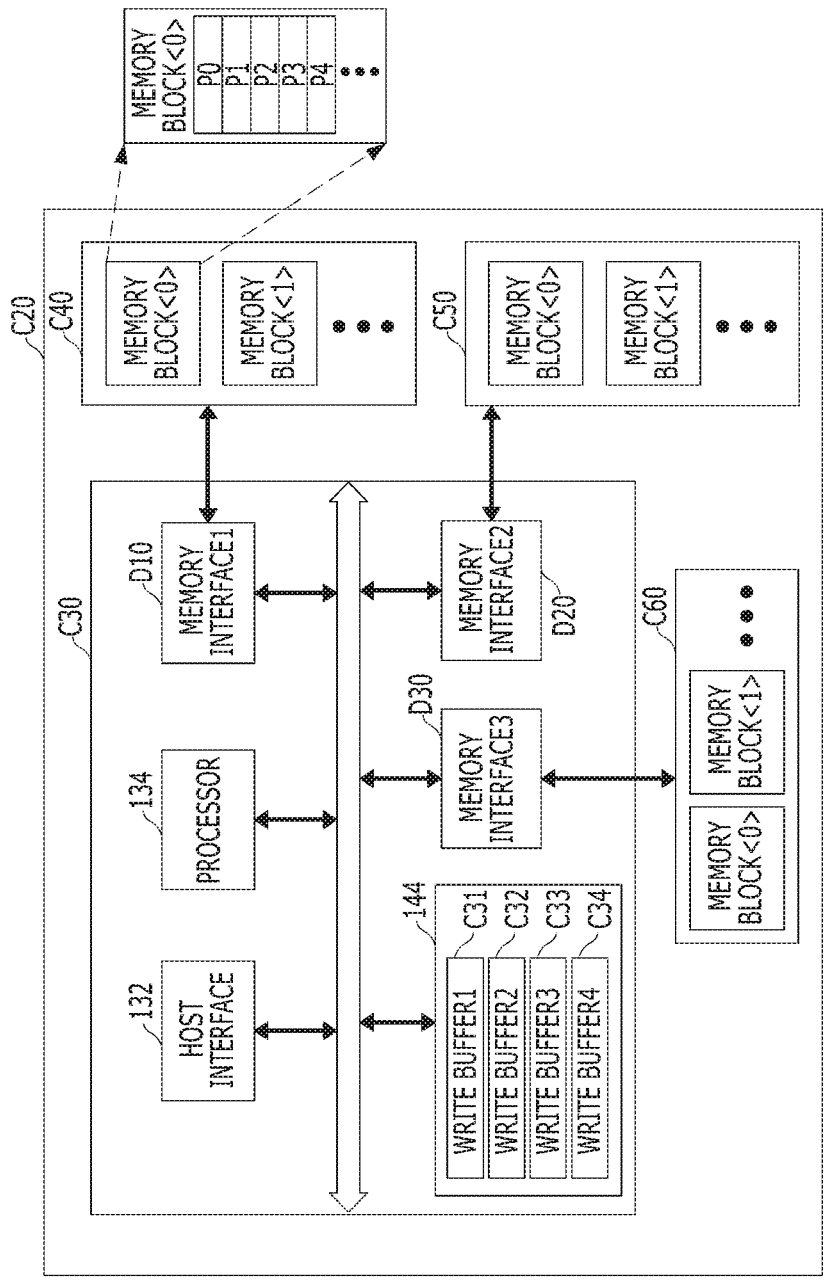

FIGS. 6 and 7 are diagrams to assist in the explanation of the configuration of a data processing system including a memory system in accordance with a second embodiment of the present disclosure.

Referring to FIG. 6, the data processing system in accordance with the second embodiment of the present disclosure includes a host C10 and a memory system C20. The memory system C20 includes a controller C30, a first nonvolatile memory device C40, a second nonvolatile memory device C50 and a third nonvolatile memory device C60.

For reference, in FIGS. 6 and 7, three nonvolatile memory devices C40, C50 and C60 are included in the memory system C20. However, this is merely an example, as previously noted.

The host C10 transmits a plurality of commands corresponding to a user request to the memory system C20, and accordingly, the memory system C20 performs operations corresponding to the commands, that is, operations corresponding to the user request.

The memory system C20 operates in response to a request of the host C10, in particular, stores data to be accessed by the host C10. In other words, the memory system C20 may be used as a main memory device or an auxiliary memory device of the host C10. The memory system C20 may be realized as any one of various kinds of storage devices, depending on a host interface protocol which is coupled with the host C10. For example, the memory system C20 may be realized as any of various kinds of storage devices such as a solid state driver (SSD), a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and the like.

Also, the memory system C20 may be integrated into one semiconductor device and configure a memory card. For instance, the memory system C20 may configure a memory card such as a Personal Computer Memory Card International Association (PCMCIA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and a universal flash storage (UFS) device.

For another instance, the memory system C20 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

The memory system C20 may include a storage device such as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM), a resistive RAM (RRAM) and a flash memory.

The memory system C20 includes a volatile memory 144 for temporarily storing write data WDATA inputted from the host C10.

The controller C30 allocates a plurality of write buffers C31, C32, C33 and C34 each having a predefined size, in the volatile memory 144. The controller C30 stores normal write data NMAL_WDATA which are inputted from the host C10 and are not grouped into a transaction, in write buffers which are not set for exclusive use for a transaction, among the plurality of write buffers C31, C32, C33 and C34.

When first write data TRAN_WDATA1 which are grouped into a first transaction and a first total size information TTSIZE1 on a total size of the first transaction are inputted from the host C10, the controller C30 sets, in response to the first total size information TTSIZE1, a first exclusive use option for exclusively using at least one first write buffer among the plurality of write buffers C31, C32, C33 and C34, for the first transaction.

In detail, the controller C30 checks respective empty spaces of the plurality of write buffers C31, C32, C33 and C34 at a time when the first write data TRAN_WDATA1 are inputted from the host C10, sets the first exclusive use option for a minimum number of write buffers which are combinable among the plurality of write buffers C31, C32, C33 and C34, in response to the checked empty spaces and the first total size information TTSIZE1, and uses the minimum number of write buffers as the first write buffer.

Also, when second write data TRAN_WDATA2 which are grouped into a second transaction and a second total size information TTSIZE2 on a total size of the second transaction are inputted from the host C10, the controller C30 sets, in response to the second total size information TTSIZE2, a second exclusive use option for exclusively using at least one second write buffer among the remaining write buffers except the first write buffer among the plurality of write buffers C31, C32, C33 and C34, for the second transaction.

In detail, the controller C30 checks respective empty spaces of the remaining write buffers except the first write buffer among the plurality of write buffers C31, C32, C33 and C34 at a time when the second write data TRAN_WDATA2 are inputted from the host C10, sets the second exclusive use option for a minimum number of write buffers which are combinable among the remaining write buffers except the first write buffer among the plurality of write buffers C31, C32, C33 and C34 in response to the checked empty spaces and the second total size information TTSIZE2, and uses the minimum number of write buffers as the second write buffer.

For reference, by assuming that the first write data TRAN_WDATA1 which are grouped into the first transaction are inputted earlier than the second write data TRAN_WDATA2 which are grouped into the second transaction, it is assumed that the setting of the first write buffer for exclusive use for the first transaction precedes the setting of the second write buffer for exclusive use for the second transaction. Therefore, when setting the first write buffer, the first write buffer is set by selecting at least one write buffer among the plurality of write buffers C31, C32, C33 and C34, but, when setting the second write buffer, the second write buffer is set by selecting at least one write buffer among the remaining write buffers except the write buffer set as the first write buffer among the plurality of write buffers C31, C32, C33 and C34.

In summary, the controller C30 allocates the plurality of write buffers C31, C32, C33 and C34 in the volatile memory 144 before the write data WDATA are inputted from the host C10. In this way, the plurality of write buffers C31, C32, C33 and C34 are first allocated in the volatile memory 144. Thereafter, in the case where write data WDATA which are grouped into a transaction are inputted from the host C10, the controller C30 sets at least one write buffer among the plurality of write buffers C31, C32, C33 and C34, for exclusive use for the transaction, and then, stores the write data WDATA which are grouped into the transaction, collectively in the write buffer set for exclusive use for the transaction. In the case where the normal write data NMAL_WDATA are inputted from the host C10, the normal write data NMAL_WDATA are stored by being appropriately distributed over write buffers which are not set for exclusive use for a transaction, among the plurality of write buffers C31, C32, C33 and C34.

The fact that write data WDATA are grouped into a transaction means that a plurality of write data WDATA used for the same use among write data WDATA are grouped into one transaction.

For example, in a database, data used for uses such as the correction, addition and update of already stored data may be grouped into respective transactions according to the respective uses. In this regard, data of the use for correcting a database may be set to be grouped into one transaction group, and data of the use for adding a database may be set to be grouped into another transaction group.

Therefore, when write data TRAN_WDATA1 or TRAN_WDATA2 which are grouped into one transaction are transmitted from the host C10 to the memory system C20, there exists only a commit state in which all the write data TRAN_WDATA1 or TRAN_WDATA2 are normally transmitted and stored and are thus valid or an abort state in which even any one of the write data TRAN_WDATA1 or TRAN_WDATA2 is not normally transmitted and stored or all the write data TRAN_WDATA1 or TRAN_WDATA2 are invalid according to an abort request of the host C10. That is, write data TRAN_WDATA which are grouped into one transaction are meaningful only when they are in a commit state as all of them are normally transmitted and stored and are thus all valid.

For example, in order for the first write data TRAN_WDATA1 grouped into a transaction among the write data WDATA transmitted from the host C10 to the memory system C20 to be checked as a commit state in the memory system C20, all of the plurality of first write data TRAN_WDATA1 should be normally transmitted from the host C10 to the memory system C20 and be completely stored in the memory system C20, and at the same time, there should be no abort request from the host C10. If even any one of the plurality of first write data TRAN_WDATA1 is not normally transmitted and stored or an abort request is received from the host C10, all of the first write data TRAN_WDATA1 are checked as an abort state in the memory system C20.

Similarly, in order for the second write data TRAN_WDATA2 grouped into the second transaction among the write data WDATA transmitted from the host C10 to the memory system C20 to be checked as a commit state in the memory system C20, all of the plurality of second write data TRAN_WDATA2 should be normally transmitted from the host C10 to the memory system C20 and be completely stored in the memory system C20, and at the same time, there should be no abort request from the host C10. If even any one of the plurality of second write data TRAN_WDATA2 is not normally transmitted and stored or an abort request is received from the host C10, all of the second write data TRAN_WDATA2 are checked as an aborted state in the memory system C20.

For reference, the operation of managing the write data TRAN_WDATA1 or TRAN_WDATA2 grouped into a transaction, by classifying them into a commit state or an aborted state as described above, may be generally referred to as an operation for ensuring the transaction.

The reason why the plurality of write buffers C31, C32, C33 and C34 allocated in the volatile memory 144 of the controller C30 are shown by the solid lines in FIG. 6 is because the controller C30 allocates the plurality of write buffers C31, C32, C33 and C34 in the volatile memory 144 before the write data WDATA are inputted from the host C10.

The controller C30 sets the plurality of write buffers C31, C32, C33 and C34 by fixing them to the predefined size.

In response to the first total size information TTSIZE1 inputted together with the first write data TRAN_WDATA1 when the first write data TRAN_WDATA1 grouped into the first transaction are inputted from the host C10, the controller C30 checks a first determined size for the first write data TRAN_WDATA1, and then checks whether a write buffer of which empty space is capable of accommodating the first determined size exists among the write buffers C31, C32, C33 and C34 allocated in advance in the volatile memory 144.

In the case where an empty space capable of accommodating the first determined size exists only in one write buffer among the plurality of write buffers C31, C32, C33 and C34, the first exclusive use option is set for the one write buffer and the one write buffer is selected as the first write buffer.

In the case where an empty space capable of accommodating the first determined size exists in each of two or more write buffers among the plurality of write buffers C31, C32, C33 and C34, the first exclusive use option is set for a write buffer of which empty space size is smallest, among the two or more write buffers each capable of accommodating the first determined size, and the corresponding write buffer is selected as the first write buffer.

In the case where only the empty space size of any one write buffer among the plurality of write buffers C31, C32, C33 and C34 cannot accommodate the first determined size and the size obtained by summing the empty spaces of at least two write buffers may accommodate the first determined size, the first exclusive use option is set for all of at least two write buffers of which size obtained by summing their empty spaces is closest to the first determined size, and the corresponding at least two write buffers are selected as the first write buffer.

In response to the second total size information TTSIZE2 inputted together with the second write data TRAN_WDATA2 when the second write data TRAN_WDATA2 grouped into the second transaction are inputted from the host C10 after the first write data TRAN_WDATA1 grouped into the first transaction are inputted from the host C10, the controller C30 checks a second determined size for the second write data TRAN_WDATA2, and then checks whether a write buffer of which empty space is capable of accommodating the second determined size exists among the remaining write buffers except the first write buffer among the write buffers C31, C32, C33 and C34 allocated in advance in the volatile memory 144.

In the case where an empty space capable of accommodating the second determined size exists only in one write buffer among the remaining write buffers except the first write buffer among the plurality of write buffers C31, C32, C33 and C34, the second exclusive use option is set for the one write buffer and the one write buffer is selected as the second write buffer.

In the case where an empty space capable of accommodating the second determined size exists in each of two or more write buffers among the remaining write buffers except the first write buffer among the plurality of write buffers C31, C32, C33 and C34, the second exclusive use option is set for a write buffer of which empty space size is smallest, among the two or more write buffers each capable of accommodating the second determined size, and the corresponding write buffer is selected as the second write buffer.

In the case where only the empty space size of any one write buffer among the remaining write buffers except the first write buffer among the plurality of write buffers C31, C32, C33 and C34 cannot accommodate the second determined size and the size obtained by summing the empty spaces of at least two write buffers may accommodate the second determined size, the second exclusive use option is set for all of at least two write buffers of which size obtained by summing their empty spaces is closest to the second determined size, and the corresponding at least two write buffers are selected as the second write buffer.

Referring to FIG. 7, the detailed configuration of the memory system C20 described above with reference to FIG. 6 may be seen.

First, the controller C30 included in the memory system C20 controls the first to third nonvolatile memory devices C40, C50 and C60 in response to a request from the host C10. For example, the controller C30 provides data read from the first to third nonvolatile memory devices C40, C50 and C60, to the host C10, and stores data provided from the host C10, in the first to third nonvolatile memory devices C40, C50 and C60. To this end, the controller C30 controls the operations of the first to third nonvolatile memory devices C40, C50 and C60, such as read, write, program and erase operations.

In detail, the controller C30 included in the memory system C20 includes a host interface (HOST INTERFACE) 132, a processor (PROCESSOR) 134, a memory 144, a first memory interface (MEMORY INTERFACE1) D10, a second memory interface (MEMORY INTERFACE2) D20 and a third memory interface (MEMORY INTERFACE3) D30.

The host interface 132 performs an operation of exchanging commands and data to be transferred between the memory system C20 and the host C10, and may be configured to communicate with the host C10 through at least one of various interface protocols such as universal serial bus (USB), multimedia card (MMC), peripheral component interconnect-express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and MIPI (mobile industry processor interface). The host interface 32 may be driven through firmware which is referred to as a host interface layer (HIL), as a region which exchanges data with the host C10.

The first to third memory interfaces D10, D20 and D30 serve as memory/storage interfaces which perform interfacing between the controller C30 and the first to third nonvolatile memory devices C40, C50 and C60, to allow the controller C30 to control the respective first to third nonvolatile memory devices C40, C50 and C60 in response to a request from the host C10. Each of the first to third memory interfaces D10, D20 and D30 generates control signals for each of the first to third nonvolatile memory devices C40, C50 and C60 and processes data under the control of the processor 134, as a NAND flash controller (NFC) in the case where each of the first to third nonvolatile memory devices C40, C50 and C60 is a flash memory, in particular, in the case where each of the first to third nonvolatile memory devices C40, C50 and C60 is a NAND flash memory.

Each of the first to third memory interfaces D10, D20 and D30 may support the operation of an interface which processes a command and data between the controller C30 and each of the first to third nonvolatile memory devices C40, C50 and C60, for example, a NAND flash interface, in particular, data input/output between the controller C30 and each of the first to third nonvolatile memory devices C40, C50 and C60, and may be driven through firmware which is referred to as a flash interface layer (FIL), as a region which exchanges data with each of the first to third nonvolatile memory devices C40, C50 and C60.

The memory 144 as the working memory of the memory system C20 and the controller C30 stores data for driving of the memory system C20 and the controller C30. In detail, the memory 144 temporarily stores data which should be managed, when the controller C30 controls the first to third nonvolatile memory devices C40, C50 and C60 in response to a request from the host C10, for example, when the controller C30 controls the operations of the first to third nonvolatile memory devices C40, C50 and C60, such as read, write, program and erase operations.

The memory 144 may be realized by a volatile memory. For example, the memory 144 may be realized by a static random access memory (SRAM) or a dynamic random access memory (DRAM).

The memory 144 may be disposed inside the controller C30 as illustrated in FIG. 7, and may be disposed outside the controller C30. In the case where the memory 144 is disposed outside the controller C30, the memory 144 should be realized by an external volatile memory to and from which data are inputted and outputted from and to the controller C30 through a separate memory interface (not shown).

The memory 144 stores data which should be managed in the course of controlling the operations of the first to third nonvolatile memory devices C40, C50 and C60. For such data storage, the memory 144 may include a program memory, a data memory, a write buffer/cache, a read buffer/cache, a data buffer/cache, a map buffer/cache, and the like.

The memory 144 described in FIG. 7 is a component corresponding to the volatile memory 144 described above with reference to FIG. 6. In this regard, the volatile memory 144 described above with reference to FIG. 6 includes only a role as a write buffer among the roles of the memory 144 described in FIG. 7. Thus, as described above for the volatile memory 144 in FIG. 6, the plurality of write buffers C31, C32, C33 and C34 are included in the memory 144 shown in FIG. 7.

The processor 134 controls the entire operations of the controller C30, and in particular, controls a program operation or a read operation for the first to third nonvolatile memory devices C40, C50 and C60, in response to a write request or a read request from the host C10. The processor 134 drives firmware which is referred to as a flash translation layer (FTL), to control general operations of the controller C30 for the first to third nonvolatile memory devices C40, C50 and C60. The processor 134 may be realized by a microprocessor or a central processing unit (CPU).

For instance, the controller C30 performs an operation requested from the host C10, in the first to third nonvolatile memory devices C40, C50 and C60, that is, performs a command operation corresponding to a command received from the host C10, with the first to third nonvolatile memory devices C40, C50 and C60, through the processor 134. The controller C30 may perform a foreground operation as a command operation corresponding to a command received from the host C10, for example, a program operation corresponding to a write command, a read operation corresponding to a read command, an erase operation corresponding to an erase command or a parameter set operation corresponding to a set parameter command or a set feature command as a set command.

The controller C30 may perform a background operation for the first to third nonvolatile memory devices C40, C50 and C60, through the processor 134. The background operation for the first to third nonvolatile memory devices C40, C50 and C60 may include an operation of copying data stored in a certain memory block among memory blocks MEMORY BLOCK<0, 1, 2, . . . > of each of the first to third nonvolatile memory devices C40, C50 and C60, to another certain memory block, for example, a garbage collection (GC) operation. The background operation for the first to third nonvolatile memory devices C40, C50 and C60 may include an operation of swapping stored data among the memory blocks MEMORY BLOCK<0, 1, 2, . . . > of each of the first to third nonvolatile memory devices C40, C50 and C60, for example, a wear leveling (WL) operation. The background operation for the first to third nonvolatile memory devices C40, C50 and C60 may include an operation of storing map data stored in the controller C30, in the memory blocks MEMORY BLOCK<0, 1, 2, . . . , > of each of the first to third nonvolatile memory devices C40, C50 and C60, for example, a map flush operation. The background operation for the first to third nonvolatile memory devices C40, C50 and C60 may include a bad block management operation for the first to third nonvolatile memory devices C40, C50 and C60, for example, checking and processing a bad block among the plurality of memory blocks MEMORY BLOCK<0, 1, 2, . . . > included in each of the first to third nonvolatile memory devices C40, C50 and C60.

The controller C30 may generate and manage log data in correspondence to an operation of accessing the memory blocks MEMORY BLOCK<0, 1, 2, . . . > of each of the first to third nonvolatile memory devices C40, C50 and C60, through the processor 134. The operation of accessing the memory blocks MEMORY BLOCK<0, 1, 2, . . . > of each of the first to third nonvolatile memory devices C40, C50 and C60 includes performing of a foreground operation or a background operation for the memory blocks MEMORY BLOCK<0, 1, 2, . . . > of each of the first to third nonvolatile memory devices C40, C50 and C60.

In the processor 134 of the controller C30, a unit (not shown) for performing bad block management of the first to third nonvolatile memory devices C40, C50 and C60 may be included. The unit for performing bad block management performs a bad block management of checking a bad block among the plurality of memory blocks MEMORY BLOCK<0, 1, 2, . . . > included in each of the first to third nonvolatile memory devices C40, C50 and C60 and processing the checked bad block as bad. The bad block management means that, in the case where each of the first to third nonvolatile memory devices C40, C50 and C60 is a flash memory, for example, a NAND flash memory, since a program failure may occur when writing data, for example, programming data, due to the characteristic of the NAND flash memory, a memory block where the program failure has occurred is processed as bad and program-failed data is written, that is, programmed, in a new memory block.

The controller C30 performs an operation of transmitting a command and data to be inputted/outputted between the controller C30 and the first to third nonvolatile memory devices C40, C50 and C60, through the processor 134. The command and data to be inputted/outputted between the controller C30 and the first to third nonvolatile memory devices C40, C50 and C60 may be transmitted from the host C1.0 to the controller C30 or may be generated inside the controller C30.

The controller C30 may perform, through the processor 134, the host interface 132 and the memory 144 described above, an operation of checking whether the write data WDATA inputted from the host C10 are grouped into a transaction and thereby classifying the normal write data NMAL_WDATA which are not grouped into a transaction and the first write data TRAN_WDATA1 and the second write data TRAN_WDATA2 which are grouped into transactions.

Also, the controller C30 may perform, through the processor 134, the host interface 132 and the memory 144 described above, an operation of allocating the plurality of write buffers C31, C32, C33 and C34 for temporarily storing the write data WDATA inputted from the host C10, in the memory 144.

The controller C30 may temporarily store, through the processor 134 and the memory 144 described above, the normal write data NMAL_WDATA in a write buffer which are not set for exclusive use for a transaction, among the plurality of write buffers C31, C32, C33 and C34 allocated in the memory 144.

Moreover, the controller C30 may perform, through the processor 134, the host interface 132 and the memory 144 described above, an operation of checking the first total size information TTSIZE1 inputted together with the first write data TRAN_WDATA1 grouped into the first transaction, setting at least one first write buffer among the plurality of write buffers C31, C32, C33 and C34 for exclusive use for the first transaction depending on a checking result and thereby temporarily storing the first write data TRAN_WDATA1.

Further, the controller C30 may perform, through the processor 134, the host interface 132 and the memory 144 described above, an operation of checking the second total size information TTSIZE2 inputted together with the second write data TRAN_WDATA2 grouped into the second transaction, setting at least one second write buffer among the remaining write buffers except the first write buffer among the plurality of write buffers C31, C32, C33 and C34 for exclusive use for the second transaction depending on a checking result and thereby temporarily storing the second write data TRAN_WDATA2.

Each of the first to third nonvolatile memory devices C40, C50 and C60 may retain stored data even though power is not supplied. In particular, each of the first to third nonvolatile memory devices C40, C50 and C60 may store write data WDATA provided from the host C10, through a write operation, and may provide read data (not shown) stored therein, to the host C10, through a read operation.

While each of the first to third nonvolatile memory devices C40, C50 and C60 may be realized by a nonvolatile memory such as a flash memory, for example, a NAND flash memory, it is to be noted that each of the first to third nonvolatile memory devices C40, C50 and C60 may be realized by any one memory among memories such as a phase change memory (PCRAM: phase change random access memory), a resistive memory (RRAM (ReRAM): resistive random access memory), a ferroelectric memory (FRAM: ferroelectric random access memory) and a spin transfer torque magnetic memory (STT-RAM (STT-MRAM): spin transfer torque magnetic random access memory).

Each of the first to third nonvolatile memory devices C40, C50 and C60 includes the plurality of memory blocks MEMORY BLOCK<0, 1, 2, . . . >. In other words, each of the first to third nonvolatile memory devices C40, C50 and C60 may store write data WDATA provided from the host C10, in the memory blocks MEMORY BLOCK<0, 1, 2, . . . >, through a write operation, and may provide read data (not shown) stored in the memory blocks MEMORY BLOCK<0, 1, 2, . . . >, to the host C10, through a read operation.

Each of the memory blocks MEMORY BLOCK<0, 1, 2, . . . > included in each of the first to third nonvolatile memory devices C40, C50 and C60 includes a plurality of pages P<0, 1, 2, 3, 4, . . . >. Also, while not shown in detail in the drawing, a plurality of memory cells are included in each of the pages P<0, 1, 2, 3, 4, . . . >.

Each of the memory blocks MEMORY BLOCK <0, 1, 2, . . . > included in each of the first to third nonvolatile memory devices C40, C50 and C60 may be classified as a single level cell (SLC) memory block or a multi-level cell (MLC) memory block, depending on the number of bits which may be stored or expressed in one memory cell included therein. An SLC memory block includes a plurality of pages which are realized by memory cells each storing 1 bit, and has excellent data computation performance and high durability. An MLC memory block includes a plurality of pages which are realized by memory cells each storing multi-bit data (for example, 2 or more bits), and may be more highly integrated than the SLC memory block since it has a larger data storage space than the SLC memory block.

In particular, the MLC memory block may be classified as an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data or a multiple level cell memory block including a plurality of pages which are realized by memory cells each capable of storing 5 or more-bit data.

FIGS. 8A to 8E and 9A to 9D are diagrams to assist in the explanation of the operation of the memory system in accordance with the second embodiment of the present disclosure.

First, a scheme in which the controller C30 described above with reference to FIGS. 6 and 7 classifies the write data WDATA inputted from the host C10, into the normal write data NMAL_WDATA, the first write data TRAN_WDATA1 and the second write data TRAN_WDATA2, will be described below by referring to several reference symbols which are used in FIGS. 8A to 8E.

In detail, when the write data WDATA are inputted to the memory system C20 from the host C10, write commands (not shown) respectively corresponding to the write data WDATA are inputted together, and transaction information (not shown) of the write data WDATA are included in the write commands, respectively.

In the transaction information of each of the write data WDATA, a transaction ID (identification) information TRID, a transaction commit information (not shown) and a transaction abort information (not shown) may be included.

Therefore, the controller C30 included in the memory system C20 may check transaction ID information TRID in the transaction information included in the write commands, and thereby, may classify the write data WDATA into the normal write data NMAL_WDATA which are not grouped into a transaction or the transaction write data TRAN_WDATA1 or TRAN_WDATA2 which are grouped into a transaction.

For example, the controller C30 may classify write data WDATA of which transaction ID information TRID have the value of 1, among the write data WDATA inputted from the host C10, into the first write data TRAN_WDATA1.

Similarly, the controller C30 may classify write data WDATA of which transaction ID information TRID have the value of 2, among the write data WDATA inputted from the host C10, into the second write data TRAN_WDATA2.

Also, the controller C30 may classify write data WDATA of which transaction ID information TRID are not set to any value, among the write data WDATA inputted from the host C10, into the normal write data NMAL_WDATA.

For reference, the fact that transaction ID information TRID are not set to any value may mean a case where they are set to a predefined initial value or a value that is meaningless as a transaction ID information.

In a write command corresponding to start data of the write data TRAN_WDATA1 or TRAN_WDATA2 which are grouped into a transaction, there is additionally included the total size information TTSIZE1 or TTSIZE2 on a total size of the write data TRAN_WDATA1 or TRAN_WDATA2.

For example, in a first write command corresponding to start data of the first write data TRAN_WDATA1 which are grouped into the first transaction, there is additionally included the first total size information TTSIZE1 on a total size of the first write data TRAN_WDATA1.

Because of this fact, the controller C30 may check the first total size information TTSIZE1 by checking the first write command before the start data to be inputted first among the first write data TRAN_WDATA1 is inputted from the host C10.

That is, the controller C30 may check the first determined size of the first write data TRAN_WDATA1, by checking the first total size information TTSIZE1 before the first write data TRAN_WDATA1 are inputted from the host C10.

Similarly, in a second write command corresponding to start data of the second write data TRAN_WDATA2 which are grouped into the second transaction, there is additionally included the second total size information TTSIZE2 on a total size of the second write data TRAN_WDATA2.

Because of this fact, the controller C30 may check the second total size information TTSIZE2 by checking the second write command before the start data to be inputted first among the second write data TRAN_WDATA2 is inputted from the host C10.

That is, the controller C30 may check the second determined size of the second write data TRAN_WDATA2, by checking the second total size information TTSIZE2 before the second write data TRAN_WDATA2 are inputted from the host C10.

The controller C30 allocates the plurality of write buffers C31, C32, C33 and C34 in the volatile memory 144 before the write data WDATA are inputted from the host C10. In this way, each of the plurality of write buffers C31, C32, C33 and C34 is fixed to the predefined size. For example, as exemplarily illustrated in FIGS. 8A to 8E, the predefined size may be set to 6. That is, each of the plurality of write buffers C31, C32, C33 and C34 may store six pieces of the write data.

In this way, after the plurality of write buffers C31, C32, C33 and C34 are allocated in advance in the volatile memory 144, when the normal write data NMAL_WDATA which are not grouped into a transaction are inputted from the host C10, the controller C30 stores the normal write data NMAL_WDATA by distributing them over write buffers which are not set for exclusive use for a transaction, among the plurality of write buffers C31, C32, C33 and C34.

After the plurality of write buffers C31, C32, C33 and C34 are allocated in advance in the volatile memory 144, when the first write data TRAN_WDATA1 which are grouped into the first transaction and the first total size information TTSIZE1 on a total size of the first transaction are inputted from the host C10, the controller C30 sets, in response to the first total size information TTSIZE1, the first exclusive use option for exclusively using at least one first write buffer among the plurality of write buffers C31, C32, C33 and C34, for the first transaction.

Also, after the plurality of write buffers C31, C32, C33 and C34 are allocated in advance in the volatile memory 144, when the second write data TRAN_WDATA2 which are grouped into the second transaction and the second total size information TTSIZE2 on a total size of the second transaction are inputted from the host C10, the controller C30 sets, in response to the second total size information TTSIZE2, a second exclusive use option for exclusively using at least one second write buffer among the remaining write buffers except the first write buffer among the plurality of write buffers C31, C32, C33 and C34, for the second transaction.

The controller C30 stores the normal write data NMAL_WDATA by appropriately distributing them over write buffers which are not set for exclusive use for a transaction, among the plurality of write buffers C31, C32, C33 and C34. In other words, a write buffer to be exclusively used for storing the normal write data NMAL_WDATA does not separately exist. Therefore, a time at which the normal write data NMAL_WDATA stored by being distributed over the plurality of write buffers C31, C32, C33 and C34 are stored in the nonvolatile memory devices C40, C50 and C60 may not be defined in advance.

In the case of the first write buffer which is set for exclusive use for the first transaction, it has a storage space equal to or larger than the first determined size corresponding to the first total size information TTSIZE1. The controller C30 may be aware of that, since whether the commit of the first transaction is completed is determined at a time when the first write data TRAN_WDATA1 are stored in the first write buffer by an amount corresponding to the first determined size, the first write data TRAN_WDATA1 are not inputted any more. Thus, the controller C30 checks whether the commit of the first transaction is completed, at a time when the first write data TRAN_WDATA1 are stored in the first write buffer by an amount corresponding to the first determined size. As a result of the checking, in the case where the commit of the first write data TRAN_WDATA1 stored in the first write buffer is completed, the controller C30 performs a first flush operation for the first write buffer, and thereby, performs a first write operation of storing the first write data TRAN_WDATA1 stored in the first write buffer, in the nonvolatile memory devices C40, C50 and C60. After performing the first write operation, the controller C30 resets the first exclusive use option for the first write buffer. The fact that the first exclusive use option for the first write buffer is reset means that the first write buffer is not used any more for exclusive use for the first transaction.

The controller C30 checks whether the first write data TRAN_WDATA1 are aborted or not, at each determined time, even before the first write data TRAN_WDATA1 are stored by the first determined size in the first write buffer. As a result of the checking, in the case where the first write data TRAN_WDATA1 stored in the first write buffer are aborted, the controller C30 discards the first write data TRAN_WDATA1 stored in the first write buffer, and resets the first exclusive use option for the first write buffer. The determined time at which whether the first write data TRAN_WDATA1 are aborted is checked may be a time at which each of the first write data TRAN_WDATA1 is inputted to the first write buffer.

In the case of the second write buffer which is set for exclusive use for the second transaction, it has a storage space equal to or larger than the second determined size corresponding to the second total size information TTSIZE2. The controller C30 may be aware of that, since whether the commit of the second transaction is completed is determined at a time when the second write data TRAN_WDATA2 are stored in the second write buffer by an amount corresponding to the second determined size, the second write data TRAN_WDATA2 are not inputted any more. Thus, the controller C30 checks whether the commit of the second transaction is completed, at a time when the second write data TRAN_WDATA2 are stored in the second write buffer by an amount corresponding to the second determined size. As a result of the checking, in the case where the commit of the second write data TRAN_WDATA2 stored in the second write buffer is completed, the controller C30 performs a second flush operation for the second write buffer, and thereby, performs a second write operation of storing the second write data TRAN_WDATA2 stored in the second write buffer, in the nonvolatile memory devices C40, C50 and C60. After performing the second write operation, the controller C30 resets the second exclusive use option for the second write buffer. The fact that the second exclusive use option for the second write buffer is reset means that the second write buffer is not used any more for exclusive use for the second transaction.

The controller C30 checks whether the second write data TRAN_WDATA2 are aborted or not, at each determined time, even before the second write data TRAN_WDATA2 are stored by the second determined size in the second write buffer. As a result of the checking, in the case where the second write data TRAN_WDATA2 stored in the second write buffer are aborted, the controller C30 discards the second write data TRAN_WDATA2 stored in the second write buffer, and resets the second exclusive use option for the second write buffer. The determined time at which whether the second write data TRAN_WDATA2 are aborted is checked may be a time at which each of the second write data TRAN_WDATA2 is inputted to the second write buffer.

In the case where a time at which the commit of the first transaction is checked and a time at which the commit of the second transaction is checked are within a set first time interval, the controller C30 synchronizes a time at which the first flush operation is performed for the first write buffer in correspondence to the commit of the first transaction and a time at which the second flush operation is performed for the second write buffer in correspondence to the commit of the second transaction.

In the case where a performance time of the first flush operation and a performance time of the second flush operation are synchronized, it may be regarded that a time at which the performance of the first write operation of storing the first write data TRAN_WDATA1 stored in the first write buffer in the nonvolatile memory devices C40, C50 and C60 is started and a time at which the performance of the second write operation of storing the second write data TRAN_WDATA2 stored in the second write buffer in the nonvolatile memory devices C40, C50 and C60 is started are synchronized. Hence, there is a high possibility that a time at which the performance of the first write operation is completed and a time at which the performance of the second write operation is completed do not have a large difference.

Thus, in the case where a performance time of the first flush operation and a performance time of the second flush operation are synchronized, the controller C30 may synchronize a time at which a first acknowledgement signal for notifying the host C10 that the performance of the first write operation linked to the first flush operation is completed is transferred to the host C10 and a time at which a second acknowledgement signal for notifying the host C10 that the performance of the second write operation linked to the second flush operation is completed is transferred to the host C10.

Of course, even in the case where a performance time of the first flush operation and a performance time of the second flush operation are synchronized, there may be a case where a time at which the performance of the first write operation is completed and a time at which the performance of the second write operation is completed have a large difference.

Thus, even in the case where a performance time of the first flush operation and a performance time of the second flush operation are synchronized, the controller C30 may synchronize, only in the case where a time at which a first acknowledgement signal for notifying the host C10 that the performance of the first write operation linked to the first flush operation is completed is generated and a time at which a second acknowledgement signal for notifying the host C10 that the performance of the second write operation linked to the second flush operation is completed is generated are within a set second time interval, a time at which the first acknowledgement signal is transferred to the host C10 and a time at which the second acknowledgement signal is transferred to the host C10.

In summary, the controller C30 may perform a first synchronization operation of synchronizing a time at which the first acknowledgement signal is transferred to the host C10 and a time at which the second acknowledgement signal is transferred to the host C10, by checking only whether a performance time of the first flush operation and a performance time of the second flush operation are synchronized.

Also, the controller C30 may perform a second synchronization operation of synchronizing a time at which the first acknowledgement signal is transferred to the host C10 and a time at which the second acknowledgement signal is transferred to the host C10, only in the case where a time at which the first acknowledgement signal is generated and a time at which the second acknowledgement signal is generated are within the set second time interval, even in the case where a performance time of the first flush operation and a performance time of the second flush operation are synchronized.

For reference, the first synchronization operation and the second synchronization operation are operations that cannot be performed simultaneously. Therefore, in the case where the controller C30 performs the first synchronization operation, the second synchronization operation is not performed. Conversely, in the case where the controller C30 performs the second synchronization operation, the first synchronization operation is not performed. Whether the controller C30 will perform the first synchronization operation or the second synchronization operation may be defined in advance depending on memory characteristics and a designer's choice.

The set first time interval serving as a reference for determining whether to synchronize a performance time of the first flush operation and a performance time of the second flush operation may be defined in advance depending on the characteristics of a memory system and a designer's choice.

Similarly, the set second time interval serving as a reference for determining whether to synchronize a time at which the first acknowledgement signal is transferred to the host C10 and a time at which the second acknowledgement signal is transferred to the host C10 may be defined in advance depending on the characteristics of a memory system and a designer's choice.

Figure 8A:
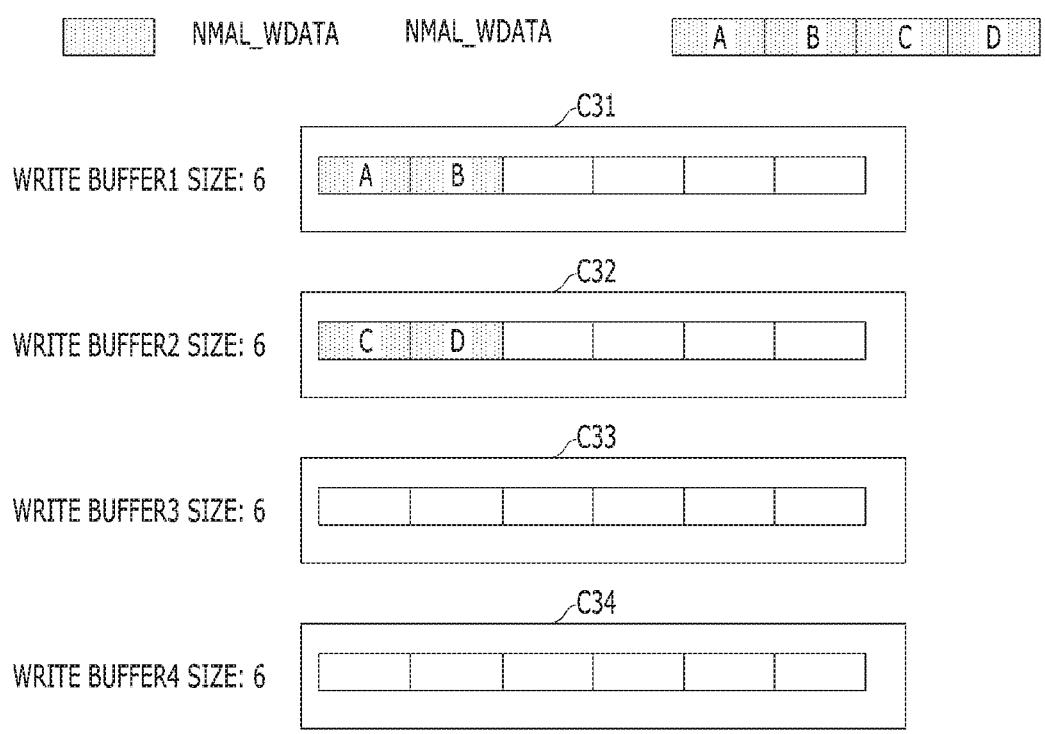

Referring to FIG. 8A, it may be assumed that it is a state in which the controller C30 has allocated the four write buffers C31, C32, C33 and C34 each capable of storing six pieces of the write data WDATA, in the volatile memory 144, before a first time.

In succession, it may be assumed that total four pieces of the write data WDATA are inputted from the host C10 at the first time. The controller C30 may check the transaction ID information TRIG of the respective four pieces of the write data WDATA inputted from the host C10, and may classify all the four pieces of the write data WDATA into the normal write data NMAL_WDATA which are not grouped into a transaction.

Then, the controller C30 checks whether there is a write buffer which is set for exclusive use for a transaction, among the four write buffers C31, C32, C33 and C34 allocated in the volatile memory 144 at the first time. As a result of the checking, it is a state in which none of the four write buffers C31, C32, C33 and C34 allocated in the volatile memory 144 at the first time are set for exclusive use for a transaction.

Therefore, the controller C30 may store A, B, C and D as four pieces of the normal write data NMAL_WDATA inputted from the host C10 at the first time, by appropriately distributing them over the four write buffers C31, C32, C33 and C34. For example, in the figure, A and B as two preceding data among A, B, C and D as the four pieces of the normal write data NMAL_WDATA inputted from the host C1.0 at the first time are stored in the first write buffer C31. Then, C and D as subsequent two pieces of the write data among A, B, C and D as the four pieces of the normal write data NMAL_WDATA inputted from the host C10 at the first time are stored in the second write buffer C32.

In summary, the controller C30 distributedly stores A, B, C and D as four pieces of the normal write data NMAL_WDATA inputted from the host C10 at the first time, two by two in the first write buffer C31 and the second write buffer C32 among the four write buffers C31, C32, C33 and C34. As a result, in each of the first write buffer C31 and the second write buffer C32 each having a storage space capable of storing six pieces of the write data, two pieces of the normal write data NMAL_WDATA are stored and empty space available for four other pieces of the write data.

Referring to FIG. 86, it may be assumed that, at a second time successive to the first time shown in FIG. 8A, total five pieces of the write data WDATA are inputted from the host C10. A sequence in which the five pieces of the write data WDATA are inputted from the host C10 is not defined in advance, and it may be assumed that they are inputted randomly.

In detail, the controller C30 checks the transaction ID information TRID of the respective five pieces of the write data WDATA inputted from the host C10 at the second time, and classifies the five pieces of the write data WDATA into three pieces of the first write data TRAN_WDATA1 and two pieces of the normal write data NMAL_WDATA.

In further detail, the controller C30 determines that, among the five pieces of the write data WDATA inputted from the host C10 at the second time, 0, 1 and 2 as three pieces of the write data WDATA of which transaction ID information TRID have the value of 1 are write data WDATA which are grouped into the first transaction, and classifies them into the first write data TRAN_WDATA1.

In a first write command (not shown) corresponding to 0 as start data among 0, 1 and 2 grouped into the first write data TRAN_WDATA1, the first total size information TTSIZE1 is included. Thus, the controller C30 may check from the first write command corresponding to 0 that the first total size information TTSIZE1 is 5.

In this way, after checking that the first total size information TTSIZE1 is 5, the controller C30 checks whether there is a write buffer having an empty space capable of storing a total of five pieces of the first write data TRAN_WDATA1 which are grouped into the first transaction, among the four write buffers C31, C32, C33 and C34 allocated in the volatile memory 144.

As a result of the checking, because two pieces of the normal write data NMAL_WDATA have been stored in each of the first write buffer C31 and the second write buffer C32 among the four write buffers C31, C32, C33 and C34 at the first time described above, each of the first write buffer C31 and the second write buffer C32 has an empty space available for four other pieces of the write data. Therefore, each of the first write buffer C31 and the second write buffer C32 is not suitable for accommodating a total of five pieces of the first write data TRAN_WDATA1 which are grouped into the first transaction.

On the other hand, because no write data has been stored in each of the third write buffer C33 and the fourth write buffer C34 among the four write buffers C31, C32, C33 and C34 at the first time described above, each of the third write buffer C33 and the fourth write buffer C34 has an empty space available for six other pieces of the write data. Therefore, each of the third write buffer C33 and the fourth write buffer C34 is suitable for accommodating a total of five pieces of the first write data TRAN_WDATA1 which are grouped into the first transaction.

In other words, an empty space capable of accommodating the first determined size exists in each of one or more write buffers C33 and C34 among the four write buffers C31, C32, C33 and C34.

Because no write data has been stored in each of the third write buffer C33 and the fourth write buffer C34 among the four write buffers C31, C32, C33 and C34 at the first time described above, the third write buffer C33 and the fourth write buffer C34 are, in the same manner, in a state in which each of them has an empty space available for six pieces of the write data, at the second time.

Figure 8B:
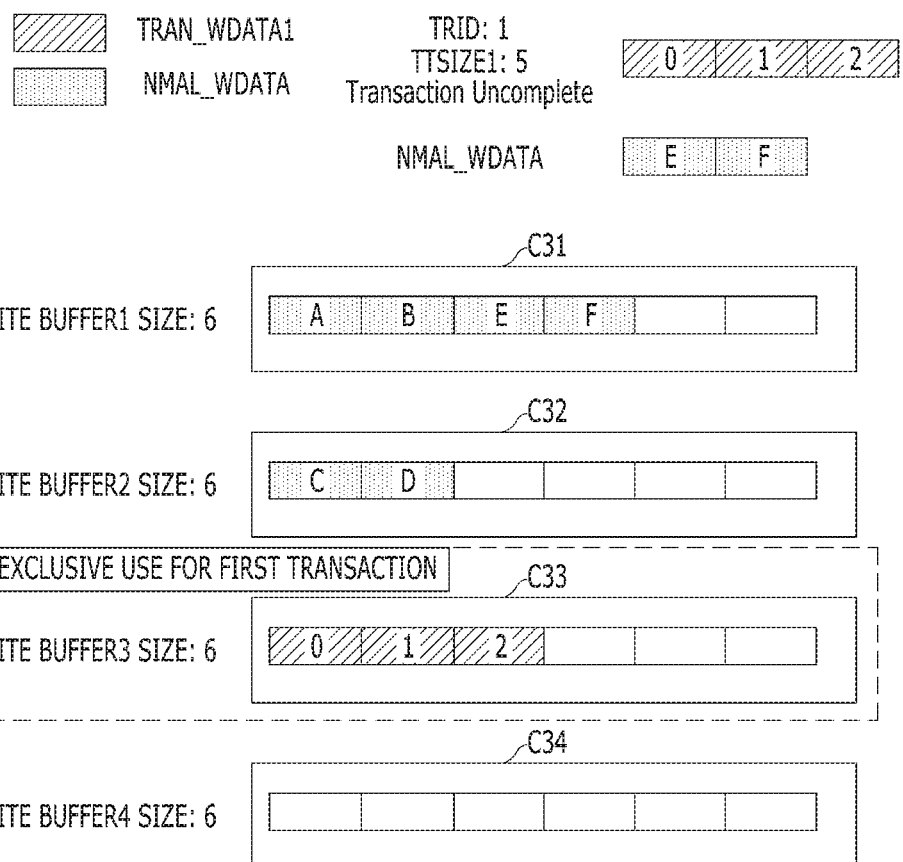

Thus, it is possible to set the first exclusive use option for any one write buffer of the third write buffer C33 and the fourth write buffer C34 among the four write buffers C31, C32, C33 and C34 and manage the corresponding write buffer as the first write buffer. For reference, it is illustrated in FIG. 8B that the first exclusive use option is set for the third write buffer C33 and thus the third write buffer C33 is exclusively used for the first transaction.

In this way, the controller C30 may check the first total size information TTSIZE1 before 0 as the start data among 0, 1 and 2 grouped into the first write data TRAN_WDATA1 is inputted, and thereby, may set the third write buffer C33 among the four write buffers C31, C32, C33 and C34 allocated in advance in the volatile memory 144, as the first write buffer for exclusive use for the first transaction.

After all the five pieces of the write data WDATA are inputted from the host C10 at the second time, the controller C30 may check that only 0, 1 and 2 exist as the first write data TRAN_WDATA1 which are grouped into the first transaction. In other words, the controller C30 may check that, at a time when the five pieces of the write data WDATA are inputted from the host C10 at the second time, the first transaction is not completely committed yet (Transaction Uncomplete).

In summary, the controller C30 selects the third write buffer C33 having space capable of storing a total of six pieces of the write data as the first write buffer for exclusive use for the first transaction at the second time, stores 0, 1 and 2 as the three pieces of the first write data TRAN_WDATA1 inputted from the host C10, in the third write buffer C33, and keeps space available for three remaining pieces of the write data.

Moreover, the controller C30 determines that, among the five pieces of the write data WDATA inputted from the host C10 at the second time, E and F as write data WDATA of which transaction ID information TRID are not set to any value are write data WDATA which are not grouped into a transaction, and classifies them into the normal write data NMAL_WDATA.

In succession, the controller C30 checks whether there is a write buffer which is set for exclusive use for a transaction, among the four write buffers C31, C32, C33 and C34 allocated in the volatile memory 144, at the second time. As a result of the checking, it is a state in which the third write buffer C33 is set for exclusive use for the first transaction at the second time. For reference, in order for the third write buffer C33 to be set as the first write buffer for exclusive use for the first transaction at the second time, at least one piece of the first write data TRAN_WDATA1 should be inputted. Therefore, it is assumed that FIG. 8B represents a case where at least one piece of the first write data TRAN_WDATA1 is inputted earlier than the normal write data NMAL_WDATA.

Thus, the controller C30 may store E and F as the two pieces of the normal write data NMAL_WDATA inputted from the host C10 at the second time, by appropriately distributing them over the remaining write buffers C31, C32 and C34 except the third write buffer C33 set for exclusive use for the first transaction among the four write buffers C31, C32, C33 and C34. For example, in the figure, E and F as the two pieces of the normal write data NMAL_WDATA inputted from the host C10 at the second time are stored in the first write buffer C31.

In summary, the controller C30 stores E and F as the two pieces of the normal write data NMAL_WDATA inputted from the host C10 at the second time, in the first write buffer C31 among the four write buffers C31, C32, C33 and C34. As a result, in the first write buffer C31 having the storage space capable of storing six pieces of the write data, a total of four pieces of the normal write data NMAL_WDATA are stored as two pieces of the write data are stored at each of the first time and the second time, and a space remains available for two other pieces of the write data.

Referring to FIG. 8C, it may be assumed that, at a third time successive to the second time shown in FIG. 8B, total eight pieces of the write data WDATA are inputted from the host C10. A sequence in which the eight pieces of the write data WDATA are inputted from the host C10 is not defined in advance, and it may be assumed that they are inputted randomly.

In detail, the controller C30 checks the transaction ID information TRID of the respective eight pieces of the write data WDATA inputted from the host C10 at the third time, and classifies the eight pieces of the write data WDATA into two pieces of the first write data TRAN_WDATA1, four pieces of the second write data TRAN_WDATA2 and two pieces of the normal write data NMAL_WDATA.

In further detail, the controller C30 determines that, among the eight pieces of the write data WDATA inputted from the host C10 at the third time, 3 and 4 as two pieces of the write data WDATA of which transaction ID information TRID have the value of 1 are write data WDATA which are grouped into the first transaction, and classifies them into the first write data TRAN_WDATA1.

At this time, it is a state in which, through the operation at the second time described above with reference to FIG. 8B, the third write buffer C33 among the four write buffers C31, C32, C33 and C34 allocated in the volatile memory 144 has already been set for exclusive use for the first transaction and is being used as the first write buffer for storing the first write data TRAN_WDATA1.

Therefore, the controller C30 immediately stores 3 and 4 grouped into the first write data TRAN_WDATA1 in the first write buffer at the third time without a separate additional operation. At this time, it is a state in which, through the operation at the second time described above with reference to FIG. 8B, the controller C30 has set the third write buffer C33 capable of storing a total of six pieces of the write data, as the first write buffer for exclusive use for the first transaction, has stored only 0, 1 and 2 as three pieces of the write data, and has kept a space available for three other pieces of the write data.

Because of this fact, the controller C30 immediately stores 3 and 4 grouped into the first write data TRAN_WDATA1 in the first write buffer at the third time without a separate additional operation. In this way, as 3 and 4 grouped into the first write data TRAN_WDATA1 are stored in the first write buffer at the third time, it becomes a state in which the first write data TRAN_WDATA1 are stored in a space capable of storing five pieces of the write data in a space available for storing six pieces of the write data in the first write buffer.

At a time when 0, 1, 2, 3 and 4 as the first write data TRAN_WDATA1 grouped into the first transaction are stored in the first write buffer and thus the first write data TRAN_WDATA1 are stored in the space capable of storing five pieces of the write data in space available for storing six pieces of the write data in the first write buffer, the controller C30 may check that it is a state in which the commit of the first transaction is completed (Transaction Complete).

In summary, by additionally storing 3 and 4 as the two pieces of the first write data TRAN_WDATA1 inputted from the host C10 at the third time, in the third write buffer C33 which is set as the first write buffer for exclusive use for the first transaction at the second time described above, the controller C30 may check that it is a state in which the commit of the first transaction is completed (Transaction Complete).

Further, the controller C30 determines that, among the eight pieces of the write data WDATA inputted from the host C10 at the third time, 110, 111, 112 and 113 as four pieces of the write data WDATA of which transaction ID information TRID have the value of 2 are write data WDATA which are grouped into the second transaction, and classifies them into the second write data TRAN_WDATA2.

In a second write command (not shown) corresponding to 110 as start data among 110, 111, 112 and 113 grouped into the second write data TRAN_WDATA2, the second total size information TTSIZE2 is included. Thus, the controller C30 may check from the second write command corresponding to 110 that the second total size information TTSIZE2 is 4.

In this way, after checking that the second total size information TTSIZE2 is 4, the controller C30 checks whether there is a write buffer having an empty space capable of storing a total of four pieces of the second write data TRAN_WDATA2 which are grouped into the second transaction, among the remaining write buffers C31, C32 and C34 except the first write buffer set for exclusive use for the first transaction allocated in the volatile memory 144.

As a result of the checking, it is a state in which the third write buffer C33 among the four write buffers C31, C32, C33 and C34 has been set as the first write buffer for exclusive use for the first transaction at the second time described above.

Therefore, whether there is a write buffer having an empty space capable of storing a total of four pieces of the second write data TRAN_WDATA2 which are grouped into the second transaction, among the remaining three write buffers C31, C32 and C34 except the third write buffer C33 is checked.

As a result of the checking, because a total of four pieces of the normal write data NMAL_WDATA have been stored in the first write buffer C31 among the three write buffers C31, C32 and C34 as two pieces of the normal write data NMAL_WDATA are stored at each of the first time and the second time described above, it is a state in which the first write buffer C31 has an empty space capable of storing two other pieces of the write data. Therefore, the first write buffer C31 is not suitable for accommodating the total four pieces of the second write data TRAN_WDATA2 which are grouped into the second transaction.

Because the two pieces of the normal write data NMAL_WDATA have been stored in the second write buffer C32 among the three write buffers C31, C32 and C34 at the first time described above, it is a state in which the second write buffer C32 has an empty space capable of storing four pieces of the write data. Therefore, the second write buffer C32 is suitable for accommodating a total of four pieces of the second write data TRAN_WDATA2 which are grouped into the second transaction.

Because no write data has been stored in the fourth write buffer C34 among the three write buffers C31, C32 and C34 at the first time and the second time described above, it is a state in which the fourth write buffer C34 has space available for storing six pieces of the write data. Therefore, the fourth write buffer C34 is suitable for accommodating the total four pieces of the second write data TRAN_WDATA2 which are grouped into the second transaction.

In other words, an empty space capable of accommodating the second determined size exists in each of one or more write buffers C32 and C34 among the three write buffers C31, C32 and C34.

In this way, because each of one or more write buffers C32 and C34 has an empty space capable of accommodating the second determined size, the controller C30 sets the second exclusive use option for a write buffer of which size of an empty space is relatively smaller, and manages the corresponding write buffer as the second write buffer. That is, the controller C30 sets the second exclusive use option for the second write buffer C32 of which size of an empty space is relatively smaller between the second write buffer C32 and the fourth write buffer C34 each having an empty space equal to or larger than the second determined size, and manages the second write buffer C32 as the second write buffer.

In this way, the controller C30 may check the second total size information TTSIZE2 before 110 as the start data among 110, 111, 112 and 113 grouped into the second write data TRAN_WDATA2 is inputted, and thereby, may set the second write buffer C32 among the four write buffers C31, C32, C32 and C34 allocated in advance in the volatile memory 144, as the second write buffer for exclusive use for the second transaction.

Thus, each time each of the four pieces of the second write data TRAN_WDATA2 grouped into the second transaction among the eight pieces of the write data WDATA inputted from the host C10 is inputted at the third time, the controller C30 stores each of the four pieces of the second write data TRAN_WDATA2 in the second write buffer which is set for exclusive use for the second transaction.

In this way, as 110, 111, 112 and 113 grouped into the second write data TRAN_WDATA2 are stored in the second write buffer at the third time, it becomes a state in which the second write data TRAN_WDATA2 are stored in the entire empty space available for four pieces of the write data which is included in the second write buffer.

At a time when 110, 111, 112 and 113 as the second write data TRAN_WDATA2 grouped into the second transaction are stored in the second write buffer and thus the second write data TRAN_WDATA2 are stored in the entire empty space for available for four pieces of the write data which is included in the second write buffer, the controller C30 may check that it is a state in which the commit of the second transaction is completed (Transaction Complete).

In summary, by selecting the second write buffer C32 having the space for a total of four pieces of the write data as the second write buffer for exclusive use for the second transaction at the third time and storing 110, 111, 112 and 113 as the four pieces of the second write data TRAN_WDATA2 inputted from the host C10, the controller C30 may check that it is a state in which the commit of the second transaction is completed (Transaction Complete).

Moreover, the controller C30 determines that, among the eight pieces of the write data WDATA inputted from the host C10 at the third time, G and H as write data WDATA of which transaction ID information TRID are not set to any value are write data WDATA which are not grouped into a transaction, and classifies them into the normal write data NMAL_WDATA.

In succession, the controller C30 checks whether there is a write buffer which is set for exclusive use for a transaction, among the four write buffers C31, C32, C33 and C34 allocated in the volatile memory 144, at the third time. As a result of the checking, it is a state in which the third write buffer C33 is set for exclusive use for the first transaction and the second write buffer C32 is set for exclusive use for the second transaction at the third time. For reference, in order for the second write buffer C32 to be set as the second write buffer for exclusive use for the second transaction at the third time, at least one piece of the second write data TRAN_WDATA2 should be inputted. Therefore, it is assumed that FIG. 8C represents a case where at least one piece of the second write data TRAN_WDATA2 is inputted earlier than the normal write data NMAL_WDATA.

Thus, the controller C30 may store G and H as the two pieces of the normal write data NMAL_WDATA inputted from the host C10 at the third time, by appropriately distributing them over the remaining write buffers C31 and C34 except the third write buffer C33 set for exclusive use for the first transaction and the second write buffer C32 set for exclusive use for the second transaction among the four write buffers C31, C32, C33 and C34. For example, in the figure, G and H as the two pieces of the normal write data NMAL_WDATA inputted from the host C10 at the third time are stored in the fourth write buffer C34.

In summary, the controller C30 stores G and H as the two pieces of the normal write data NMAL_WDATA inputted from the host C10 at the third time, in the fourth write buffer C34 among the four write buffers C31, C32, C33 and C34. As a result, in the fourth write buffer C34 having the storage space for six pieces of the write data, the two pieces of the normal write data NMAL_WDATA are stored at the third time, and a space for four pieces of the write data is kept empty.

In the state as shown in FIG. 8C, since both the first transaction and the second transaction are commit-completed, it is a case in which the first write buffer and the second write buffer should be flushed.

Since it is assumed that an input sequence of the write data WDATA inputted from the host C10 at the third time is random, a time at which the commit of the first transaction is completed may precede a time at which the commit of the second transaction is completed, or a time at which the commit of the second transaction is completed may precede a time at which the commit of the first transaction is completed.

In the case where a time at which the commit of the first transaction is completed precedes a time at which the commit of the second transaction is completed, it may be assumed that the commit of the second transaction is completed within the set first time interval from the time at which the commit of the first transaction is completed.

Conversely, in the case where a time at which the commit of the second transaction is completed precedes a time at which the commit of the first transaction is completed, it may be assumed that the commit of the first transaction is completed within the set first time interval from the time at which the commit of the second transaction is completed.

In this way, in the case where difference between a time at which the commit of the first transaction is completed and a time at which the commit of the second transaction is completed are within the set first time interval, the controller C30 synchronizes a time at which a first flush operation FLUSH1 is performed for the first write buffer in correspondence to the commit of the first transaction and a time at which a second flush operation FLUSH2 is performed for the second write buffer in correspondence to the commit of the second transaction.

In this way, by synchronizing a performance time of the first flush operation FLUSH1 and a performance time of the second flush operation FLUSH2, it may be regarded that a time at which the performance of a first write operation WRITE1 of storing the first write data TRAN_WDATA1 stored in the first write buffer in the nonvolatile memory devices C40, C50 and C60 is started and a time at which the performance of a second write operation WRITE2 of storing the second write data TRAN_WDATA2 stored in the second write buffer in the nonvolatile memory devices C40, C50 and C60 is started are synchronized.

Figure 9A:
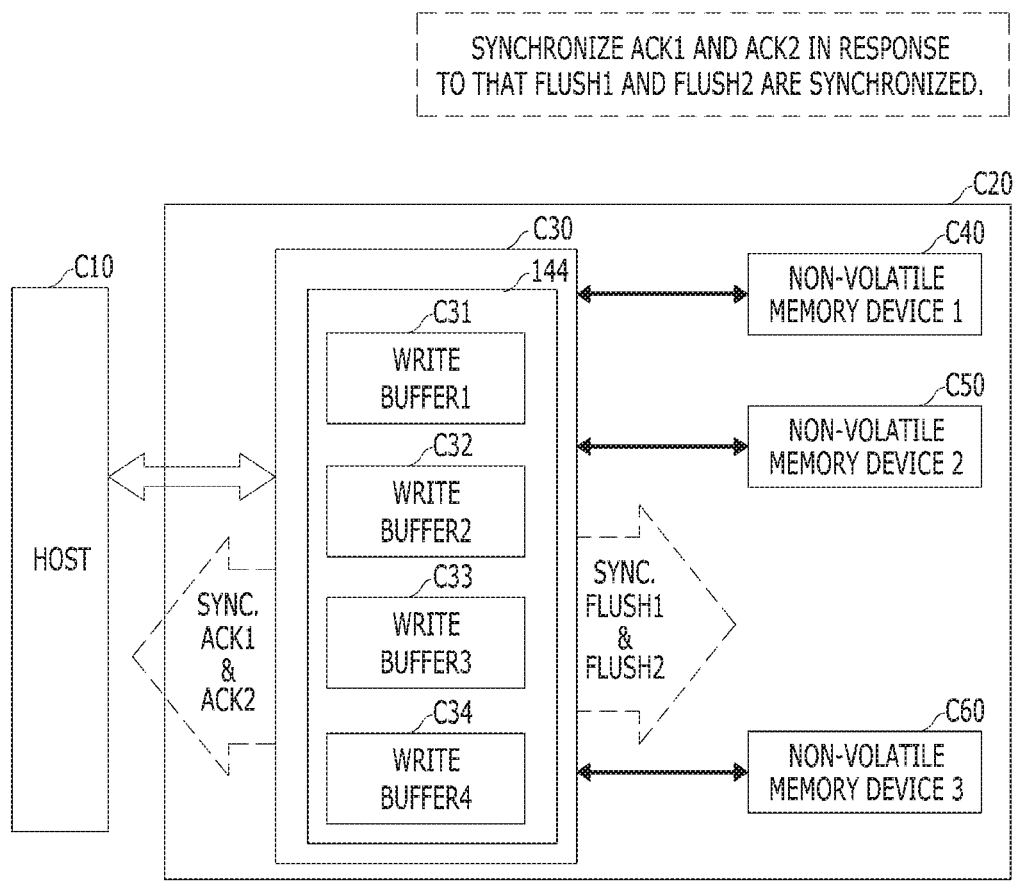

Accordingly, as in the case of a first synchronization operation shown in FIG. 9A, the controller C30 may synchronize, when a performance time of the first flush operation FLUSH1 and a performance time of the second flush operation FLUSH2 are synchronized, a time at which a first acknowledgement signal ACK1 for notifying the host C10 that the performance of the first write operation WRITE1 linked to the first flush operation FLUSH1 is completed is transferred to the host C10 and a time at which a second acknowledgement signal ACK2 for notifying the host C10 that the performance of the second write operation WRITE2 linked to the second flush operation FLUSH2 is completed is transferred to the host C10.

Figure 9B:
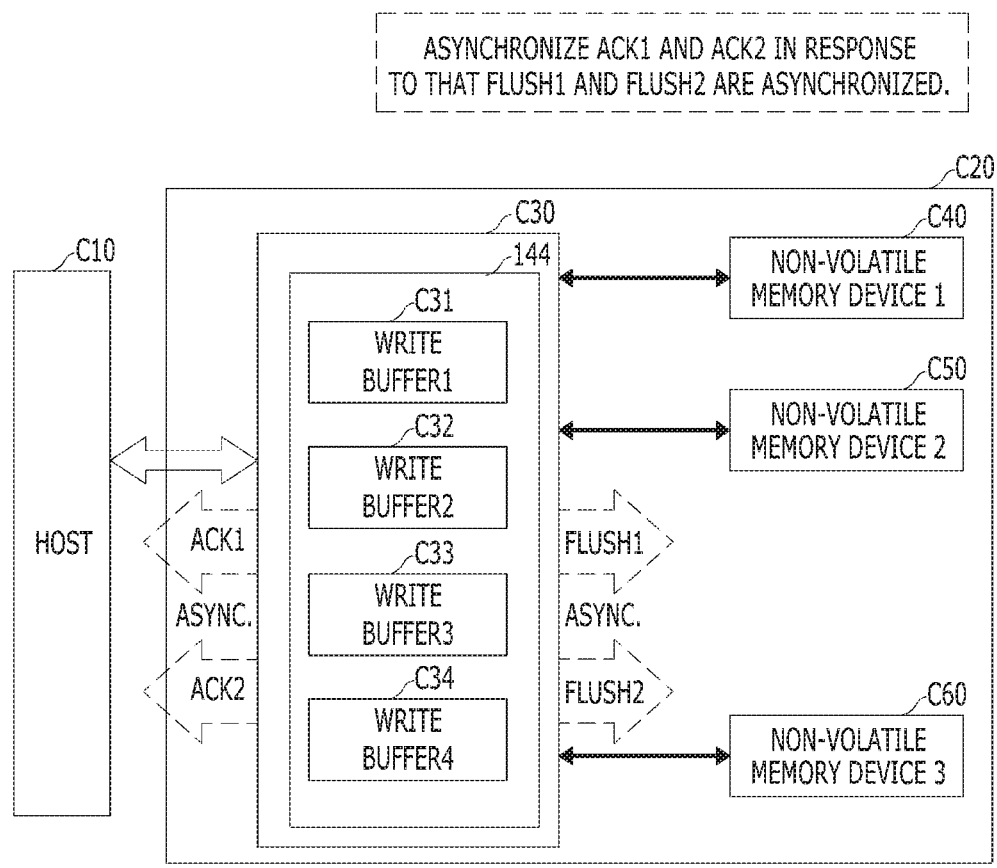

Of course, as in the case of a first synchronization operation shown in FIG. 9B, the controller C30 may not synchronize, when a performance time of the first flush operation FLUSH1 and a performance time of the second flush operation FLUSH2 are not synchronized, a time at which a first acknowledgement signal ACK1 for notifying the host C10 that the performance of the first write operation WRITE1 linked to the first flush operation FLUSH1 is completed is transferred to the host C10 and a time at which a second acknowledgement signal ACK2 for notifying the host C10 that the performance of the second write operation WRITE2 linked to the second flush operation FLUSH2 is completed is transferred to the host C10.

Figure 9C:
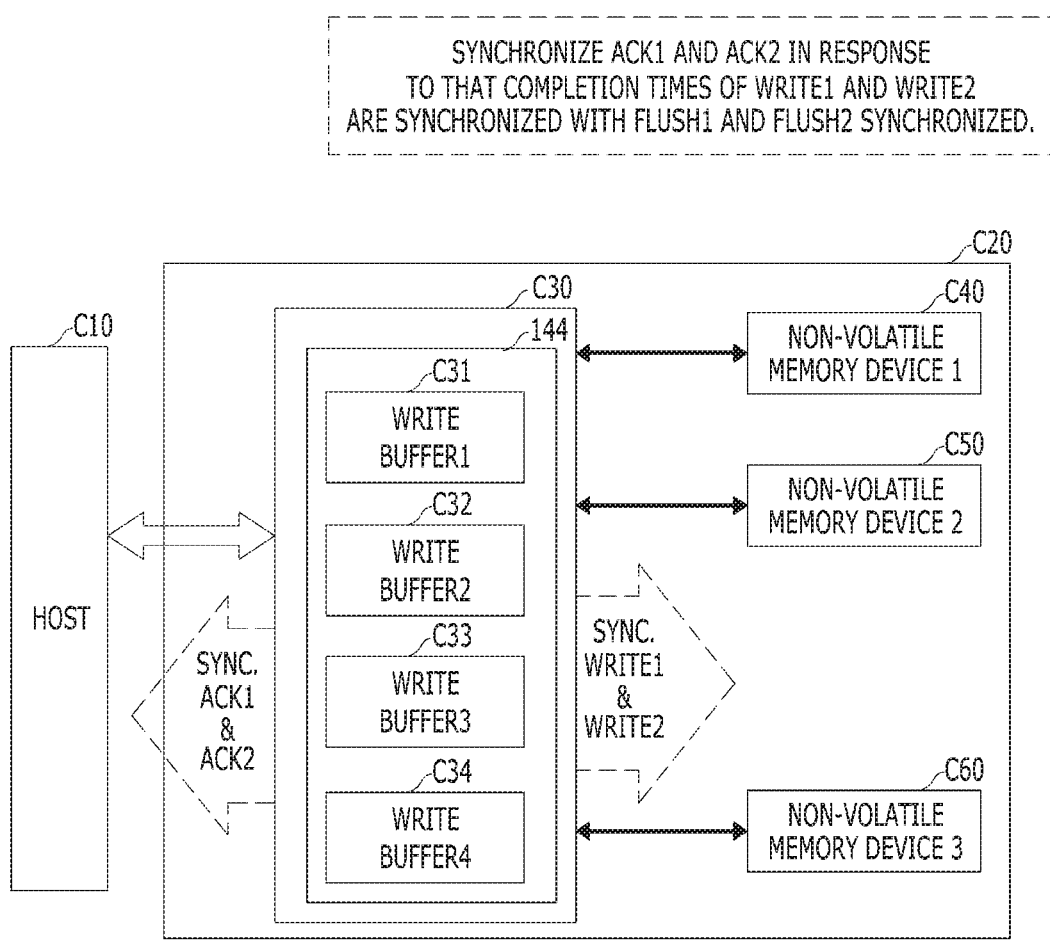

Also, as in the case of a second synchronization operation shown in FIG. 9C, even in the case where a performance time of the first flush operation FLUSH1 and a performance time of the second flush operation FLUSH2 are synchronized, only in the case where a time at which a first acknowledgement signal ACK1 for notifying the host C10 that the performance of the first write operation WRITE1 linked to the first flush operation FLUSH1 is completed is generated and a time at which a second acknowledgement signal ACK2 for notifying the host C10 that the performance of the second write operation WRITE2 linked to the second flush operation FLUSH2 is completed is generated are within the set second time interval, the controller C30 may synchronize a time at which the first acknowledgement signal ACK1 is transferred to the host C10 and a time at which the second acknowledgement signal ACK2 is transferred to the host C10.

Figure 9D:
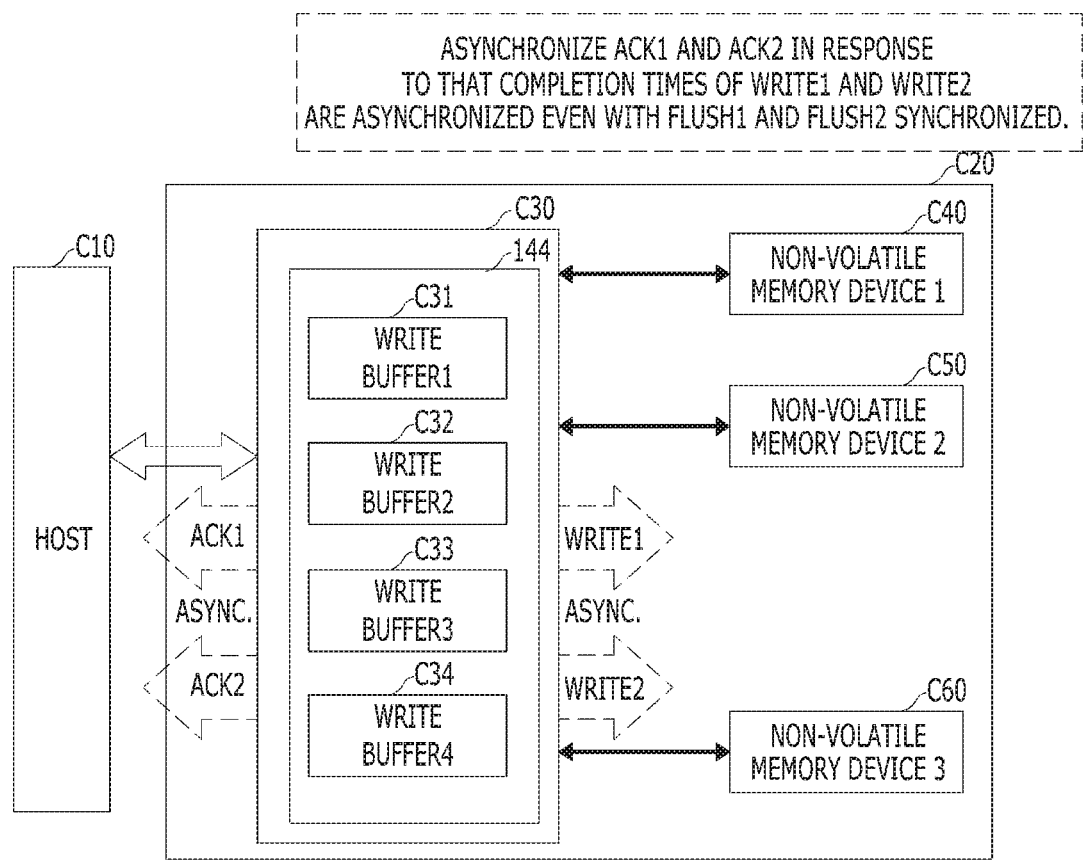

Of course, as in the case of a second synchronization operation shown in FIG. 9D, even in the case where a performance time of the first flush operation FLUSH1 and a performance time of the second flush operation FLUSH2 are synchronized, in the case where a time at which a first acknowledgement signal ACK1 for notifying the host C10 that the performance of the first write operation WRITE1 linked to the first flush operation FLUSH1 is completed is generated and a time at which a second acknowledgement signal ACK2 for notifying the host C10 that the performance of the second write operation WRITE2 linked to the second flush operation FLUSH2 is completed is generated are not within the set second time interval, the controller C30 may not synchronize a time at which the first acknowledgement signal ACK1 is transferred to the host C10 and a time at which the second acknowledgement signal ACK2 is transferred to the host C10.

Referring again to FIG. 8C, after completing the performance of the first write operation WRITE1, the controller C30 resets the setting for the first write buffer for exclusive use for the first transaction. That is, the controller C30 has used the third write buffer C33 as the first write buffer for exclusive use for the first transaction, by setting the first exclusive use option for the third write buffer C33 among the four write buffers C31, C32, C33 and C34 allocated in the volatile memory 144, at the second time described above. Therefore, by resetting the first exclusive use option for the first write buffer after completing the performance of the first write operation WRITE1 at the third time, the third write buffer C33 having been used as the first write buffer may not be used for exclusive use for the first transaction, like before the second time. Namely, the third write buffer C33 having been exclusively used to store the first write data TRAN_WDATA1 at the second time and the third time may be used to store, for example, normal write data NMAL_WDATA, after the third time.

Similarly, after completing the performance of the second write operation WRITE2, the controller C30 resets the setting for the second write buffer for exclusive use for the second transaction. That is, the controller C30 has used the second write buffer C32 as the second write buffer for exclusive use for the second transaction, by setting the second exclusive use option for the second write buffer C32 among the four write buffers C31, C32, C33 and C34 allocated in the volatile memory 144, at the third time. Therefore, by resetting the second exclusive use option for the second write buffer after completing the performance of the second write operation WRITE2 at the third time, the second write buffer C32 having been used as the second write buffer may not be used for exclusive use for the second transaction, like before the third time. Namely, the second write buffer C32 having been exclusively used to store the second write data TRAN_WDATA2 at the third time may be used to store, for example, normal write data NMAL_WDATA, after the third time.

Referring to FIG. 8D, it may be assumed that, at a third time successive to the second time shown in FIG. 8B, total seven pieces of the write data WDATA are inputted from the host C10. A sequence in which the seven pieces of the write data WDATA are inputted from the host C10 is not defined in advance, and it may be assumed that they are inputted randomly.

In detail, the controller C30 checks the transaction ID information TRID of the respective seven pieces of the write data WDATA inputted from the host C10 at the third time, and classifies the seven pieces of the write data WDATA into one piece of the first write data TRAN_WDATA1, four pieces of the second write data TRAN_WDATA2 and two pieces of the normal write data NMAL_WDATA.

In further detail, the controller C30 determines that, among the seven pieces of the write data WDATA inputted from the host C10 at the third time, 3 as one piece of the write data WDATA of which transaction ID information TRID has the value of 1 is write data WDATA which is grouped into the first transaction, and classifies it into the first write data TRAN_WDATA1.

At this time, it is a state in which, through the operation at the second time described above with reference to FIG. 8B, the third write buffer C33 among the four write buffers C31, C32, C33 and C34 allocated in the volatile memory 144 has already been set for exclusive use for the first transaction and is being used as the first write buffer for storing the first write data TRAN_WDATA1.

Therefore, the controller C30 immediately stores 3 grouped into the first write data TRAN_WDATA1 in the first write buffer at the third time without a separate additional operation. At this time, it is a state in which, through the operation at the second time described above with reference to FIG. 8B, the controller C30 has set the third write buffer C33 for total six pieces of the write data, as the first write buffer for exclusive use for the first transaction, has stored only 0, 1 and 2 as three pieces of the write data, and has kept a space for three pieces of the write data empty.

Because of this fact, the controller C30 immediately stores 3 grouped into the first write data TRAN_WDATA1 in the first write buffer at the third time without a separate additional operation. In this way, as 3 grouped into the first write data TRAN_WDATA1 is stored in the first write buffer at the third time, it becomes a state in which the first write data TRAN_WDATA1 are stored in a space for four pieces of the write data in a total space capable of storing six pieces of the write data which is included in the first write buffer.

After all the seven pieces of the write data WDATA are inputted from the host C10 at the third time, the controller C30 may check that only 0, 1, 2 and 3 exist as the first write data TRAN_WDATA1 which are grouped into the first transaction. In other words, the controller C30 may check that, at a time when the seven pieces of the write data WDATA are inputted from the host C10, the first transaction is not completely committed yet (Transaction Uncomplete).

In summary, after additionally storing 3 as the one piece of the first write data TRAN_WDATA1 inputted from the host C10 at the third time, in the third write buffer C33 which is set as the first write buffer for exclusive use for the first transaction at the second time described above, the controller C30 keeps a space for two remaining pieces of the write data empty.

Further, the controller C30 determines that, among the seven pieces of the write data WDATA inputted from the host C10 at the third time, 110, 111, 112 and 113 as four pieces of the write data WDATA of which transaction ID information TRID have the value of 2 are write data WDATA which are grouped into the second transaction, and classifies them into the second write data TRAN_WDATA2.

In a second write command (not shown) corresponding to 110 as start data among 110, 111, 112 and 113 grouped into the second write data TRAN_WDATA2, the second total size information TTSIZE2 is included. Thus, the controller C30 may check from the second write command corresponding to 110 that the second total size information TTSIZE2 is 4.

In this way, after checking that the second total size information TTSIZE2 is 4, the controller C30 checks whether there is a write buffer having an empty space capable of storing a total of four pieces of the second write data TRAN_WDATA2 which are grouped into the second transaction, among the remaining write buffers C31, C32 and C34 except the first write buffer set for exclusive use for the first transaction among the four write buffers C31, C32, C33 and C34 allocated in the volatile memory 144.

As a result of the checking, it is a state in which the third write buffer C33 among the four write buffers C31, C32, C33 and C34 has been set as the first write buffer for exclusive use for the first transaction at the second time described above.

Therefore, whether there is a write buffer having an empty space capable of storing a total of four pieces of the second write data TRAN_WDATA2 which are grouped into the second transaction, among the remaining three write buffers C31, C32 and C34 except the third write buffer C33 among the four write buffers C31, C32, C33 and C34, is checked.

As a result of the checking, because a total of four pieces of the normal write data NMAL_WDATA have been stored in the first write buffer C31 among the three write buffers C31, C32 and C34 as two pieces of the normal write data NMAL_WDATA are stored at each of the first time and the second time described above, it is a state in which the first write buffer C31 has an empty space available for two other pieces of the write data. Therefore, the first write buffer C31 is not suitable for accommodating the total of four pieces of the second write data TRAN_WDATA2 which are grouped into the second transaction.

Because the two pieces of the normal write data NMAL_WDATA have been stored in the second write buffer C32 among the three write buffers C31, C32 and C34 at the first time described above, it is a state in which the second write buffer C32 has an empty space available for four pieces of the write data. Therefore, the second write buffer C32 is suitable for accommodating the total of four pieces of the second write data TRAN_WDATA2 which are grouped into the second transaction.

Because no write data has been stored in the fourth write buffer C34 among the three write buffers C31, C32 and C34 at the first time and the second time described above, it is a state in which the fourth write buffer C34 has an empty space available for six pieces of the write data. Therefore, the fourth write buffer C34 is suitable for accommodating the total of four pieces of the second write data TRAN_W-DATA2 which are grouped into the second transaction.

In other words, an empty space capable of accommodating the second determined size exists in each of one or more write buffers C32 and C34 among the three write buffers C31, C32 and C34.

In this way, because each of one or more write buffers C32 and C34 has an empty space capable of accommodating the second determined size, the controller C30 sets the second exclusive use option for a write buffer of which size of an empty space is relatively smaller, and manages the corresponding write buffer as the second write buffer. That is, the controller C30 sets the second exclusive use option for the second write buffer C32 of which size of an empty space is relatively smaller between the second write buffer C32 and the fourth write buffer C34 each having an empty space equal to or larger than the second determined size, and manages the second write buffer C32 as the second write buffer.

In this way, the controller C30 may check the second total size information TTSIZE2 before 110 as the start data among 110, 111, 112 and 113 grouped into the second write data TRAN_WDATA2 is inputted, and thereby, may set the second write buffer C32 among the four write buffers C31, C32, C32 and C34 allocated in advance in the volatile memory 144, as the second write buffer for exclusive use for the second transaction.

Thus, each time each of the four pieces of the second write data TRAN_WDATA2 grouped into the second transaction among the seven pieces of the write data WDATA inputted from the host C10 is inputted at the third time, the controller C30 stores each of the four pieces of the second write data TRAN_WDATA2 in the second write buffer which is set for exclusive use for the second transaction.

In this way, as 110, 111, 112 and 113 grouped into the second write data TRAN_WDATA2 are stored in the second write buffer at the third time, it becomes a state in which the second write data TRAN_WDATA2 are stored in the entire empty space capable of storing four pieces of the write data which is included in the second write buffer.

At a time when 110, 111, 112 and 113 as the second write data TRAN_WDATA2 grouped into the second transaction are stored in the second write buffer and thus the second write data TRAN_WDATA2 are stored in the entire empty space capable of storing four pieces of the write data which is included in the second write buffer, the controller C30 may check that it is a state in which the commit of the second transaction is completed (Transaction Complete).

In summary, by selecting the second write buffer C32 having the space capable of storing a total of four pieces of the write data as the second write buffer for exclusive use for the second transaction at the third time and storing 110, 111, 112 and 113 as the four pieces of the second write data TRAN_WDATA2 inputted from the host C10, the controller C30 may check that it is a state in which the commit of the second transaction is completed (Transaction Complete).

Moreover, the controller C30 determines that, among the seven pieces of the write data WDATA inputted from the host C10 at the third time, G and H as write data WDATA of which transaction ID information TRID are not set to any value are write data WDATA which are not grouped into a transaction, and classifies them into the normal write data NMAL_WDATA.

In succession, the controller C30 checks whether there is a write buffer which is set for exclusive use for a transaction, among the four write buffers C31, C32, C33 and C34 allocated in the volatile memory 144, at the third time. As a result of the checking, it is a state in which the third write buffer C33 is set for exclusive use for the first transaction and the second write buffer C32 is set for exclusive use for the second transaction at the third time. For reference, in order for the second write buffer C32 to be set as the second write buffer for exclusive use for the second transaction at the third time, at least one piece of the second write data TRAN_WDATA2 should be inputted. Therefore, it is assumed that FIG. 3D represents a case where at least one piece of the second write data TRAN_WDATA2 is inputted earlier than the normal write data NMAL_WDATA.

Thus, the controller C30 may store G and H as the two pieces of the normal write data NMAL_WDATA inputted from the host C10 at the third time, by appropriately distributing them over the remaining write buffers C31 and C34 except the third write buffer C33 set for exclusive use for the first transaction and the second write buffer C32 set for exclusive use for the second transaction among the four write buffers C31, C32, C33 and C34. For example, in the figure, G and H as the two pieces of the normal write data NMAL_WDATA inputted from the host C10 at the third time are stored in the fourth write buffer C34.

In summary, the controller C30 stores G and H as the two pieces of the normal write data NMAL_WDATA inputted from the host C10 at the third time, in the fourth write buffer C34 among the four write buffers C31, C32, C33 and C34. As a result, in the fourth write buffer C34 having the storage space capable of storing six pieces of the write data, the two pieces of the normal write data NMAL_WDATA are stored at the third time, and a space available for four pieces of the write data is kept empty.

In the state as shown in FIG. 8D, since the first transaction is commit-uncompleted and the second transaction is commit-completed, it is a case in which it is not necessary to perform a flush operation for the first write buffer and the second write buffer should be flushed.

When the state shown in FIG. 8B is changed to the state shown in FIG. 8D, the first transaction maintains a state in which the commit thereof is not completed, and the second transaction is converted into a state in which the commit thereof is completed. Therefore, in the state as shown in FIG. 8D, it may not be seen that the commit of the first transaction is to be completed at which time, but it may be seen that a time at which the commit of the second transaction is completed precedes a time at which the commit of the first transaction is completed. Through this, it may be assumed that the commit of the first transaction is not completed within the set first time interval from the time at which the commit of the second transaction is completed.

In this way, in the case where a time at which the commit of the first transaction is completed and a time at which the commit of the second transaction is completed exceed the set first time interval, the controller C30 may not synchronize a time at which a first flush operation FLUSH1 is performed for the first write buffer in correspondence to the commit of the first transaction and a time at which a second flush operation FLUSH2 is performed for the second write buffer in correspondence to the commit of the second transaction.

In other words, after the second flush operation FLUSH2 for the second write buffer corresponding to the second transaction which is commit-completed is performed, when the commit of the first transaction is completed at a certain time that is not within the set first time interval, the first flush operation FLUSH1 for the first write buffer corresponding to the first transaction may be performed.

In this way, by not synchronizing a performance time of the first flush operation FLUSH1 and a performance time of the second flush operation FLUSH2, it may be regarded that a time at which the performance of a first write operation WRITE1 of storing the first write data TRAN_WDATA1 stored in the first write buffer in the nonvolatile memory devices C40, C50 and C60 is started and a time at which the performance of a second write operation WRITE2 of storing the second write data TRAN_WDATA2 stored in the second write buffer in the nonvolatile memory devices C40, C50 and C60 is started are not synchronized. Hence, there is a high possibility that a time at which the performance of the first write operation is completed and a time at which the performance of the second write operation is completed have a large difference.

Therefore, as in the case of a first synchronization operation shown in FIG. 9C, the controller C30 may not synchronize, when a performance time of the first flush operation FLUSH1 and a performance time of the second flush operation FLUSH2 are not synchronized, a time at which a first acknowledgement signal ACK1 for notifying the host C10 that the performance of the first write operation WRITE1 linked to the first flush operation FLUSH1 is completed is transferred to the host C10 and a time at which a second acknowledgement signal ACK2 for notifying the host C10 that the performance of the second write operation WRITE2 linked to the second flush operation FLUSH2 is completed is transferred to the host C10.

Because it is assumed in FIG. 8D that a performance time of the first flush operation FLUSH1 and a performance time of the second flush operation FLUSH2 are not synchronized, it is impossible that the second synchronization operation shown in FIGS. 9C and 9D is performed.

Referring again to FIG. 8D, after completing the performance of the second write operation WRITE2, the controller C30 resets the setting for the second write buffer for exclusive use for the second transaction. That is, the controller C30 has used the second write buffer C32 as the second write buffer for exclusive use for the second transaction, by setting the second exclusive use option for the second write buffer C32 among the four write buffers C31, C32, C33 and C34 allocated in the volatile memory 144, at the third time. Therefore, by resetting the second exclusive use option for the second write buffer after completing the performance of the second write operation WRITE2 at the third time, the second write buffer C32 having been used as the second write buffer may not be used for exclusive use for the second transaction, like before the third time. Namely, the second write buffer C32 having been exclusively used to store the second write data TRAN_WDATA2 at the third time may be used to store, for example, normal write data NMAL_WDATA, after the third time.

Conversely, since it is a state in which the first flush operation FLUSH1 and the following first write operation WRITE1 are not performed for the first write buffer, the first exclusive use option is continuously maintained for the first write buffer even after the third time, and the first write buffer is continuously used exclusively for the first transaction.

Figure 8E:
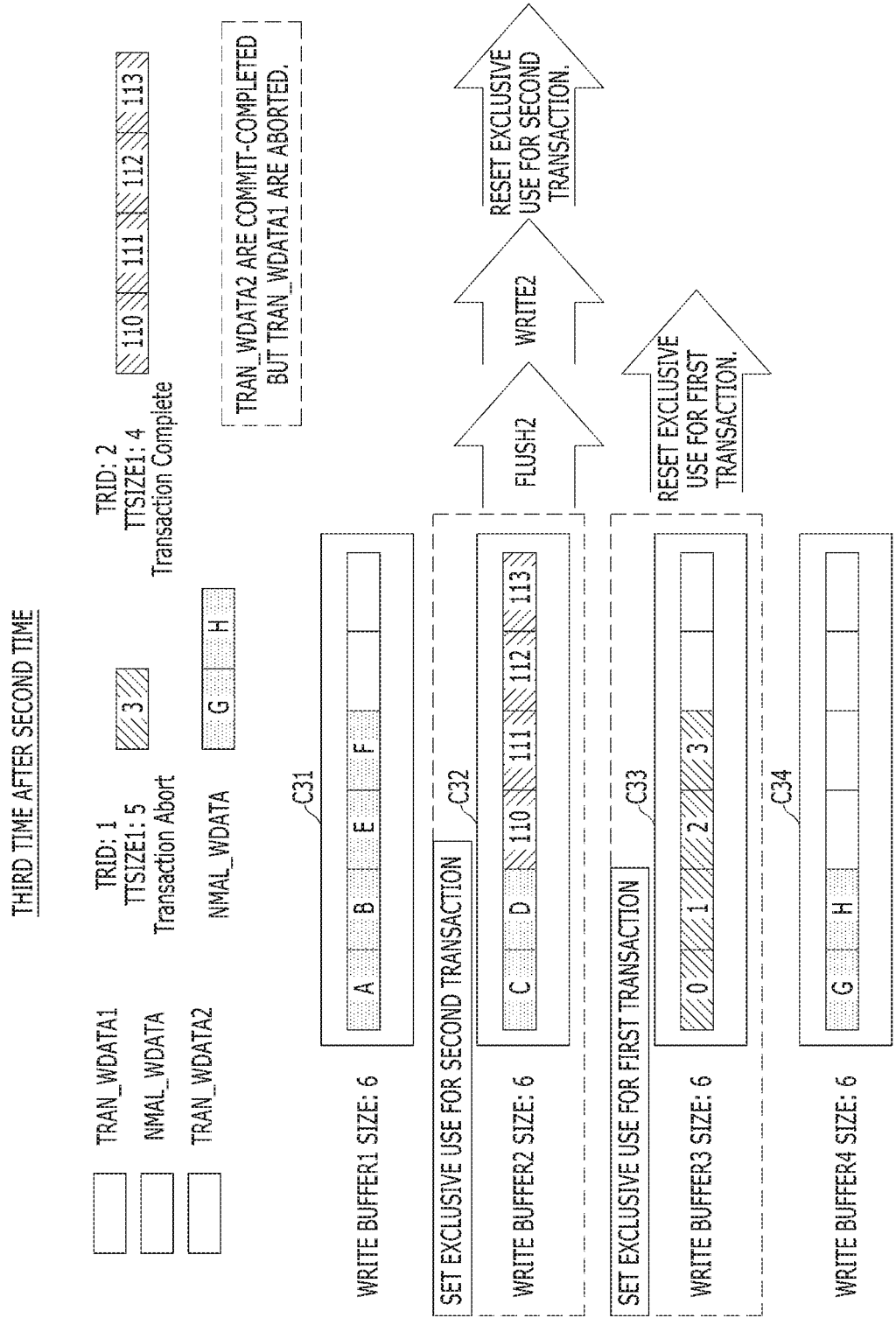

Referring to FIG. 8E, it may be assumed that, at a third time successive to the second time shown in FIG. 8B, total seven pieces of the write data WDATA are inputted from the host C10. A sequence in which the seven pieces of the write data WDATA are inputted from the host C10 is not defined in advance, and it may be assumed that they are inputted randomly.

In detail, the controller C30 checks the transaction ID information TRID of the respective seven pieces of the write data WDATA inputted from the host C10 at the third time, and classifies the seven pieces of the write data WDATA into one piece of the first write data TRAN_WDATA1, four pieces of the second write data TRAN_WDATA2 and two pieces of the normal write data NMAL_WDATA.

In further detail, the controller C30 determines that, among the seven pieces of the write data WDATA inputted from the host C10 at the third time, 3 as one piece of the write data WDATA of which transaction ID information TRID has the value of 1 is write data WDATA which is grouped into the first transaction, and classifies it into the first write data TRAN_WDATA1.

At this time, it is a state in which, through the operation at the second time described above with reference to FIG. 8B, the third write buffer C33 among the four write buffers C31, C32, C33 and C34 allocated in the volatile memory 144 has already been set for exclusive use for the first transaction and is being used as the first write buffer for storing the first write data TRAN_WDATA1.

Therefore, the controller C30 immediately stores 3 grouped into the first write data TRAN_WDATA1 in the first write buffer at the third time without a separate additional operation. At this time, it is a state in which, through the operation at the second time described above with reference to FIG. 8B, the controller C30 has set the third write buffer C33 capable of storing a total of six pieces of the write data, as the first write buffer for exclusive use for the first transaction, has stored only 0, 1 and 2 as three pieces of the write data, and has kept a space available for three pieces of the write data.

Because of this fact, the controller C30 immediately stores 3 grouped into the first write data TRAN_WDATA1 in the first write buffer at the third time without a separate additional operation. In this way, as 3 grouped into the first write data TRAN_WDATA1 is stored in the first write buffer at the third time, it becomes a state in which the first write data TRAN_WDATA1 are stored in a space for four pieces of the write data in a total empty space capable of storing six pieces of the write data which is included in the first write buffer.

In summary, after additionally storing 3 as the one piece of the first write data TRAN_WDATA1 inputted from the host C10 at the third time, in the third write buffer C33 which is set as the first write buffer for exclusive use for the first transaction at the second time described above, the controller C30 keeps a space available for two remaining pieces of the write data empty.

At a time when 0, 1, 2 and 3 as the first write data TRAN_WDATA1 grouped into the first transaction are stored in the first write buffer, the controller C30 may receive an information that the first transaction is aborted, from the host C10. For example, after 3 grouped into the first write data TRAN_WDATA1 is stored in the first write buffer, a separate command including the abort information of the first transaction may be transmitted from the host C10. According to this fact, it may be checked that, in a state in which only 0, 1, 2 and 3 as the first write data TRAN_WDATA1 grouped into the first transaction are stored in the first write buffer, the first transaction is aborted (Transaction Abort).

Further, the controller C30 determines that, among the seven pieces of the write data WDATA inputted from the host C10 at the third time, 110, 111, 112 and 113 as four pieces of the write data WDATA of which transaction ID information TRID have the value of 2 are write data WDATA which are grouped into the second transaction, and classifies them into the second write data TRAN_WDATA2.

In a second write command (not shown) corresponding to 110 as start data among 110, 111, 112 and 113 grouped into the second write data TRAN_WDATA2, the second total size information TTSIZE2 is included. Thus, the controller C30 may check from the second write command corresponding to 110 that the second total size information TTSIZE2 is 4.

In this way, after checking that the second total size information TTSIZE2 is 4, the controller C30 checks whether there is a write buffer having an empty space capable of storing total four pieces of the second write data TRAN_WDATA2 which are grouped into the second transaction, among the remaining write buffers C31, C32 and C34 except the first write buffer set for exclusive use for the first transaction among the four write buffers C31, C32, C33 and C34 allocated in the volatile memory 144.

As a result of the checking, it is a state in which the third write buffer C33 among the four write buffers C31, C32, C33 and C34 has been set as the first write buffer for exclusive use for the first transaction at the second time described above.

Therefore, whether there is a write buffer having an empty space capable of storing a total of four pieces of the second write data TRAN_WDATA2 which are grouped into the second transaction, among the remaining three write buffers C31, C32 and C34 except the third write buffer C33, is checked.

As a result of the checking, because a total of four pieces of the normal write data NMAL_WDATA have been stored in the first write buffer C31 among the three write buffers C31, C32 and C34 as two pieces of the normal write data NMAL_WDATA are stored at each of the first time and the second time described above, it is a state in which the first write buffer CM has an empty space available for two other pieces of the write data. Therefore, the first write buffer C31 is not suitable for accommodating a total of four pieces of the second write data TRAN_WDATA2 which are grouped into the second transaction.

Because the two pieces of the normal write data NMAL_WDATA have been stored in the second write buffer C32 among the three write buffers C31, C32 and C34 at the first time described above, it is a state in which the second write buffer C32 has an empty space available for four pieces of the write data. Therefore, the second write buffer C32 is suitable for accommodating a total of four pieces of the second write data TRAN_WDATA2 which are grouped into the second transaction.

Because no write data has been stored in the fourth write buffer C34 among the three write buffers C31, C32 and C34 at the first time and the second time described above, it is a state in which the fourth write buffer C34 has an empty space capable of storing six pieces of the write data. Therefore, the fourth write buffer C34 is suitable for accommodating a total of four pieces of the second write data TRAN_WDATA2 which are grouped into the second transaction.

In other words, an empty space capable of accommodating the second determined size exists in each of one or more write buffers C32 and C34 among the three write buffers C31, C32 and C34.

In this way, because each of one or more write buffers C32 and C34 has an empty space capable of accommodating the second determined size, the controller C30 sets the second exclusive use option for a write buffer of which size of an empty space is relatively smaller, and manages the corresponding write buffer as the second write buffer. That is, the controller C30 sets the second exclusive use option for the second write buffer C32 of which size of an empty space is relatively smaller between the second write buffer C32 and the fourth write buffer C34 each having an empty space equal to or larger than the second determined size, and manages the second write buffer C32 as the second write buffer.

In this way, the controller C30 may check the second total size information TTSIZE2 before 110 as the start data among 110, 111, 112 and 113 grouped into the second write data TRAN_WDATA2 is inputted, and thereby, may set the second write buffer C32 among the four write buffers C31, C32, C32 and C34 allocated in advance in the volatile memory 144, as the second write buffer for exclusive use for the second transaction.

Thus, each time each of the four pieces of the second write data TRAN_WDATA2 grouped into the second transaction among the seven pieces of the write data WDATA inputted from the host C10 is inputted at the third time, the controller C30 stores each of the four pieces of the second write data TRAN_WDATA2 in the second write buffer which is set for exclusive use for the second transaction.

In this way, as 110, 111, 112 and 113 grouped into the second write data TRAN_WDATA2 are stored in the second write buffer at the third time, it becomes a state in which the second write data TRAN_WDATA2 are stored in the entire empty space capable of storing four pieces of the write data which is included in the second write buffer.

At a time when 110, 111, 112 and 113 as the second write data TRAN_WDATA2 grouped into the second transaction are stored in the second write buffer and thus the second write data TRAN_WDATA2 are stored in the entire empty space capable of storing four pieces of the write data which is included in the second write buffer, the controller C30 may check that it is a state in which the commit of the second transaction is completed (Transaction Complete).

In summary, by selecting the second write buffer C32 having the space capable of storing a total of four pieces of the write data as the second write buffer for exclusive use for the second transaction at the third time and storing 110, 111, 112 and 113 as the four pieces of the second write data TRAN_WDATA2 inputted from the host C10, the controller C30 may check that it is a state in which the commit of the second transaction is completed (Transaction Complete).

Moreover, the controller C30 determines that, among the seven pieces of the write data WDATA inputted from the host C10 at the third time, G and H as write data WDATA of which transaction ID information TRID are not set to any value are write data WDATA which are not grouped into a transaction, and classifies them into the normal write data NMAL_WDATA.

In succession, the controller C30 checks whether there is a write buffer which is set for exclusive use for a transaction, among the four write buffers C31, C32, C33 and C34 allocated in the volatile memory 144, at the third time. As a result of the checking, it is a state in which the third write buffer C33 is set for exclusive use for the first transaction and the second write buffer C32 is set for exclusive use for the second transaction at the third time. For reference, in order for the second write buffer C32 to be set as the second write buffer for exclusive use for the second transaction at the third time, at least one piece of the second write data TRAN_WDATA2 should be inputted. Therefore, it is assumed that FIG. 3D represents a case where at least one piece of the second write data TRAN_WDATA2 is inputted earlier than the normal write data NMAL_WDATA.

Thus, the controller C30 may store G and H as the two pieces of the normal write data NMAL_WDATA inputted from the host C10 at the third time, by appropriately distributing them over the remaining write buffers C31 and C34 except the third write buffer C33 set for exclusive use for the first transaction and the second write buffer C32 set for exclusive use for the second transaction among the four write buffers C31, C32, C33 and C34. For example, in the figure, G and H as the two pieces of the normal write data NMAL_WDATA inputted from the host C10 at the third time are stored in the fourth write buffer C34.

In summary, the controller C30 stores G and H as the two pieces of the normal write data NMAL_WDATA inputted from the host C10 at the third time, in the fourth write buffer C34 among the four write buffers C31, C32, C33 and C34. As a result, in the fourth write buffer C34 having the storage space capable of storing six pieces of the write data, the two pieces of the normal write data NMAL_WDATA are stored at the third time, and a space remains available for four pieces of the write data.

in the state as shown in FIG. 8E, since the first transaction is aborted and the second transaction is commit-completed, it is a case in which it is not necessary to perform a flush operation for the first write buffer and the second write buffer should be flushed.

When the state shown in FIG. 8B is changed to the state shown in FIG. 8D, the first transaction is converted into a state in which it is aborted, and the second transaction is converted into a state in which the commit thereof is completed. Therefore, in the state as in FIG. 8E, it is impossible that the commit of the first transaction is completed. Thus, it may be determined that the first transaction is not committed within the set first time interval from a time at which the commit of the second transaction is completed.

In this way, in the case where the first transaction is aborted separately from that the commit of the second transaction is completed, the controller C30 discards the first write data TRAN_WDATA1 stored in the first write buffer, in correspondence to the abort of the first transaction, and then, resets the setting for the first write buffer for exclusive use for the first transaction. That is, the controller C30 has used the third write buffer C33 as the first write buffer for exclusive use for the first transaction, by setting the first exclusive use option for the third write buffer C33 among the four write buffers C31, C32, C33 and C34 allocated in the volatile memory 144, at the second time. Therefore, after discarding the first write data TRAN_WDATA1 stored in the first write buffer, in correspondence to the abort of the first transaction at the third time, as the setting for the first write buffer for exclusive use for the first transaction is reset, the third write buffer C33 having been used as the first write buffer may not be used for exclusive use for the first transaction, like before the second time. Namely, the third write buffer C33 having been exclusively used to store the first write data TRAN_WDATA1 at the second time and the third time may be used to store, for example, normal write data NMAL_WDATA, after the third time.

Further, the second flush operation FLUSH2 is performed for the second write buffer in correspondence to that the commit of the second transaction is completed, separately from that the first transaction is aborted, and accordingly, the second write operation WRITE2 of storing the second write data TRAN_WDATA2 stored in the second write buffer in the nonvolatile memory devices C40, C50 and C60 is performed.

Since it is assumed in FIG. 8E that a first flush operation FLUSH1 for the first write buffer is not performed, the first synchronization operation and the second synchronization operation shown in FIGS. 9A to 9D are not performed.

Referring again to FIG. 8E, after completing the performance of the second write operation WRITE2, the controller C30 resets the setting for the second write buffer for exclusive use for the second transaction. That is, the controller C30 has used the second write buffer C32 as the second write buffer for exclusive use for the second transaction, by setting the second exclusive use option for the second write buffer C32 among the four write buffers C31, C32, C33 and C34 allocated in the volatile memory 144, at the third time. Therefore, by resetting the second exclusive use option for the second write buffer after completing the performance of the second write operation WRITE2 at the third time, the second write buffer C32 having been used as the second write buffer may not be used for exclusive use for the second transaction, like before the third time. Namely, the second write buffer C32 having been exclusively used to store the second write data TRAN_WDATA2 at the third time may be used to store, for example, normal write data NMAL_WDATA, after the third time.

As is apparent from the above descriptions, the memory system C20 in accordance with the second embodiment of the present disclosure may set the first exclusive use option for the first write buffer among the plurality of write buffers C31, C32, C33 and C34 allocated in the volatile memory 144, when the first write data TRAN_WDATA1 which are grouped into the first transaction are inputted from the host C10, and may exclusively use the first write buffer for the first transaction. Also, the memory system C20 in accordance with the second embodiment of the present disclosure may set the second exclusive use option for the second write buffer among the remaining write buffers except the first write buffer among the plurality of write buffers C31, C32, C33 and C34 allocated in the volatile memory 144, when the second write data TRAN_WDATA2 which are grouped into the second transaction are inputted from the host C10, and may exclusively use the second write buffer for the second transaction. The first write buffer and the second write buffer may be distinguished from each other. Through this, the memory system C20 in accordance with the second embodiment of the present disclosure may effectively manage transaction write data.

Further, the memory system C20 in accordance with the second embodiment of the present disclosure synchronizes a time at which a first flush operation to be performed in the first write buffer is performed when the first transaction is committed and a time at which a second flush operation to be performed in the second write buffer is performed when the second transaction is committed, to the maximum within a possible range. Through this, the first write operation WRITE1 of storing the first write data TRAN_WDATA1 stored in the first write buffer in the nonvolatile memory devices C40, C50 and C60 and the second write operation WRITE2 of storing the second write data TRAN_WDATA2 stored in the second write buffer in the nonvolatile memory devices C40, C50 and C60 may be started by being synchronized, and a possibility to intensively store the first write data TRAN_WDATA1 and the second write data TRAN_WDATA2 may be increased by collectively storing them in a specific storage space of the nonvolatile memory devices C40, C50 and C60. Namely, an algorithm for ensuring the first transaction and the second transaction may be simplified.

Moreover, the memory system C20 in accordance with the second embodiment of the present disclosure maximally synchronizes within a possible range times at which the first and second acknowledgement signals ACK1 and ACK2 are transmitted to the host C10 to notify the host C10 that the synchronized first and second write operations WRITE1 and WRITE2 are completed when the first and second write buffers C32 and C33 are flushed in a synchronized state. That is, the memory system C20 may transfer the two acknowledgement signals ACK1 and ACK2 to the host C10 at one timing. Through this, the number of times by which an acknowledgement signal is transmitted to the host C10 from the memory system C20 may be minimized.

Figure 10A:
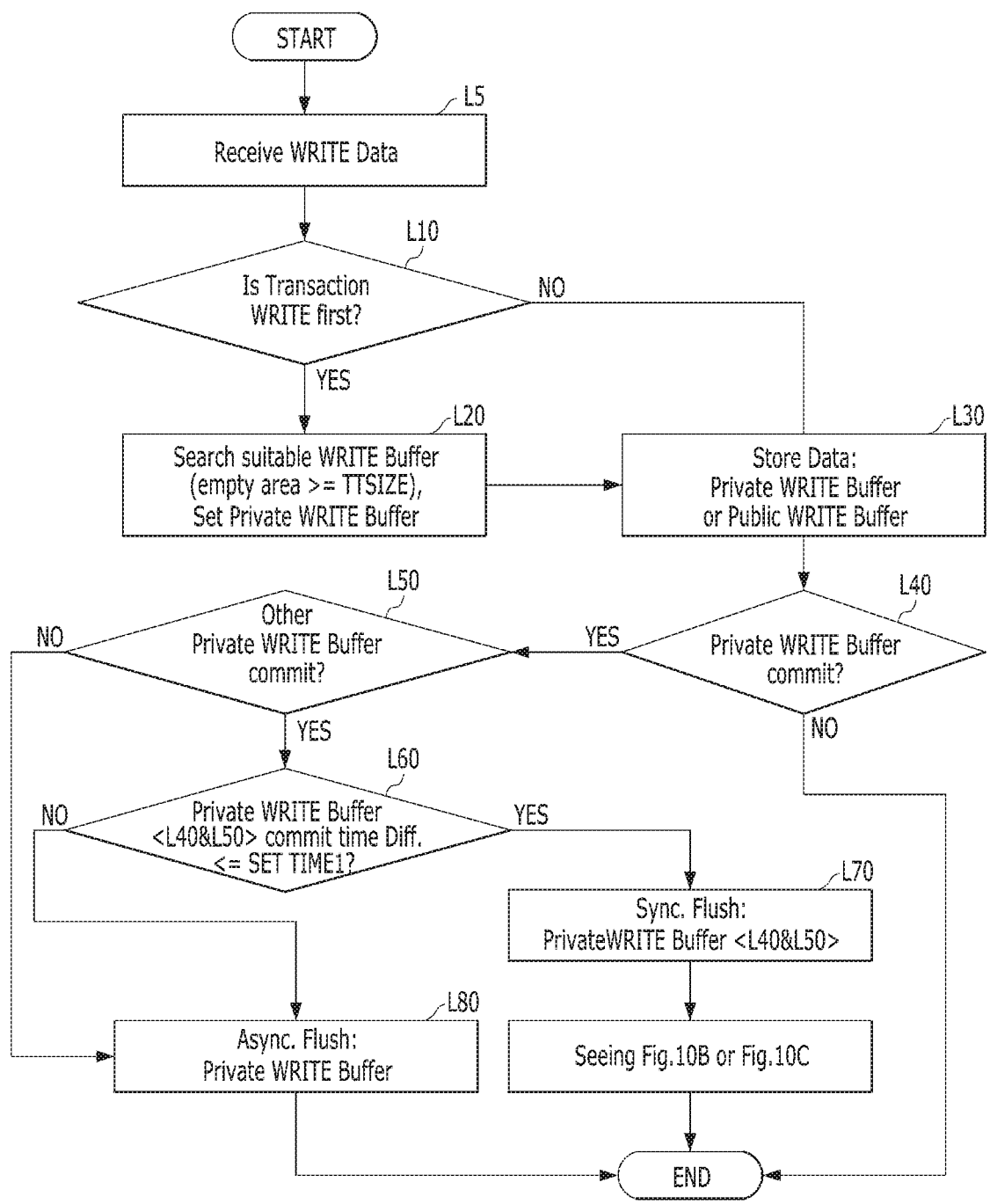
FIGS. 10A to 10C are flow charts to assist in the explanation of the operation of the memory system in accordance with an embodiment of the present disclosure.
Figure 10B:
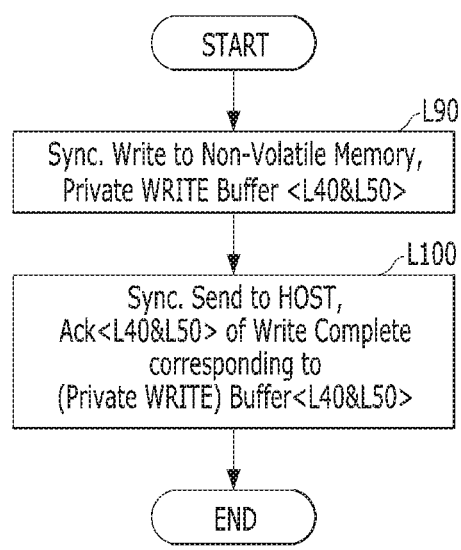
Figure 10C:
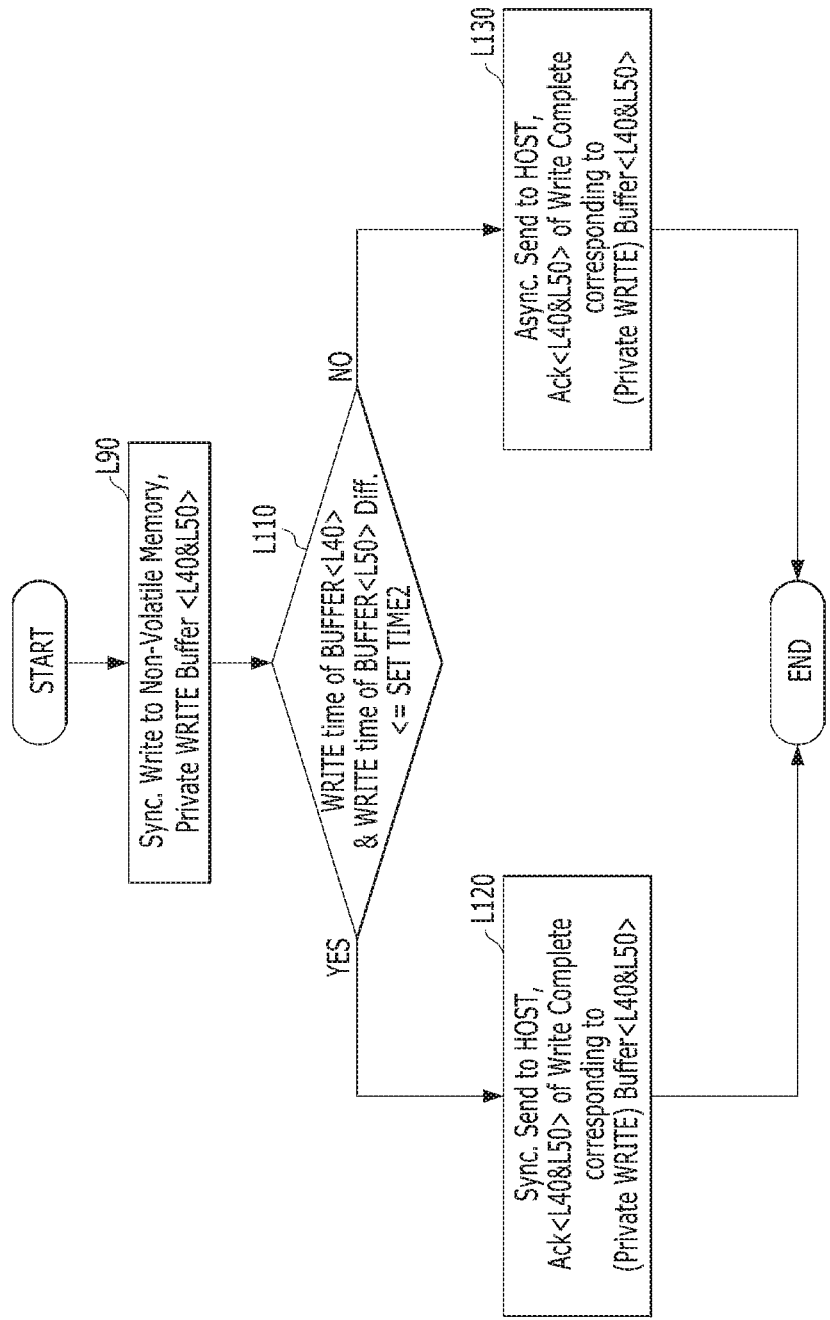

FIGS. 10A to 10C are flow charts to assist in the explanation of the operation of the memory system in accordance with the second embodiment of the present disclosure.

Referring to FIG. 10A, the operation of the memory system C20 in accordance with the second embodiment of the present disclosure is started when write data WDATA is transmitted from the host C10 to the memory system C20 (L5).

Whether the write data WDATA transmitted at the step L5 is start data of a transaction is checked (L10).

In the case where the write data WDATA is start data of a transaction at the step L10 (YES), the memory system C20 searches at least one write buffer suitable for storing transaction data among the plurality of write buffers C31, C32, C33 and C34 allocated in advance in the volatile memory 144 disposed therein (Search Suitable WRITE Buffer), and sets the at least one write buffer as a private write buffer for exclusive use for a transaction (Set Private WRITE Buffer) (L20). The searching of at least one write buffer suitable for storing transaction data at the step L20 means that at least one write buffer including an empty space equal to or larger than the total size of a transaction identified according to a total size information TTSIZE transferred together with the start data of the transaction at the step L10 is searched.

At the step L20, new write buffers are set as private write buffers for exclusive use for transactions, by the number corresponding to the kinds of transactions (Set Private WRITE Buffer). That is, a first private write buffer for exclusive use for a first transaction is set for the first transaction, and a second private write buffer for exclusive use for a second transaction is set for the second transaction.

In the case where the write data WDATA is not start data of a transaction at the step L10 (NO), it may be regarded that the write data WDATA transmitted at the step L5 is normal write data NMAL_WDATA or another data other than start data of the transaction.

In the case where the write data WDATA transmitted at the step L5 is normal write data NMAL_WDATA, the write data WDATA is stored in a public write buffer (Public WRITE buffer) which is not set for exclusive use for a transaction (L30).

In the case where the write data WDATA transmitted at the step L5 is another data other than start data of the transaction, the write data WDATA is stored in the private write buffer (Private WRITE Buffer) which is set for exclusive use for the transaction at the step L20 (L30). At the step L30, it is checked which kind of a transaction the write data WDATA transmitted at the step L5 is, and the write data WDATA is stored in a private write buffer for exclusive use for a transaction in correspondence to the checked transaction. In other words, at the step L30, in the case where the write data WDATA transmitted at the step L5 is another data of the first transaction, the write data WDATA is stored in the first private write buffer for exclusive use for the first transaction, and, in the case where the write data WDATA transmitted at the step L5 is another data of the second transaction, the write data WDATA is stored in the second private write buffer for exclusive use for the second transaction.

After the step L30, whether a buffer of which commit is completed exists among private write buffers for exclusive use for transactions is checked (L40).

In the case where a buffer of which commit is completed does not exist at the step L40 (NO), a separate operation is not performed until new write data WDATA is inputted at the step L5.

In the case where a buffer of which commit is completed exists at the step L40 (YES), whether the commit of another transaction is completed is checked (L50). In other words, through the step L40 and the step L50, whether at least two transactions are committed may be checked.

In the case where only one private write buffer is committed as a result of the step L50 (NO), only the one private write buffer which is committed is flushed alone (L80). The private write buffer which is flushed at the step L80 is not flushed simultaneously with another private write buffer.

In the case where at least two private write buffers are committed as a result of the step L50 (YES), whether the commit times of the at least two private write buffers are within a set first time interval (SET TIME1) is checked (L60). That is, whether the commit time of a private write buffer (Private WRITE Buffer<L40>) of which commit is checked at the step L40 and the commit time of a private write buffer (Private WRITE Buffer<L50>) of which commit is checked at the step L50 are within the set first time interval (SET TIME1) is checked (L60).

In the case where the commit times of the at least two private write buffers exceed the set first time interval (SET TIME1) at the step L60 (NO), flush operations for the at least two private write buffers which are commit-completed are not synchronized (L80). That is, a flush operation for the private write buffer (Private WRITE Buffer<L40>) of which commit is checked at the step L40 and a flush operation for the private write buffer (Private WRITE Buffer<L50>) of which commit is checked at the step L50 are not synchronized (L80).

In the case where difference between the commit times of the at least two private write buffers are within the set first time interval (SET TIME1) at the step L60 (YES), flush operations for the at least two private write buffers which are commit-completed are synchronized (L70). That is, a flush operation for the private write buffer (Private WRITE Buffer<L40>) of which commit is checked at the step L40 and a flush operation for the private write buffer (Private WRITE Buffer<L50>) of which commit is checked at the step L50 are synchronized (L70).

After the flush operations for the at least two private write buffers which are commit-completed are synchronized at the step L70, any one operation of two operations may be selected and performed by referring to FIGS. 10B and 10C as will be described below.

Referring to FIG. 10B, in correspondence to that the flush operations for the at least two private write buffers which are commit-completed are synchronized at the step L70, at least two write operations (Write to Non-Volatile Memory, Private WRITE Buffer <L40 & L50>) of storing the transaction data stored in the at least two private write buffers, in the nonvolatile memory devices C40, C50 and C60, are synchronized (L90).

Since the flush operations for the at least two private write buffers which are commit-completed are synchronized and accordingly the at least two write operations are synchronized at the step L70 and the step L90, in FIG. 10B, a separate condition is not additionally checked, and times at which at least two acknowledgement signals (ACK<L40 & L50> of Write Complete corresponding to (Private WRITE) Buffer<L40 & L50>) for notifying the host C10 that the at least two write operations are completed are transmitted to the host C10 are synchronized (L100).

Referring to FIG. 10C, in correspondence to that the flush operations for the at least two private write buffers which are commit-completed are synchronized at the step L70, at least two write operations (Write to Non-Volatile Memory, Private WRITE Buffer <L40 & L50>) of storing the transaction data stored in the at least two private write buffers, in the nonvolatile memory devices C40, C50 and C60, are synchronized (L90).

After the flush operations for the at least two private write buffers which are commit-completed are synchronized and accordingly the at least two write operations are synchronized at the step L70 and the step L90, in FIG. 10C, whether the times at which the at least two write operations are completed are within a set second time interval (SET TIME2) is checked (L110).

In the case where the times at which the at least two write operations are completed are within the set second time interval (SET TIME2) at the step L110 (YES), times at which at least two acknowledgement signals (ACK<L40 & L50> of Write Complete corresponding to (Private WRITE) Buffer<L40 & L50>) for notifying the host C10 that the at least two write operations are completed are transmitted to the host C10 are synchronized (L120).

In the case where the times at which the at least two write operations are completed exceed the set second time interval (SET TIME2) at the step L110 (NO), times at which at least two acknowledgement signals (ACK<L40 & L50> of Write Complete corresponding to (Private WRITE) Buffer<L40 & L50>) for notifying the host C10 that the at least two write operations are completed are transmitted to the host C10 are not synchronized (L130).

Although various embodiments have been illustrated and described, it will be apparent to those skilled in the art in light of the present disclosure that various changes and modifications may be made without departing from the spirit and scope of the invention as defined in the following claims.

What is claimed is:

1. A memory system comprising:
a nonvolatile memory device;
a volatile memory suitable for temporarily storing write data inputted from a host; and
a controller suitable for:
allocating a normal write buffer in the volatile memory when normal write data, which are not grouped into a transaction, are inputted from the host,
allocating a first write buffer in the volatile memory when first write data, which are grouped into a first transaction and first total size information on a total size of the first transaction, are inputted,
allocating a second write buffer in the volatile memory when second write data, which are grouped into a second transaction and second total size information on a total size of the second transaction, are inputted,
managing sizes of the first and second write buffers to change them in response to the first and second total size information, respectively, and
managing a size of the normal write buffer to fix it to a set size,
wherein the normal write buffer only stores the normal write data, the first write buffer exclusively stores the first write data, and the second write buffer exclusively stores the second write data.

2. The memory system according to claim 1, wherein the controller further:
checks a first determined size for the first write data according to the first total size information, and allocates the first write buffer by an amount of the first determined size in the volatile memory, and
checks a second determined size for the second write data according to the second total size information, and allocates the second write buffer by an amount of the second determined size in the volatile memory.

3. The memory system according to claim 2, wherein the controller further:
checks whether the first transaction is committed or aborted, for the first write data stored in the first write buffer;
performs a first write operation of storing the first write data stored in the first write buffer in the nonvolatile memory device by performing a first flush operation for the first write buffer, in the case where the first transaction is checked as being committed, and then releases the first write buffer in the volatile memory, and
releases the first write buffer in the volatile memory in the case where the first transaction is checked as being aborted.

4. The memory system according to claim 3, wherein the controller further:
checks whether the second transaction is committed or aborted, for the second write data stored in the second write buffer,
performs a second write operation of storing the second write data stored in the second write buffer in the nonvolatile memory device by performing a second flush operation for the second write buffer, in the case where the second transaction is checked as being committed, and then releases the second write buffer in the volatile memory, and
releases the second write buffer in the volatile memory in the case where the second transaction is checked as being aborted.

5. The memory system according to claim 4, wherein the controller further:
synchronizes a start time of the first flush operation and a start time of the second flush operation in the case where a time at which commit of the first transaction is checked and a time at which commit of the second transaction is checked are within a set first time interval.

6. The memory system according to claim 5, wherein, when the start time of the first flush operation and the start time of the second flush operation are synchronized, the controller synchronizes a time at which a first acknowledgement signal corresponding to completion of the first write operation is transferred to the host and a time at which a second acknowledgement signal corresponding to completion of the second write operation is transferred to the host.

7. The memory system according to claim 5, wherein, when a time at which a first acknowledgement signal is generated and a time at which a second acknowledgement signal is generated are within a set second time interval, the controller synchronizes a time at which the first acknowledgement signal is transferred to the host and a time at which the second acknowledgement signal is transferred to the host.

8. The memory system according to claim 4, wherein:
the controller receives a plurality of write commands respectively corresponding to the write data, from the host,
transaction information of the respective write data corresponding to the write commands are respectively included in the write commands,
transaction information of each of the write data includes transaction ID (identification) information, commit information and abort information,
the first total size information is additionally included in a write command corresponding to start data of the first transaction among the first write data, and
the second total size information is additionally included in a write command corresponding to start data of the second transaction among the second write data.

9. The memory system according to claim 8, wherein the controller further:
checks transaction ID information in the transaction information of the respective write data,
stores the first write data by allocating the first write buffer in the volatile memory in the case where the transaction ID information of the first write data which are grouped into the first transaction are checked as being set to a first value,
stores the second write data by allocating the second write buffer in the volatile memory in the case where the transaction ID information of the second write data which are grouped into the second transaction are checked as being set to a second value, and
stores the normal write data by allocating the normal write buffer in the volatile memory in the case where the transaction ID information of the normal write data are checked as not being set and thus which are not grouped into a transaction.

10. A memory system comprising:
a nonvolatile memory device;
a volatile memory suitable for temporarily storing write data inputted from a host; and
a controller suitable for:
allocating a plurality of write buffers, each of which has a defined size, in the volatile memory,
only storing normal write data, which are inputted from the host and are not grouped into a transaction, in write buffers which are not set for exclusive use for transactions, and
setting, when first write data which are grouped into a first transaction and first total size information on a total size of the first transaction are inputted from the host, a first exclusive use option for exclusively using at least one first write buffer among the write buffers, for the first transaction, according to the first total size information,
wherein the first write buffer exclusively stores the first write data.

11. The memory system according to claim 10, wherein the controller further:
checks respective empty spaces of the write buffers at a time when the first write data are inputted from the host,
sets the first exclusive use option for a minimum number of write buffers among the write buffers, according to the checked empty spaces and the first total size information, and
uses the minimum number of write buffers as the at least one first write buffer.

12. The memory system according to claim 11, wherein the controller further:
sets, when second write data which are grouped into a second transaction and second total size information on a total size of the second transaction are inputted from the host, a second exclusive use option for exclusively using at least one second write buffer among remaining write buffers excluding the first write buffer, for the second transaction, according to the second total size information.

13. The memory system according to claim 12, wherein the controller further:
checks respective empty spaces of the remaining write buffers at a time when the second write data are inputted from the host,
sets the second exclusive use option for a minimum number of write buffers among the remaining write buffers, according to the checked empty spaces and the second total size information, and
uses the minimum number of write buffers as the at least one second write buffer.

14. The memory system according to claim 13, wherein the controller further:
checks whether the first transaction is committed or aborted, for the first write data stored in the at least one first write buffer,
performs a first write operation of storing the first write data stored in the at least one first write buffer in the nonvolatile memory device by performing a first flush operation for the at least one first write buffer, in the case where the first transaction is checked as being committed, and then resets the first exclusive use option for the at least one first write buffer, and
discards the first write data stored in the at least one first write buffer in the case where the first transaction is checked as being aborted, and then resets the first exclusive use option for the at least one first write buffer.

15. The memory system according to claim 14, wherein the controller further:
checks whether the second transaction is committed or aborted, for the second write data stored in the at least one second write buffer,
performs a second write operation of storing the second write data stored in the at least one second write buffer in the nonvolatile memory device by performing a second flush operation for the at least one second write buffer, in the case where the second transaction is checked as being committed, and then resets the second exclusive use option for the at least one second write buffer, and
discards the second write data stored in the at least one second write buffer in the case where the second transaction is checked as being aborted, and then resets the second exclusive use option for the at least one second write buffer.

16. The memory system according to claim 15, wherein the controller further:
synchronizes a start time of the first flush operation and a start time of the second flush operation in the case where a time at which commit of the first transaction is checked and a time at which commit of the second transaction is checked are within a set first time interval.

17. The memory system according to claim 16, wherein, when the start time of the first flush operation and the start time of the second flush operation are synchronized, the controller synchronizes a time at which a first acknowledgement signal corresponding to completion of the first write operation is transferred to the host and a time at which a second acknowledgement signal corresponding to completion of the second write operation is transferred to the host.

18. The memory system according to claim 16, wherein, when a time at which a first acknowledgement signal corresponding to completion of the first write operation is generated and a time at which a second acknowledgement signal corresponding to completion of the second write operation is generated are within a set second time interval, the controller synchronizes a time at which the first acknowledgement signal is transferred to the host and a time at which the second acknowledgement signal is transferred to the host.

19. The memory system according to claim 14, wherein:
the controller receives from the host a plurality of write commands respectively corresponding to the write data,
transaction information of the respective write data corresponding to the write commands are respectively included in the write commands,
transaction information of each of the write data includes transaction ID (identification) information, commit information and abort information,
the first total size information is additionally included in a write command corresponding to start data of the first transaction among the first write data, and
the second total size information is additionally included in a write command corresponding to start data of the second transaction among the second write data.

20. The memory system according to claim 19, wherein the controller further:
checks transaction ID information in the transaction information of the respective write data,
stores the first write data by setting the first write buffer among the write buffers in the case where the transaction ID information of the first write data which are grouped into the first transaction are checked as being set to a first value,
stores the second write data by setting the at least one second write buffer among the remaining write buffers in the case where the transaction ID information of the second write data which are grouped into the second transaction are checked as being set to a second value, and
stores the normal write data in remaining write buffers except the first and second write buffers among the write buffers, in the case where the transaction ID information of the normal write data are checked as not being set and thus which are not grouped into a transaction.

* * * * *